(12) United States Patent  (10) Patent No.: US 7,052,433 B2
Sugiura et al.  (45) Date of Patent: May 30, 2006

(54) AUTOMATIC TRANSMISSION

(75) Inventors: Nobutada Sugiura, Anjo (JP); Takeo Arai, Anjo (JP); Kazuhisa Ozaki, Anjo (JP); Kazumasa Tsukamoto, Anjo (JP); Kazumichi Kayama, Anjo (JP); Tomochika Inagaki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 43 days.

(21) Appl. No.: 10/486,889

(22) PCT Filed: Mar. 31, 2003

(86) PCT No.: PCT/JP03/04112

§ 371 (c)(1),
(2), (4) Date: Feb. 17, 2004

(87) PCT Pub. No.: WO03/087624

PCT Pub. Date: Oct. 23, 2003

(65) Prior Publication Data

US 2004/0248684 A1   Dec. 9, 2004

(30) Foreign Application Priority Data

Mar. 29, 2002 (JP) ............................. 2002-098020
Jul. 12, 2002 (JP) ............................. 2002-204894
Dec. 27, 2002 (JP) ............................. 2002-382147

(51) Int. Cl.
  F16H 3/44  (2006.01)
  F16H 31/00  (2006.01)
(52) U.S. Cl. .................... 475/296; 475/280; 475/116
(58) Field of Classification Search ................ 475/114, 475/116, 331, 275–292, 296, 311–325

See application file for complete search history.

(56) References Cited

U.S. PATENT DOCUMENTS

| | | | | |
|---|---|---|---|---|
| 4,916,980 A | * | 4/1990 | Asada et al. | 475/281 |
| 5,133,697 A | | 7/1992 | Hattori | |
| 5,222,923 A | * | 6/1993 | Hotta et al. | 475/276 |
| 5,277,673 A | * | 1/1994 | Nakayama et al. | 475/278 |
| 5,342,257 A | * | 8/1994 | Hotta et al. | 475/275 |
| 5,460,579 A | * | 10/1995 | Kappel et al. | 475/276 |
| 5,525,117 A | * | 6/1996 | Morisawa et al. | 475/281 |
| 5,683,325 A | * | 11/1997 | Moroto et al. | 475/276 |
| 5,743,824 A | * | 4/1998 | Park | 475/276 |
| 5,772,552 A | * | 6/1998 | Ibaraki et al. | 475/281 |

(Continued)

FOREIGN PATENT DOCUMENTS

JP  A 4-125345  4/1992

(Continued)

*Primary Examiner*—Tisha Lewis
(74) *Attorney, Agent, or Firm*—Oliff & Berridge, PLC

(57) ABSTRACT

A reduced rotation output unit for outputting a reduced rotation obtained by reducing rotation of an input shaft is arranged at one side of a planetary gear unit in an axial direction, a first clutch and a second clutch interposed between a second rotation element of the planetary gear unit, and a third rotation element and the input shaft are arranged at the other side of the planetary gear unit in the axial direction, and an output member is arranged between the first clutch, the second clutch and the planetary gear unit. Accordingly, it is possible to position the reduced rotation output unit and the planetary gear unit close to each other, and it is possible to make a transmission member that transmits the reduced rotation output from the reduced rotation output unit to the planetary gear unit short.

49 Claims, 27 Drawing Sheets

U.S. PATENT DOCUMENTS

| | | | |
|---|---|---|---|
| 6,110,069 A * | 8/2000 | Taniguchi et al. | 475/330 |
| 6,176,802 B1 | 1/2001 | Kasuya et al. | |
| 6,287,234 B1 | 9/2001 | Park | |
| 6,558,287 B1 * | 5/2003 | Hayabuchi et al. | 475/271 |
| 6,849,022 B1 * | 2/2005 | Miyazaki et al. | 475/275 |
| 6,860,831 B1 * | 3/2005 | Ziemer | 475/296 |

FOREIGN PATENT DOCUMENTS

| | | |
|---|---|---|
| JP | A 2000-274498 | 10/2000 |
| JP | A 2001-263438 | 9/2001 |

* cited by examiner

ENGAGEMENT TABLE

|   |   | C1 | C2 | C3 | B1 | B2 | B4 | F3 |
|---|---|---|---|---|---|---|---|---|
|   | P |  |  |  | ● |  |  |  |
|   | R |  |  | ○ | ○ |  | ○ |  |
|   | N |  |  |  | ● |  |  |  |
| D | 1st SPEED | ○ |  |  | ● |  | (○) | ○ |
| D | 2nd SPEED | ○ |  |  | ● | ○ |  |  |
| D | 3rd SPEED | ○ |  | ○ | ○ |  |  |  |
| D | 4th SPEED | ○ | ○ | ● |  |  |  |  |
| D | 5th SPEED |  | ○ | ○ | ○ |  |  |  |
| D | 6th SPEED |  | ○ |  | ● | ○ |  |  |

(○) WHEN ENGINE BRAKE TAKES PLACE

● ENGAGED, BUT NO TORQUE TRANSMISSION OCCURS

ENGAGEMENT TABLE

|   |   | C1 | C2 | C3 | B1 | B2 | B3 | B4 | F2 | F3 |
|---|---|---|---|---|---|---|---|---|---|---|
|   | P |   |   |   | ● |   |   |   |   |   |
|   | R |   |   | ○ | ○ |   |   | ○ |   |   |
|   | N |   |   |   | ● |   |   |   |   |   |
| D | 1st SPEED | ○ |   |   | ● |   |   | (○) |   | ○ |
|   | 2nd SPEED | ○ |   |   | ● | (○) | ○ |   | ○ |   |
|   | 3rd SPEED | ○ |   | ○ | ○ |   | ● |   |   |   |
|   | 4th SPEED | ○ | ○ | ● |   |   | ● |   |   |   |
|   | 5th SPEED |   | ○ | ○ |   |   | ● |   |   |   |
|   | 6th SPEED |   | ○ |   | ● | ○ | ● |   |   |   |

(○) WHEN ENGINE BRAKE TAKES PLACE  ● ENGAGED, BUT NO TORQUE TRANSMISSION OCCURS

ENGAGEMENT TABLE

|   |            | C1 | C2 | C3 | B2  | B3  | B4  | F2 | F3 |
|---|------------|----|----|----|-----|-----|-----|----|----|
|   | P          |    |    |    |     |     |     |    |    |
|   | R          |    |    | ○  |     |     | ○   |    |    |
|   | N          |    |    |    |     |     |     |    |    |
| D | 1st SPEED  | ○  |    |    |     |     | (○) |    | ○  |
|   | 2nd SPEED  | ○  |    |    | (○) | ○   |     | ○  |    |
|   | 3rd SPEED  | ○  |    | ○  |     | ●   |     |    |    |
|   | 4th SPEED  | ○  | ○  |    |     | ●   |     |    |    |
|   | 5th SPEED  | ○  |    | ○  |     | ●   |     |    |    |
|   | 6th SPEED  |    | ○  |    | ○   | ●   |     |    |    |

(○) WHEN ENGINE BRAKE TAKES PLACE

● ENGAGED, BUT NO TORQUE TRANSMISSION OCCURS

ENGAGEMENT TABLE

| | | C1 | C2 | C3 | B2 | B3 | B4 | F2 | F3 |
|---|---|---|---|---|---|---|---|---|---|
| | P | | | | | | | | |
| | R | | | ○ | | | ○ | | |
| | N | | | | | | | | |
| D | 1st SPEED | ○ | | | | | (○) | | ○ |
| | 2nd SPEED | ○ | | | (○) | ○ | | ○ | |
| | 3rd SPEED | ○ | | ○ | | ● | | | |
| | 4th SPEED | ○ | ○ | | | ● | | | |
| | 5th SPEED | | ○ | ○ | | ● | | | |
| | 6th SPEED | | ○ | | ○ | ● | | | |

(○) WHEN ENGINE BRAKE TAKES PLACE  ● ENGAGED, BUT NO TORQUE TRANSMISSION OCCURS

ENGAGEMENT TABLE

|   | | C1 | C2 | C3 | B1 | B2 | F3 |
|---|---|---|---|---|---|---|---|
| | P | | | | | | |
| | R | | | ○ | | ○ | |
| | N | | | | | | |
| D | 1st SPEED | ○ | | | | (○) | ○ |
| D | 2nd SPEED | ○ | | | ○ | | |
| D | 3rd SPEED | ○ | | ○ | | | |
| D | 4th SPEED | ○ | ○ | | | | |
| D | 5th SPEED | | ○ | ○ | | | |
| D | 6th SPEED | | ○ | | ○ | | |

(○) WHEN ENGINE BRAKE TAKES PLACE

ENGAGEMENT TABLE

|   |   | C1 | C2 | C3 | B1 | B2 | F3 |
|---|---|---|---|---|---|---|---|
|   | P |   |   |   |   |   |   |
|   | R |   |   | ○ |   | ○ |   |
|   | N |   |   |   |   |   |   |
| D | 1st SPEED | ○ |   |   |   | (○) | ○ |
|   | 2nd SPEED | ○ |   |   | ○ |   |   |
|   | 3rd SPEED | ○ |   | ○ |   |   |   |
|   | 4th SPEED | ○ | ○ |   |   |   |   |
|   | 5th SPEED |   | ○ | ○ |   |   |   |
|   | 6th SPEED |   | ○ |   | ○ |   |   |

(○) WHEN ENGINE BRAKE TAKES PLACE

ENGAGEMENT TABLE

|   |           | C1 | C2 | B1 | B2  | B3 | F3 |
|---|-----------|----|----|----|-----|----|----|
|   | P         |    |    |    |     |    |    |
|   | R         |    |    |    | ○   | ○  |    |
|   | N         |    |    |    |     |    |    |
| D | 1st SPEED | ○  |    |    | (○) |    | ○  |
| D | 2nd SPEED | ○  |    | ○  |     |    |    |
| D | 3rd SPEED | ○  |    |    |     | ○  |    |
| D | 4th SPEED | ○  | ○  |    |     |    |    |
| D | 5th SPEED |    | ○  |    |     | ○  |    |
| D | 6th SPEED |    | ○  | ○  |     |    |    |

(○) WHEN ENGINE BRAKE TAKES PLACE

ENGAGEMENT TABLE

|   |          | C1 | C2 | C3 | B1  | B2 | F3 |
|---|----------|----|----|----|-----|----|----|
|   | P        |    |    |    |     |    |    |
|   | R        |    | ○  |    | ○   |    |    |
|   | N        |    |    |    | ○   |    |    |
| D | 1st SPEED| ○  |    |    | (○) |    | ○  |
|   | 2nd SPEED| ○  |    |    |     | ○  |    |
|   | 3rd SPEED| ○  | ○  |    |     |    |    |
|   | 4th SPEED| ○  |    | ○  |     |    |    |
|   | 5th SPEED|    | ○  | ○  |     |    |    |
|   | 6th SPEED|    |    | ○  |     | ○  |    |

(○) WHEN ENGINE BRAKE TAKES PLACE

ENGAGEMENT TABLE

|   |   | C1 | C2 | C3 | B1 | B2 | F3 |
|---|---|---|---|---|---|---|---|
|   | P |   |   |   |   |   |   |
|   | R |   | ○ |   | ○ |   |   |
|   | N |   |   |   | ○ |   |   |
| D | 1st SPEED | ○ |   |   | (○) |   | ○ |
|   | 2nd SPEED | ○ |   |   |   | ○ |   |
|   | 3rd SPEED | ○ | ○ |   |   |   |   |
|   | 4th SPEED | ○ |   | ○ |   |   |   |
|   | 5th SPEED |   | ○ | ○ |   |   |   |
|   | 6th SPEED |   |   | ○ |   | ○ |   |

(○) WHEN ENGINE BRAKE TAKES PLACE

ENGAGEMENT TABLE

|   |           | C2 | C3 | B1  | B2 | B3 | F3 |
|---|-----------|----|----|-----|----|----|----|
|   | P         |    |    |     |    |    |    |
|   | R         | ○  |    | ○   |    |    |    |
|   | N         |    |    | ○   |    |    |    |
| D | 1st SPEED |    |    | (○) |    | ○  | ○  |
|   | 2nd SPEED |    |    |     | ○  | ○  |    |
|   | 3rd SPEED | ○  |    |     |    | ○  |    |
|   | 4th SPEED |    | ○  |     |    | ○  |    |
|   | 5th SPEED | ○  | ○  |     |    |    |    |
|   | 6th SPEED |    | ○  |     | ○  |    |    |

(○) WHEN ENGINE BRAKE TAKES PLACE

AUTOMATIC TRANSMISSION

This application claims priority from JP 2002-382147, filed Dec. 27, 2002; JP 2002-204894, filed Jul. 12, 2002; and JP 2002-098020, filed Mar. 29, 2002 through PCT/JP 03/04112, filed Mar. 31, 2003, the disclosures of which are incorporated herein by reference thereto.

TECHNICAL FIELD

The invention relates to an automatic transmission mounted in a vehicle or the like, and more particularly to an arrangement of an automatic transmission in which a multi-speed shift that can result from selectively inputting a reduced rotation to one rotation element in a planetary gear unit.

BACKGROUND OF THE INVENTION

In general, in an automatic transmission mounted in a vehicle or the like, the structure is provided with a planetary gear unit in which two lines of planetary gears are connected, and a planetary gear which can selectively output a reduced rotation obtained by reducing a rotation of an input shaft (for example, refer to Japanese Patent Laid-Open Publications Nos. 4-125345 and 2000-274498). The art described in these documents achieves, for example, six forward speeds and one backward speed by selectively inputting the reduced rotation from the planetary gear via a clutch to one rotation element in the planetary gear unit having, for example, four rotation elements.

Note that, the automatic transmission described above is provided with a plurality of clutches for inputting the rotation of the input shaft to the rotation elements in the planetary gear unit and the rotation elements in the planetary gear. However, depending on the arrangement of the plurality of clutches, there is a case when a member that transmits the reduced rotation of the planetary gear to the rotation elements in the planetary gear unit must be made longer in an axial direction. Further, in particular, in an automatic transmission used in a FF (front engine and front drive) vehicle, or the like, an automatic transmission is used that has a gear for outputting an output rotation of the automatic transmission to another parallel shaft, a so-called counter gear, that is provided for a driven wheel. In the case that the counter gear is arranged at the same manner between the planetary gear unit and the planetary gear, the member that transmits the reduced rotation has to be made longer in an axial direction depending on the arrangement of the counter gear.

SUMMARY OF THE INVENTION

Making the member that transmits the reduced rotation longer requires, in other words, making the member that transmits a larger torque longer. Providing a long member capable of enduring the large torque requires that the member be a comparatively thick member, whereby provision of a compact configuration of the automatic transmission is inhibited. Further, the member described above becomes heavier, thereby inhibiting weight saving in the automatic transmission. Further, inertia (inertia force) is increased, and there is a tendency for shift shock to be generated due to a reduction in controllability of the automatic transmission.

Accordingly, an object of the invention is to provide an automatic transmission in which a reduced rotation output unit is arranged at one side of a planetary gear unit in an axial direction, first and second clutches are arranged at the other side of the planetary gear unit in the axial direction, and an output member is arranged between the first and second clutches and the planetary gear unit. Accordingly, the problem described above is solved.

The automatic transmission according to the invention is useful for an automatic transmission mounted in vehicles, such as passenger cars, trucks, buses, or the like, and is more particularly suitable for use in vehicles requiring compactness and reduced weight for ease of vehicle mounting, and in addition, in vehicles requiring reduced shift shock.

BRIEF DESCRIPTION OF THE DRAWINGS

The invention will be described with reference to the drawings, in which.

DETAILED DESCRIPTION OF PREFERRED EMBODIMENTS

Figure 1:
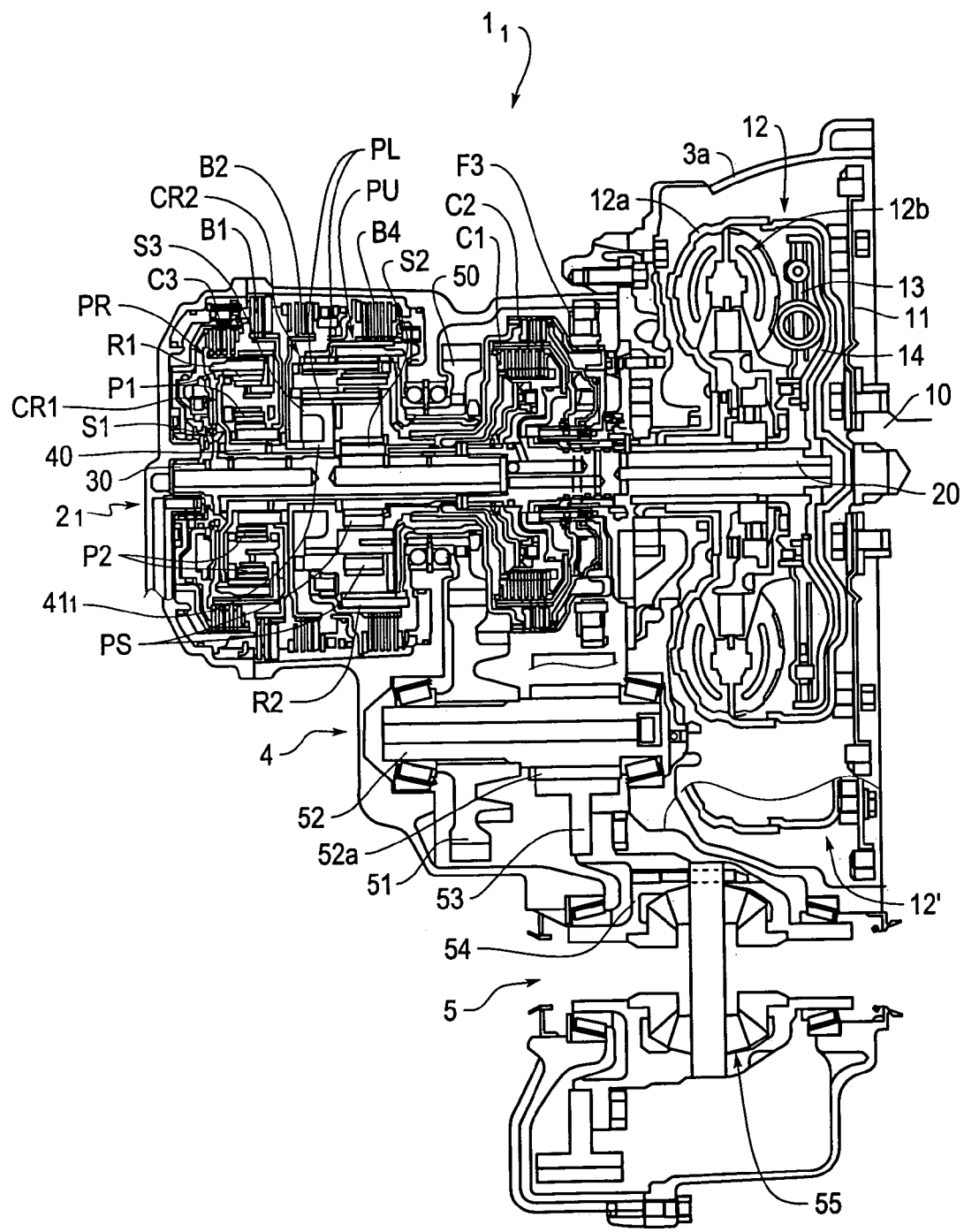
FIG. 1 is a cross sectional development view showing an automatic transmission in accordance with a first embodiment.

The invention will be described in detail. However, broadly described, an automatic transmission includes an input shaft that rotates on the basis of an output rotation of a drive power source; a planetary gear unit having first, second, third and fourth rotation elements; a reduced rotation output unit for selectively outputting a reduced rotation obtained by reducing rotation of the input shaft to the first rotation element; a first clutch interposed between the input shaft and the second rotation element; a second clutch interposed between the input shaft and the third rotation element; and an output member that outputs rotation of the fourth rotation element to a driven wheel transmission mechanism, in which the reduced rotation output unit is arranged at one side of the planetary gear unit in an axial direction, the first and second clutches are arranged at the other side of the planetary gear unit in the axial direction, and the output member is arranged between the first and second clutches and the planetary gear unit.

As a result, it is possible to position the reduced rotation output unit and the planetary gear close to each other without having to provide, for example, a clutch and an output member therebetween, and it is possible to make a member (for example, a transmission member, a sleeve member, or the like) that transmits the reduced rotation comparatively short. Therefore, it is possible to achieve a compact structure and weight saving of the automatic transmission, and it is possible to reduce the inertia (the inertia force). Accordingly, it is possible to improve the controllability of the automatic transmission and it is possible to reduce the generation of shift shock.

Also, in the invention, an automatic transmission is configured such that the first clutch is connected to the second rotation element via an inner peripheral side of the output member, and the second clutch is connected to the third rotation element via an outer peripheral side of the first clutch and an inner peripheral side of the output member.

As a result, it is possible to prevent the member that connects each of the rotation elements from being complicated, and it is possible to make the automatic transmission compact.

In a variant of the invention, the configuration is such that the first clutch has a friction disk that is spline engaged at an inner peripheral side to a member that connects to the second rotation element; a first clutch drum which internally houses a hydraulic servo, which is spline engaged to an outer peripheral side of the friction disk, and which is connected to the input shaft; a first piston that presses the friction disk; and a first hydraulic servo oil pressure chamber which is formed between an inner peripheral side of the first piston and the input shaft and between an outer peripheral side and the first clutch drum by sealing in a fluid tight manner, and the second clutch has a friction disk that is spline engaged at an inner peripheral side to the first clutch drum; a second clutch drum which internally houses a hydraulic servo, which is spline engaged to an outer peripheral side of the friction disk, and which is connected to the third rotation element; a second piston that presses the friction disk; and a second hydraulic servo oil pressure chamber formed between an inner peripheral side and an outer peripheral side of the second piston and the second clutch drum by sealing in a fluid tight manner.

As a result, the first clutch is structured such that the second clutch is positioned at an outer peripheral side thereof, and thus can not have its diameter enlarged to the outer peripheral side. However, it is possible to ensure that the hydraulic servo, and more particularly, a pressure receiving area of the first hydraulic servo oil chamber, is large at the inner peripheral side by arranging the hydraulic servo on the input shaft (in comparison to when, for example, the hydraulic servo is provided on the boss portion), and it is possible to increase a capacity of the first clutch.

Further, in another variant of the invention, the configuration is such that the first clutch has a friction disk which is spline engaged at an inner peripheral side to a member that connects to the second rotation element; a first clutch drum which internally houses a hydraulic servo, which is spline engaged to an outer peripheral side of the friction disk, and which is connected to the input shaft; a first piston that presses the friction disk; and a first hydraulic servo oil pressure chamber formed between an inner peripheral side of the first piston and the input shaft, and between an outer peripheral side and the first clutch drum by sealing in a fluid tight manner, and the second clutch has a friction disk which is spline engaged at an inner peripheral side to the third rotation element; a second clutch drum which internally houses a hydraulic servo, which is spline engaged to an outer peripheral side of the friction disk, and which is arranged at an outer peripheral side of the first clutch drum and connected to the input shaft; a second piston that presses the friction disk; and a second hydraulic servo oil pressure chamber formed between an inner peripheral side and an outer peripheral side of the second piston and the second clutch drum by sealing in a fluid tight manner.

As a result, the first clutch is structured such that the second clutch is positioned at an outer peripheral side thereof, and thus cannot have its diameter enlarged at the outer peripheral side. However, it is possible to ensure that the hydraulic servo, and more particularly, a pressure receiving area of the first hydraulic servo oil chamber, is large at the inner peripheral side by arranging the hydraulic servo on the input shaft (in comparison to when, for example, the hydraulic servo is provided on the boss portion), and it is possible to increase a capacity of the first clutch.

In the invention, the reduced rotation output unit is configured so as to have a speed reduction planetary gear, and the speed reduction planetary gear, the planetary gear unit and the output member are provided coaxially with the input shaft.

As a result, in particular, in the case that the automatic transmission is mounted in an FF vehicle, it is possible to make the driven wheel transmission mechanism (for example, a counter shaft portion or the like) compact (in comparison with the case, for example, that the speed reduction planetary gear and the like are provided on another shaft). Thus, for example, it is possible to prevent interference, for example, with a vehicle body member, and it is possible to improve the ease of mounting the automatic transmission.

In a form of the invention, the reduced rotation output unit is configured to include the speed reduction planetary gear which has an input rotation element that inputs rotation of the input shaft, a fixed element that fixes rotation, an output rotation element that is always connected to the first rotation element, and a first brake capable of fixing rotation of the fixed element, in which reduced rotation can be output by engaging the first brake.

As a result, the first brake is capable of fixing the rotation of the fixed element connects and disconnects the output of the reduced rotation. Accordingly, it is possible to make the first brake compact, for example, in comparison with a clutch connecting and disconnecting the reduced rotation, and it is possible to position the reduced rotation output unit close to the planetary gear unit. Thus, it is possible to achieve a compact structure and weight saving of the automatic transmission.

In another form of the invention, the reduced rotation output unit is configured so as to include the speed reduction planetary gear which has an input rotation element that inputs rotation of the input shaft, a fixed element that fixes rotation, and an output rotation element that is always connected to the first rotation element, a third clutch interposed between the input shaft and the input rotation element, and a first brake capable of fixing rotation of the fixed element, in which reduced rotation can be output by engaging the third clutch and the first brake.

As a result, the third clutch interposed between the input shaft and the input rotation element and the first brake is capable of fixing the rotation of the fixed element connect and disconnect the output of the reduced rotation. Accordingly, it is possible to make the third clutch and the first brake compact, for example, in comparison with a clutch connecting and disconnecting the reduced rotation, and it is possible to arrange the reduced rotation output unit close to the planetary gear unit. Thus, it is possible to achieve a compact structure and weight saving of the automatic transmission.

In yet another form of the invention, the reduced rotation output unit is configured so as to include the speed reduction planetary gear which has an input rotation element that always inputs rotation of the input shaft, a fixed element that always fixes rotation, and an output rotation element that always connects to the first rotation element, and a third clutch interposed between the input shaft and the input rotation element, in which reduced rotation can be output by engaging the third clutch.

As a result, the third clutch, interposed between the input shaft and the input rotation element, connects and disconnects of the output of the reduced rotation. Accordingly, it is possible to make the third clutch compact, for example, in comparison with a clutch connecting and disconnecting the reduced rotation, and it is possible to arrange the reduced rotation output unit close to the planetary gear unit. Therefore, it is possible to achieve a compact structure and weight saving of the automatic transmission.

In another form of the invention, the reduced rotation output unit is configured so as to include the speed reduction planetary gear which has an input rotation element that always inputs rotation of the input shaft, a fixed element that always fixes rotation, an output rotation element that connects to the first rotation element, and a third clutch interposed between the first rotation element and the output rotation element, in which reduced rotation can be output by engaging the third clutch.

As a result, the third clutch, interposed between the first rotation element and the output rotation element, connects and disconnects the output of the reduced rotation. Accordingly, for example, by disengaging the third clutch, it is possible to make the rotation of the input shaft input to the input rotation element rotate idly using the planetary gear, while it is also possible to selectively output reduced rotation to the first rotation element. Thus, it is possible to directly fix, for example, the element fixing the rotation to the case, or the like, without providing a brake, and it is possible to achieve a compact structure and weight saving of the automatic transmission.

In many forms of the invention, the first clutch, the second clutch and the third clutch have respective hydraulic servos, the hydraulic servo of the second clutch arranged on a first boss portion that extends from one end of the case and communicates with an oil passage provided in the first boss portion, the hydraulic servo of the first clutch being arranged on one end of the input shaft and communicates with an oil passage in one end of the first boss portion or the case via an oil passage provided within the input shaft, and the hydraulic servo of the third clutch arranged on a second boss portion that extends from the other end of the case or the other end of the input shaft and communicates with an oil passage provided in the second boss portion or an oil passage provided within the input shaft.

As a result, the hydraulic servo of the first clutch is provided on one end of the input shaft. Accordingly, it is possible to supply the oil to the hydraulic servo by supplying the oil to the oil passage provided within the input shaft while preventing leakage from the case by using a pair of sealing rings, for example, without providing a sealing ring between the input shaft and the hydraulic servo. Further, the hydraulic servos of the second and third clutches can supply the oil from the boss portion that extends from the case, for example, without passing it through other members, that is, the oil can be supplied by respectively providing a pair of sealing rings. Accordingly, the oil can be supplied to the three hydraulic servos by simply arranging the respective pairs of sealing rings. Thus, it is possible to minimize sliding resistance that results from the sealing ring, and it is possible to improve the efficiency of the automatic transmission.

In some forms of the invention, the first clutch, the second clutch and the third clutch have respective hydraulic servos, the hydraulic servo of the second clutch being arranged on a first boss portion that extends from one end of the case and communicates with an oil passage provided in the first boss portion, the hydraulic servo of the first clutch being arranged on one end of the input shaft and communicates with an oil passage in one end of the first boss portion or the case via an oil passage provided within the input shaft, and the hydraulic servo of the third clutch being arranged on one end of the input shaft and communicates with an oil passage arranged on the other end of the input shaft and provided within the input shaft.

As a result, the hydraulic servo of the first clutch is provided on one end of the input shaft. Accordingly, it is possible to supply the oil to the hydraulic servo by supplying the oil to the oil passage provided within the input shaft while preventing leakage from the case by using a pair of sealing rings, for example, without providing a sealing ring between the input shaft and the hydraulic servo. The hydraulic servo of the second clutch can supply the oil from the boss portion that extends from the case, for example, without passing it through other members. Further, because the hydraulic servo of the third clutch is arranged on the input shaft, and the oil is supplied to the oil passage provided within the input shaft while preventing leakage from the case by using a pair of sealing rings, the oil can be supplied to the hydraulic servo, for example, without providing a sealing ring between the input shaft and the hydraulic servo. In other words, the oil can be supplied by arranging a pair of sealing rings, respectively. Accordingly, the oil can be supplied to three hydraulic servos by simply providing a respective pair of sealing rings. Thus, it is possible to minimize sliding resistance that results from the sealing ring, and it is possible to improve the efficiency of the automatic transmission. Further, because the hydraulic servos of the first and third clutches are arranged on the input shaft, and are respectively arranged so as to be separated to one end side and the other end side of the input shaft, it is not necessary to provide the oil passages for the hydraulic servos such that they overlap within the input shaft. Thus, it is possible to make the input shaft narrow and it is possible to make the automatic transmission compact.

In many forms of the invention, the third clutch is configured to have a friction disk that is spline engaged at an inner peripheral side to a member connected to the input rotation element or the output rotation element of the planetary gear, a third clutch drum which internally houses a hydraulic servo and which is spline engaged to an outer peripheral side of the friction disk, a third piston that presses the friction disk, and a first hydraulic servo oil pressure chamber formed between an inner peripheral side and an outer peripheral side of the third piston and the third clutch drum by sealing in a fluid tight manner. The friction disk is arranged at a position where at least a part thereof overlaps with an outer peripheral side of the speed reduction planetary gear in a diametrical direction, the third clutch drum is arranged so as to open in the direction of the speed reduction planetary gear, and the speed reduction planetary gear is positioned between the hydraulic servo of the third clutch and the planetary gear unit in an axial direction.

As a result, the friction disk is arranged at the outer peripheral side of the speed reduction planetary gear in the axial direction, and it is possible to make the automatic transmission compact in the axial direction. Further, the speed reduction planetary gear is arranged between the hydraulic servo of the third clutch and the planetary gear unit in the axial direction. Accordingly, the speed reduction planetary gear and the planetary gear unit can be positioned adjacent to each other (as the hydraulic servo of the third clutch is not provided between the speed reduction planetary gear and the planetary gear unit), and it is possible to make the member (for example, the transmission member, the sleeve member or the like), that transmits the reduced rotation, comparatively short. Accordingly, it is possible to achieve a compact structure and weight saving of the automatic transmission, and it is possible to reduce the inertia (the inertia force). Therefore, it is possible to improve the controllability of the automatic transmission, and it is possible to reduce the generation of shift shock.

In the invention, the speed reduction planetary gear can be configured from a double pinion planetary gear. As a result, it is possible to output the rotation of the input shaft as the reduced rotation and, in addition, the respective rotation elements, such as the planetary gear unit and the speed reduction planetary gear, do not need to be large even in the case that a gear ratio of the automatic transmission is set favorably. Thus high speed rotation can be inhibited. Accordingly, it is possible to make the automatic transmission compact.

In the invention, the speed reduction planetary gear can have a first carrier that corresponds to the input rotation element, a first sun gear that corresponds to the fixed element, and a first ring gear corresponding to the output rotation element. As a result, it is possible to output the rotation of the input shaft as the reduced rotation.

Alternatively, the speed reduction planetary gear can have a first sun gear that corresponds to the input rotation element, a first carrier that corresponds to the fixed element, and a first ring gear that corresponds to the output rotation element. As a result, it is possible to output the rotation of the input shaft as the reduced rotation.

Further, in the invention, the planetary gear unit can be a Ravigneaux type planetary gear configured from a second sun gear, a third sun gear, a second carrier and a second ring gear. The first rotation element is configured from the second sun gear which inputs the output rotation of the reduced rotation output unit and which is selectively fixable on the basis of engagement of the second brake, the second rotation element is configured from the third sun gear which inputs the rotation of the input shaft on the basis of engagement of the first clutch, the third rotation element is configured from the second carrier which has a long pinion that meshes with the second sun gear and a short pinion that meshes with the third sun gear, which is selectively fixable on the basis of engagement of the third brake, and which inputs the rotation of the input shaft on the basis of engagement of the second clutch, and the fourth rotation element is configured from the second ring gear which meshes with the long pinion.

As a result, it is possible to position the reduced rotation output unit and the planetary gear unit close to each other while it is possible to achieve, for example, six forward speeds and one backward speed. Further, it is possible to make the member that transmits the reduced rotation comparatively short.

When the planetary gear unit is as above, in the invention, the configuration includes a first one-way clutch for restricting the rotation of the carrier to one direction which is provided in parallel to the third brake. As a result, it is possible to achieve, for example, a forward first speed state at a time of normal running on the basis of engagement of the first clutch and the first one-way clutch. Accordingly, it is possible to smoothly achieve the forward first speed, for example, at a time of changing from a non-running range to a running range.

In such a planetary gear unit of the invention, the configuration is such that the third brake is arranged at an outer peripheral side of the planetary gear unit, and the first one-way clutch is arranged adjacent to the second clutch.

As a result, the configuration realizes the backward first speed by engaging the third brake along with engagement of the third clutch that connects and disconnects the reduced rotation while the first one-way clutch is engaged along with the first clutch that inputs the rotation of the input shaft when the forward first speed is realized. Accordingly, a reaction force torque applied to the third brake becomes greater than a reaction force torque applied to the first one-way clutch. Therefore, it is possible to make the member that transmits the torque resulting from the reduced rotation to the third brake comparatively short, by positioning the third brake close to the outer peripheral side of the planetary gear unit. Further, in the case that the first one-way clutch is positioned close to the second clutch and apart from the planetary gear unit, it is not necessary to make the member that connects the second clutch and the second carrier large. Further, because the first one-way clutch is not positioned at the outer periphery of the planetary gear unit, it is possible to improve the design freedom of the brake. Accordingly, it is possible to achieve a compact structure and weight saving of the automatic transmission.

Alternatively, in such a planetary gear unit of the invention, the configuration is such that the third brake and the first one-way clutch are arranged at an outer peripheral side of the planetary gear unit.

As a result, it is possible to position the output member close to, for example, the torque converter (because the portion where the first and second clutches are arranged can be made compact in the axial direction in comparison with the case, for example, that the first one-way clutch is provided adjacent to the first clutch). Accordingly, it is possible to make the driven wheel transmission mechanism portion (in particular, the counter shaft portion) compact in the axial direction.

In such a planetary gear unit of the invention, the configuration includes a second one-way clutch which is arranged in parallel to the second brake and which restricts the rotation of the second sun gear to one direction on the basis of the engagement of a fourth brake. As a result, it is possible to smoothly execute shifting, for example, from the forward second speed to the forward third speed.

Such a configuration includes a sleeve member which is interposed between the reduced rotation output unit and the second sun gear and which connects the output rotation of the reduced rotation output unit to the rotation of the second sun gear, and an inner race of the second one-way clutch and the sleeve member are integrally formed. As a result, it is possible to make the automatic transmission compact while shifting from the forward second speed to the forward third speed can be smoothly executed.

As a result, it is possible to position the reduced rotation output unit and the planetary gear unit close to each other while the six forward speeds and the one backward speed can be achieved. Accordingly, it is possible to make the member that transmits the reduced rotation comparatively short. Therefore, it is possible to achieve a compact structure and weight saving in the automatic transmission, and it is possible to make the inertia (the inertia force) small. Thus, it is possible to improve the controllability of the automatic transmission, and to reduce the generation of shift shock.

Further, the configuration is such that a forward first speed is achieved on the basis of engagement of the first clutch and the third brake, a forward second speed is achieved on the basis of engagement of the first clutch and the second brake, a forward third speed results from engaging the first clutch and setting a state in which reduced rotation is output from the reduced rotation output unit, a forward fourth speed is achieved on the basis of engagement of the first clutch and the second clutch, a forward fifth speed results from engaging the second clutch and setting a state in which the reduced rotation is output from the reduced rotation output unit, a forward sixth speed is achieved on the basis of engagement of the second clutch and the second brake, and a backward first speed results from engaging the third brake and setting a state in which the reduced rotation is output from the reduced rotation output unit, respectively.

As a result, the configuration can realize the six forward speeds and the one backward speed. Because both the first and second clutches are engaged in the forward fourth speed, that is, the directly connected state is achieved in the forward fourth speed, it is possible to set a gear ratio in the forward fifth speed and the forward sixth speed so that is high. In the case, in particular, of a vehicle running at a high speed for which mounting has been executed, it is possible to make the engine speed low, and it is possible to contribute to quietness of the vehicle when running at high speed.

In a variation of the planetary gear unit of the invention, the planetary gear unit is configured from a first simple planetary gear having a second sun gear, a second carrier and a second ring gear, and a second simple planetary gear having a third sun gear, a third carrier and a third ring gear. The first rotation element is configured from the third ring gear which inputs the output rotation of the double pinion planetary gear and which is selectively fixable on the basis of engagement of the second brake, the second rotation element is configured from the second ring gear and the third carrier which is selectively fixable on the basis of engagement of the third brake and which inputs the rotation of the input shaft on the basis of engagement of the first clutch, the third rotation element is configured from the third sun gear and the second sun gear which inputs the rotation of the input shaft on the basis of engagement of the second clutch, and the fourth rotation element is configured from the second carrier which meshes with the second sun gear and the second ring gear.

As a result, it is possible to position the reduced rotation output unit and the planetary gear unit close to each other while it is also possible to achieve, for example, the six forward speeds and the one backward speed. Further, it is possible to make the member that transmits the reduced rotation comparatively short.

In this variation of the invention, the configuration is provided with a first one-way clutch which is arranged in parallel to the third brake and which restricts the rotation of the third carrier and the second ring gear to one direction. As a result, the configuration is able to achieve the forward first speed, for example, at a time of normal running on the basis of engagement of the second clutch and the first one-way clutch. Accordingly, it is possible to smoothly achieve the forward first speed, for example, at a time of changing from a non-running range to a running range.

Further, in this variation of the invention, the configuration is such that the third brake and the first one-way clutch are arranged at an outer peripheral side of the planetary gear unit. As a result, it is possible to position the output member close to, for example, the torque converter (because the portion where the first and second clutches are arranged can be made compact in the axial direction in comparison with the case, for example, where the first one-way clutch is positioned adjacent to the second clutch). Accordingly, it is possible to make the driven wheel transmission mechanism portion (in particular, the counter shaft portion) compact in the axial direction.

In the variation of the invention, that configuration is such that an inner race of the first one-way clutch and the second ring gear are integrally formed. As a result, it is possible to make the automatic transmission compact, while at the same time it is possible to smoothly achieve the forward first speed, for example, at a time of changing from a non-running range to a running range.

Also in this variation of the invention, the configuration includes a second one-way clutch which is arranged in parallel to the second brake and which restricts the rotation of the third ring gear to one direction on the basis of engagement of the fourth brake. As a result, it is possible to smoothly execute shifting, for example, from the forward second to the forward third.

As a result, the configuration makes it is possible to position the reduced rotation output unit and the planetary gear unit close to each other while the six forward speeds and the one backward speed can be achieved. Accordingly, it is possible to make the member that transmits the reduced rotation comparatively short. Therefore, it is possible to achieve a compact structure and weight saving in the automatic transmission, and it is possible to make the inertia (the inertia force) small. Accordingly, it is possible to improve the controllability of the automatic transmission, and it is possible to reduce generation of shift shock.

In the variation of the invention, the configuration is such that a forward first speed is achieved on the basis of engagement of the second clutch and the third brake, a forward second speed is achieved on the basis of engagement of the second clutch and the second brake, a forward third speed results from engaging the second clutch and setting a state in which reduced rotation is output from the reduced rotation output unit, a forward fourth speed is achieved on the basis of engagement of the first clutch and the second clutch, a forward fifth speed results from engaging the first clutch and setting a state in which reduced rotation is output from the reduced rotation output unit, a forward sixth speed is achieved on the basis of engagement of the first clutch and the second brake, and a backward first speed results from engaging the third brake and setting a state in which reduced rotation is output from the reduced rotation output unit, respectively.

As a result, the configuration can realize the six forward speeds and the one backward speed. Because both the first and second clutches are engaged with the forward fourth speed, that is, the directly connected state is achieved in the forward fourth speed, it is possible to set a gear ratio in the forward fifth speed and the forward sixth speed so that it is high; in the case, in particular, of a vehicle running at a high speed for which mounting has been executed, it is possible to make the engine speed low, and it is possible to contribute to the quietness of the vehicle when running at high speed.

In a further variation of the invention, the planetary gear unit can be a Ravigneaux type planetary gear configured from a second sun gear, a third sun gear, a second carrier and a second ring gear. The first rotation element is configured from the third sun gear which is capable of inputting the output rotation of the reduced rotation output unit, the second rotation element is configured from the second carrier which has a long pinion engaged with the second sun gear and a short pinion engaged with the third sun gear, which is selectively fixable on the basis of engagement of the second brake, and which inputs the rotation of the input shaft on the basis of engagement of the first clutch, the third rotation element is configured from the second sun gear which inputs the rotation of the input shaft on the basis of engagement of the second clutch and which is selectively fixable on the basis of engagement of the third brake, and the fourth rotation element is configured from the second ring gear which meshes with the long pinion.

As a result, it is possible to position the reduced rotation output unit and the planetary gear unit close to each other while it is possible to achieve, for example, the six forward speeds and the one backward speed. Further, it is possible to make the member that transmits the reduced rotation comparatively short.

In this further variation of the invention, the configuration includes a first one-way clutch for restricting the rotation of the second carrier to one direction which is provided in parallel to the second brake. As a result, it is possible to achieve, for example, a forward first speed state at a time of normal running on the basis of engagement of the third clutch and the first one-way clutch. Accordingly, it is possible to smoothly achieve the forward first speed, for example, at a time of changing from a non-running range to a running range.

Also, in this further variation of the invention, the configuration is such that the second brake and the first one-way clutch are arranged at an outer peripheral side of the planetary gear unit. As a result, it is possible to position the output member close to, for example, the torque converter (because the portion where the first and second clutches are arranged can be made compact in the axial direction in comparison with the case, for example, where the first one-way clutch is arranged adjacent to the first clutch). Accordingly, it is possible to make the driven wheel transmission mechanism portion (in particular, the counter shaft portion) compact in the axial direction.

As a result, the configuration makes it is possible to position the reduced rotation output unit and the planetary gear unit close to each other while the six forward speeds and the one backward speed can be achieved. Accordingly, it is possible to make the member that transmits the reduced rotation comparatively short. Therefore, it is possible to achieve a compact structure and weight saving of the automatic transmission, and it is possible to make the inertia (the inertia force) small. Therefore, it is possible to improve the controllability of the automatic transmission, and it is possible to reduce the generation of shift shock.

Additionally, in the further variation of the invention, the configuration is such that a forward first speed results from engaging the second brake and setting a state in which reduced rotation is output from the reduced rotation output unit, a forward second speed results from engaging the third brake and setting a state in which reduced rotation is output from the reduced rotation output unit, a forward third speed results from engaging the second clutch and setting a state in which reduced rotation is output from the reduced rotation output unit, a forward fourth speed results from engaging the first clutch and setting a state in which reduced rotation is output from the reduced rotation output unit, a forward fifth speed is achieved on the basis of engagement of the first clutch and the second clutch, a forward sixth speed is achieved on the basis of engagement of the first clutch and the third brake, and a backward first speed is achieved on the basis of engagement of the second clutch and the second brake, respectively.

As a result, the configuration can realize the six forward speeds and the one backward speed. Because the first and second clutches are engaged in the forward fifth speed, that is, the directly connected state is achieved, it is possible to output the reduced rotation throughout the four shift speeds from the forward first speed to the forward fourth speed. It is also possible to execute finely differentiated shifting in a low middle speed range of the vehicle. Accordingly, in particular, in the low middle speed range of the vehicle, it is possible to fully use the rotation speed range so as to realize maximum efficiency of the drive power source, for example, the engine, or the like. Accordingly, it is possible to promote improved fuel consumption. Further, because the directly connected state is achieved in the forward fifth speed, it is possible to set only the forward sixth speed as overdrive, and it is possible to make a final gear ratio small in comparison with an automatic transmission, for example, in which the directly connected state is achieved in the forward fourth speed, and the forward fifth speed and the forward sixth speed constitute overdrive. Therefore, for example, it is possible to make the diameter of the differential ring gear of the differential portion small and, thus, it is possible to shorten the distance between the input shaft and the shaft of the differential portion. In particular, in the case that the automatic transmission is mounted in an FF vehicle, it is possible to make the automatic transmission compact.

Lastly, in the invention, the driven wheel transmission mechanism has a differential portion that outputs rotation to the driven wheel, and a counter shaft portion that engages with the differential portion. Further, the output member is configured from a counter gear engaged with the counter shaft portion. As a result, it is possible to mount the automatic transmission, for example, in a FF vehicle.

A description will be given below of a first embodiment according to the invention with reference to FIGS. 1 to 5.

An automatic transmission $1_1$ in accordance with the first embodiment of the invention is preferably used, in particular, for a vehicle having a FF (front engine and front drive) structure, and has a case 3 formed from a housing case 3a and a transmission case 3b is shown in FIG. 1. A torque converter 12 is arranged within the housing case 3a, and an automatic speed change mechanism $2_1$, a counter shaft portion (a driven wheel transmission mechanism) 4 and a differential portion (a driven wheel transmission mechanism) 5 are arranged within the transmission case 3b. The torque converter 12 is arranged on an axis that centers on an input shaft 20 of the automatic speed change mechanism $2_1$ that is coaxial with an output shaft 10, for example, of an engine (not shown). The automatic speed change mechanism $2_1$ is arranged on an axis that centers on the output shaft 10 of the engine, that is, a center shaft 30 that is coaxial with the input shaft 20. Further, the counter shaft portion 4 is arranged on a counter shaft 52 that is parallel to the input shaft 20 and the center shaft 30, and the differential portion 5 is arranged on a shaft that is parallel to the counter shaft 52 in such a manner as to have left and right vehicle axles (not shown).

Note that the cross sectional development view shown in FIG. 1 shows the automatic transmission $1_1$ when expanded across a plane. The input shaft 20, the center shaft 30, the counter shaft 52 and the right and left axles (not shown) are arranged so as to have a positional relationship resembling a "<" when viewed from the side. In particular, reference numeral 12' in FIG. 1 shows the positional relationship of the torque converter with respect to the counter shaft 52.

A disc-shaped member 11 is attached to the output shaft 10 of the engine described above, and an outer peripheral side of the disc-shaped member 11 is connected to a pump impeller 12a of the torque converter 12. Further, a turbine runner 12b of the torque converter 12 is connected at an inner peripheral side thereof to a damper apparatus 13 that absorbs torque fluctuation. An outer peripheral side of the damper apparatus 13 is connected to a piston member 14 of a lockup clutch which can be selectively engaged with the pump impeller 12a and the piston member 14 is connected to the input shaft 20 of the automatic speed change mechanism $2_1$. In other words, in a state in which the piston member 14 is not engaged with the pump impeller 12a, the torque of the engine (not shown) is transmitted to the input shaft 20 via the torque converter 12, and in a state in which the piston member 14 meshes with the pump impeller 12a, the output shaft 10 and the input shaft 20 are in a directly coupled state. In the directly coupled state the torque of the engine is directly transmitted to the input shaft 20.

Figure 2:
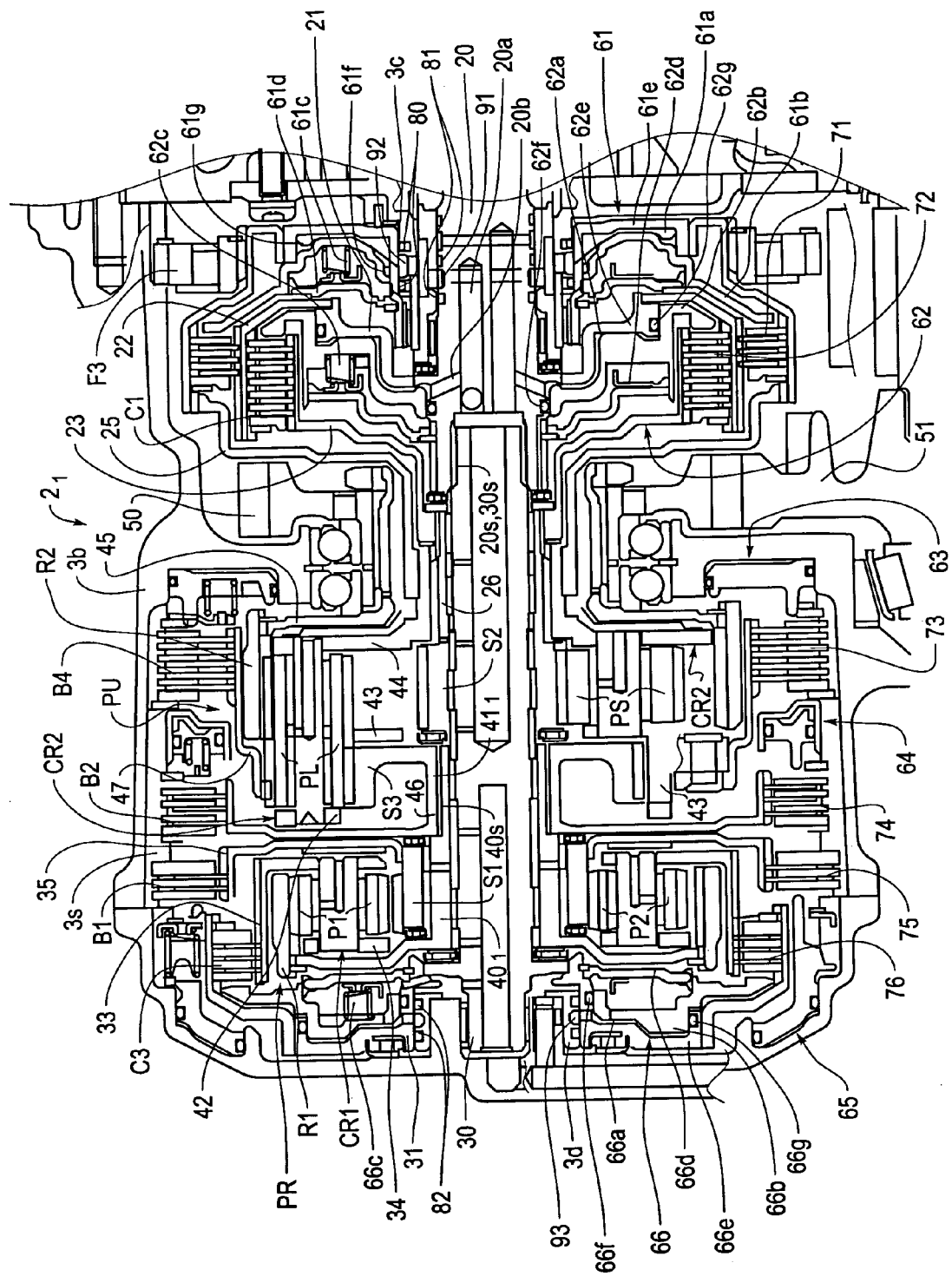
FIG. 2 is a cross sectional view showing an automatic speed change mechanism of the automatic transmission in accordance with the first embodiment.

Next, a description will be given of the automatic transmission $2_1$ with reference to FIG. 2. As shown in FIG. 2, a spline 20s is formed in an inner peripheral side of one end of the input shaft 20, that is, the one end is at the opposite side to the torque converter 12, and is engaged with a spline 30s formed in an outer peripheral side of one end of the center shaft 30. Thus, the input shaft 20 and the center shaft 30 are connected in a rotation direction. A planetary gear unit PU and a planetary gear (a reduced rotation output unit, a speed reduction planetary gear) PR are provided on the center shaft 30. The planetary gear unit PU has four rotation elements, namely, a sun gear (a second rotation element, a third sun gear) S2, a carrier (a third rotation element, a second carrier) CR2, a ring gear (a fourth rotation element, a second ring gear) R2, and a sun gear (a first rotation element, a second sun gear) S3, and is a so-called Ravigneaux planetary gear. The carrier CR2 is provided with, in an intermeshing manner, a long pinion PL which is supported by side plates 42 and 44 and which meshes with the sun gear S3 and the ring gear R2, and a short pinion PS which is supported by side plates 43 and 44 and which meshes with the sun gear S2. Further, the planetary gear PR is a so-called double pinion planetary gear in which a carrier (an input rotation element, a first carrier) CR1 is provide with, in an intermeshing manner, a pinion P1 which is meshed with a ring gear R1 (an output rotation element, a first ring gear) and a pinion P2 which meshes with a sun gear (a fixed element, a first sun gear) S1.

A multiple disc clutch (a first clutch) C1 having a hydraulic servo 62, a friction disk 72, a hub member 22 and a drum-like member 21 which form a clutch drum (a first clutch drum), and a hub member (a member connected to the second rotation element) 23 connected to the sun gear S2, is arranged at an inner peripheral side of the input shaft 20; and, a multiple disc clutch (a second clutch) C2, having a hydraulic servo 61a, a friction disk 71, a drum-like member 24 and a cylinder member 61e which form a clutch drum (a second clutch drum), and a hub member 25 connected to the carrier CR2, is arranged at an outer peripheral side thereof.

The hydraulic servo 62 is configured from a piston member (a first piston) 62b that presses the friction disk 72, the drum-like member 21 having a cylinder portion 62e, an oil chamber (a first hydraulic servo oil chamber) 62a formed between the piston member 62b and the cylinder portion 62e and sealed by sealing rings 62f, 62g, a return spring 62c that energizes the piston member 62b in the direction of the oil chamber 62a, and a return plate 62d that receives the energy of the return spring 62c. The oil chamber 62a communicates with the oil passages 20a, 20b formed in the input shaft 20. The oil passage 20a extends to one end of the case 3, and communicates with an oil passage 91 of a boss portion 3*c* that is provided on the input shaft 20 such that it has a sleeve shape. Further, the oil passage 91 communicates with a hydraulic control apparatus (not shown). In other words, because the hydraulic servo 62 is arranged on the input shaft 20, an oil passage from the hydraulic control apparatus (not shown) to the oil chamber 62*a* is configured from a pair of sealing rings 81 that seal a portion between the boss portion 3*c* of the case 3 and the input shaft 20.

Further, the hydraulic servo 61 is configured from a piston member (a second piston) 61*b* that presses the friction disk 71, a cylinder member 61*e*, an oil chamber (a second hydraulic servo oil chamber) 61*a* formed between the piston member 61*b* and the cylinder member 61*e* and sealed by sealing rings 61*f* and 61*g*, a return spring 61*c* that energizes the piston member 61*b* in the direction of the oil chamber 61*a*, and a return plate 61*d* that receives the energy of the return spring 61*c*. The oil chamber 61*a* communicates with an oil passage 92 in the boss portion 3*c*, and the oil passage 92 communicates with the hydraulic control apparatus (not shown). In other words, in the hydraulic servo 61, an oil passage from the hydraulic control apparatus (not shown) to the oil chamber 61*a* is configured by a pair of sealing rings 80 that seal a portion between the boss portion 3*c* of the case 3 and the cylinder member 61*e*.

In other words, the drum-like member 21 described above is connected to the input shaft 20, and the drum-like member 22 is connected to an outer peripheral side of the drum-like member 21. The clutch C1, that can be selectively engaged by the hydraulic servo 62 of the clutch C1, is arranged at an inner peripheral side of a leading end portion of the hub member 22 so as to be spline engaged, and an inner peripheral side of the clutch C1 is connected to the hub member 23 so as to be spline engaged. Further, an inner peripheral side of the hub member 23 is connected to one end of a sleeve member (member connected to the second rotation element) 26 which is rotatably provided on the center shaft 30, and the sun gear S2 is integrally formed in an outer peripheral side of a leading end portion at the other end of the sleeve member 26.

Further, the clutch C2, that can be selectively engaged by the hydraulic servo 61 of the clutch C2, is arranged at an outer peripheral side of the leading end portion of the hub member 22 so as to be spline engaged, and a drum-like member 24 is connected to an outer peripheral side of the clutch C2 so as to be spline engaged at an inner peripheral side thereof. A one-way clutch (a first one-way clutch) F3 is positioned between the outer peripheral side of one end (the right side in the drawing) of the drum-like member 24 and the transmission case 3*b*, thereby restricting the rotation of the drum-like member 24 to one direction. Further, a connection member 25 is connected using spline engagement to an inner peripheral side of the other end (the left side in the drawing) of the drum-like member 24, and is connected to a side plate 44 of the carrier CR2.

On the other hand, a multiple disc clutch (a third clutch, a reduced rotation output unit) C3, having a hydraulic servo 66, a friction disk 76, a hub member 32 and a drum-like member 31 which form a clutch drum (a third clutch drum), and a hub member 33 connected to the carrier CR1, is arranged on the center shaft 30. The hydraulic servo 66 is configured from a piston member 66*b* that presses the friction disk 76, the drum-like member 31 having a cylinder portion 66*e*, an oil chamber 66*a* formed between the piston member 66*b* and the cylinder portion 66*e* and sealed by sealing rings 66*f*, 66*g*, a return spring 66*c* that energizes the piston member 66*b* in the direction of the oil chamber 66*a*, and a return plate 66*d* that receives the energy of the return spring 66*c*. In this case, the clutch drum, configured from the hub member 32 and the drum-like member 31, is open in the direction of the planetary gear PR, and the planetary gear PR is arranged between the hydraulic servo 66 and the planetary gear unit PU. Further, the friction disk 76 is arranged at a position at which it overlaps with the planetary gear PR at an outer diameter side in a diametrical direction.

The oil chamber 66*a* extends to the other end of the case 3 opposite to the boss portion 3*c*, and communicates with an oil passage 93 of a boss portion 3*d* provided on the center shaft 30 such that it has a sleeve shape, and the oil passage 93 communicates with the hydraulic control apparatus (not shown). In other words, in the hydraulic servo 66, an oil passage from the hydraulic control apparatus (not shown) to the oil chamber 66*a* is configured from a pair of sealing rings 82 sealing a portion between the boss portion 3*d* of the case 3 and the drum-like member 61 having the cylinder portion 66*e*.

In other words, the drum-like member 31 is connected to the center shaft 30 at the opposite side (the left side in the drawing) to the coupling with input shaft 20. The hub member 32 is connected to an outer peripheral side of the drum-like member 31. The clutch C3, that can be selectively engaged by the hydraulic servo 66 of the clutch C3, is arranged at an inner peripheral side of the leading end of the hub member 32 so as to be spline engaged, and an extension portion of the side plate 33 of the carrier CR1 is arranged at an inner peripheral side of the clutch C3 so as to be spline engaged. The carrier CR1 has the pinion P1 and the pinion P2 supported by the side plate 33 and a side plate 34, and the pinion P2 is meshed with the sun gear S1 formed in a sleeve shape and rotatably arranged on an axis. A hub member 35 is connected to one end of the sun gear S1, and a multiple disc brake (a first brake) B1 which can be selectively engaged by the hydraulic servo 65 and which has a hydraulic servo 65 for the brake B1 and the friction disk 75 is disposed such that the friction disk 75 is spline engaged at an outer peripheral side of the hub member 35. Further, an outer peripheral side of the friction disk 75 of the brake B1 is spline engaged to a spline 3*s* formed in an inner peripheral side of the transmission case 3*b*.

Further, the pinion P1 meshes with the ring gear R1 as described above, and a transmission member (a reduced rotation output unit) $40_1$ which is rotatably supported on the center shaft 30 and which transmits a rotation of the ring gear R1 is connected to one end of the ring gear R1 at an inner peripheral side. A spline 40*s* is formed in an outer peripheral side at the opposite side (the right side in the drawing) to a portion connected to the ring gear R1 of the transmission member $40_1$. A hub member 46 (at the left center of the drawing) and a sleeve $41_1$ (to the right side of the hub member 46) are spline engaged to the spline 40*s*.

A brake (a second brake) B2, which has a hydraulic servo 64 for the brake B2 and a friction disk 74 and which can be selectively engaged by the hydraulic servo 64, is disposed such that the friction disk 74 is spline engaged at an outer peripheral side of the hub member 46. An outer peripheral side of the friction disk 74 of the brake B2 is spline engaged to the spline 3*s* formed in the inner peripheral side of the transmission case 3*b*, in the same manner as the brake B1.

The sun gear S3 of the planetary gear unit PU is integrally formed in an inner peripheral side of the sleeve member $41_1$, and the long pinion PL, supported by the side plate 42 and the side plate 44 of the carrier CR2 as described above, meshes with the sun gear S1. Further, the short pinion PS is supported as described above between the side plate 44 and the side plate 43, and the hub member 47 is connected to an outer peripheral side of the side plate 43. A brake (a third brake) B4, which has a hydraulic servo 63 for the brake B4 and a friction disk 73 and which can be selectively engaged by the hydraulic servo 63 for the brake B4, is disposed at an outer peripheral side of the hub member 47 such that the friction disk 73 is spline engaged. An outer peripheral side of the friction disk 73 in the brake B4 is spline engaged to the spline 3s formed in the inner peripheral side of the transmission case 3b in the same manner as the brake B1 and the brake B2.

Further, the ring gear R2 meshes with the long pinion PL as described above, a connection member 45 is connected to one end of the ring gear R2, and the ring gear R2 is connected to a counter gear 50 via the connection member 45. A gear 51 fixed onto a counter shaft 52 of the counter shaft portion 4 meshes with the counter gear 50, as shown in FIG. 1, and a gear 53 of the differential portion 5 meshes with the counter shaft 52 via a gear 52a formed on an outer peripheral surface. Further, the gear 53 is fixed to the housing 54, and the housing 54 is connected to left and right axles (not shown) via a differential gear 55.

As described above, the clutch C1 and the clutch C2 are arranged on the input shaft 20, and the counter gear 50, the planetary gear unit PU and the planetary gear PR are arranged on the center shaft 30, in the order listed. In other words, the planetary gear PR is arranged at one side of the planetary gear unit PU in an axial direction, the clutch C1 and the clutch C2 are arranged at the other side in the axial direction, and the counter gear 50 is arranged between the clutch C1, the clutch C2 and the planetary gear unit PU. Further, the clutch C3 and the brake B1 are arranged at the outer peripheral side of the planetary gear PR, and the brake B2 and the brake B4 are arranged at the outer peripheral side of the planetary gear unit PU, respectively. Further, the planetary gear PR, the planetary gear unit PU and the counter gear 50 are provided coaxially with the input shaft 20.

Figure 5:
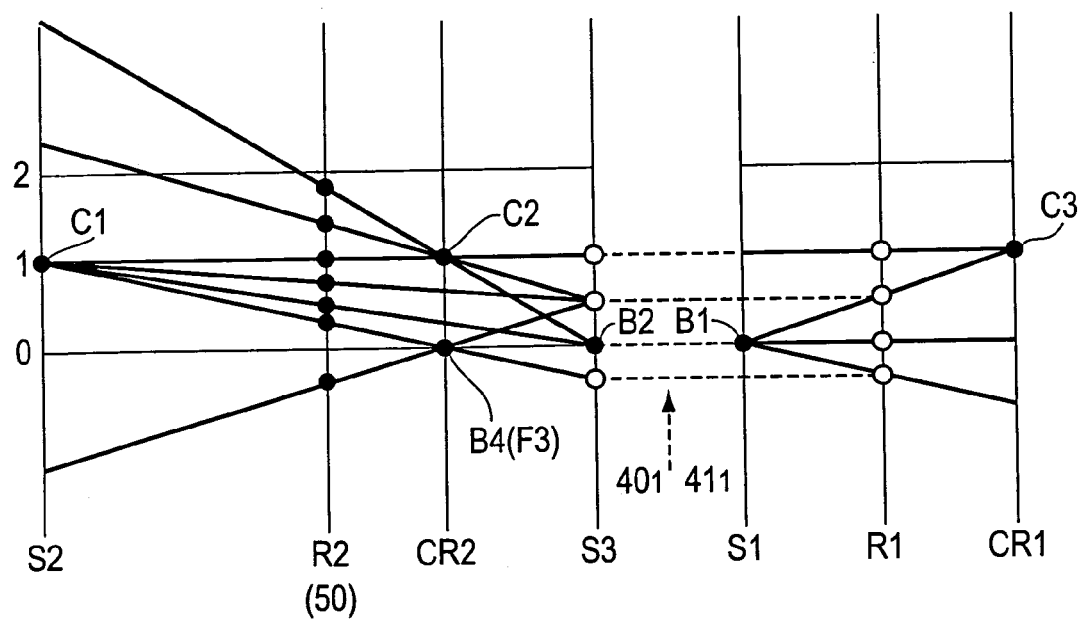
FIG. 5 is a velocity diagram of the automatic transmission in accordance with the first embodiment.

Next, a description will be given of an operation of the automatic transmission $1_1$ with reference to FIGS. 3, 4 and 5 on the basis of the structure described above. It should be noted that, in the velocity diagram shown in FIG. 5, the vertical axis indicates a rotation speed of each of the rotation elements, and the horizontal axis indicates and corresponds to a gear ratio of each of the rotation elements. Further, in the portion for the planetary gear unit PU in the velocity diagram, the vertical axis of the endmost portion in the horizontal direction (the right side in FIG. 5) corresponds to the sun gear S3, and from there toward the left side of the drawing, the vertical axes correspond to the carrier CR2, the ring gear R2 and the sun gear S2, in that order.

Figures 3, 4:
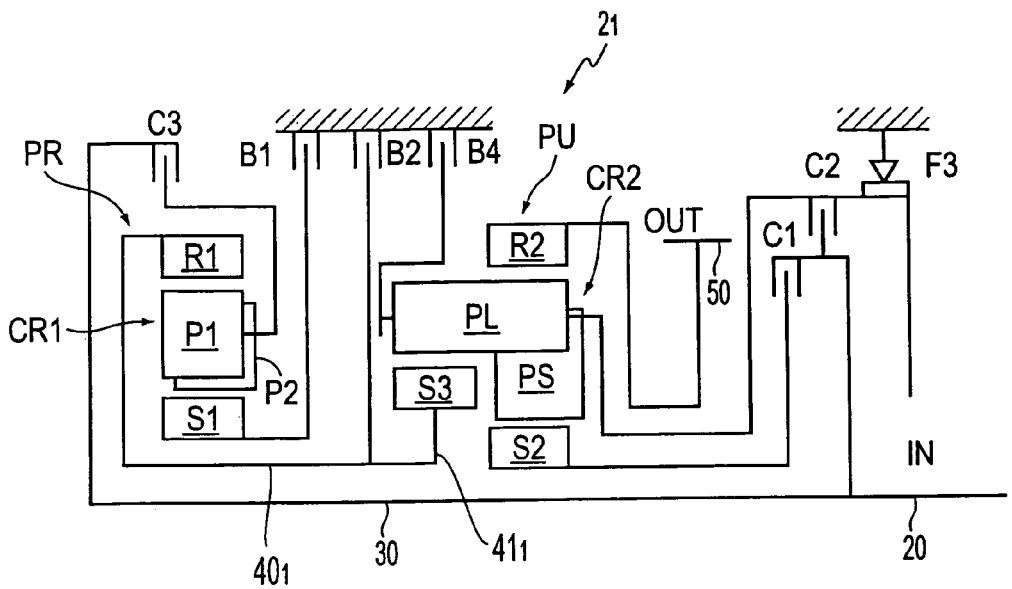
FIG. 3 is a schematic view showing the automatic transmission in accordance with the first embodiment.
FIG. 4 is an engagement table for the automatic transmission in accordance with the first embodiment.

As shown in FIG. 3, the rotation of the input shaft 20 is input to the sun gear S2 with the engagement of the clutch C1. The rotation of the input shaft 20 is input to the carrier CR2 with the engagement of the clutch C2, and the rotation of the carrier CR2 is selectively fixable through engagement of the brake B4, and can be restricted to one direction by the one-way clutch F3.

On the other hand, the rotation of the input shaft 20 is input to the carrier CR1 with the engagement of the clutch C3, and the rotation of the sun gear S1 is selectively fixable with the engagement of the brake B1. The ring gear R1 is connected to the sun gear S3 by the transmission member $40_1$ and the sleeve member $41_1$, and the rotation of the ring gear R1 and the sun gear S3 is selectively fixable with the engagement of the brake B2. Further, the rotation of the ring gear R2 is output to the counter gear 50, and is output to driven wheels (not shown) via the counter gear 50, the counter shaft portion 4 and the differential portion 5 (refer to FIG. 1).

In a forward first speed in a drive (D) range, as shown in FIG. 4, the clutch C1 and the one-way clutch F3 are engaged. Accordingly, as shown in FIG. 5, the rotation of the input shaft 20 is input to the sun gear S2 via the clutch C1, and the rotation of the carrier CR2 is restricted to one direction (a forward rotation direction), that is, the carrier CR2 is prevented from rotating backward, and is thereby in a fixed state. Further, the rotation of the input shaft 20 input to the sun gear S2 is output to the ring gear R2 via the fixed carrier CR2, and a forward rotation that corresponds to the forward first speed is output from the counter gear 50. In this case, in the planetary gear PR described above, backward reduced rotation is output to the ring gear R1 via the sun gear S3, and the sun gear S1 is fixed in accordance with the engagement of the brake B1. However, because the clutch C3 is disengaged, the carrier CR1 is in an idle rotation state, and torque is not transmitted. Further, when engine brake (coasting) takes place, the forward first speed state is maintained such that the brake B4 is engaged so as to fix the carrier CR2, and prevent the carrier CR2 from rotating forward.

Note that, in the forward first speed, because the one-way clutch F3 prevents the carrier CR2 from rotating backward and allows it to rotate forward, it is possible to smoothly achieve the forward first speed, for example, at a time of changing from a non-running range to a running range as a result of automatic engagement of the one-way clutch. Further, the one-way clutch F3 is structured such that it receives the rotation of the input shaft 20 via the sun gear S2; accordingly, an applied torque is smaller, for example, in comparison with the case of receiving the reduced rotation, and thus it is not necessary to make the one-way clutch F3 and the drum-like member 24, connecting the one-way clutch F3 and the clutch C2, large.

In a forward second speed in the drive (D) range, as shown in FIG. 4, the clutch C1 is engaged, and the brake B2 is engaged. Accordingly, as shown in FIG. 5, the rotation of the input shaft 20 is input to the sun gear S2 via the clutch C1, and the sun gear S3 is fixed in accordance with the engagement of the brake B2. Thus, the carrier CR2 rotates at a slightly reduced speed, the rotation input to the sun gear S2 is output to the ring gear R2 via the carrier CR2 that rotates at reduced speed, and a forward rotation that corresponds to the forward second speed is output from the counter gear 50. In this case, at this time, in the planetary gear PR described above, the sun gear S3 and the ring gear R1 are fixed in accordance with the engagement of the brake B2, and the clutch C3 is disengaged. Accordingly, the carrier CR1 and the sun gear S1 are in a stopped state.

In a forward third speed in the drive (D) range, as shown in FIG. 4, the clutch C1 and the clutch C3 are engaged, and the brake B1 is engaged. Accordingly, as shown in FIG. 5, the rotation of the input shaft 20 is input to the carrier CR1 via the clutch C3, and to the sun gear S2 via the clutch C1, and the sun gear S1 is fixed in accordance with the engagement of the brake B1. Thus, the ring gear R1 rotates at a reduced speed in accordance with the rotation of the input shaft 20 input to the carrier CR1 and the fixed sun gear S1, and then the reduced rotation is output to the sun gear S3 via the transmission member $40_1$ and the sleeve member $41_1$. Thus, the carrier CR2 rotates at a reduced rotation that is slightly larger than the reduced rotation of the sun gear S3 in accordance with the rotation of the input shaft 20 input to the sun gear S2, and the reduced rotation of the sun gear S3.

Further, the rotation of the input shaft 20 input to the sun gear S2 is output to the ring gear R2 via the carrier CR2 rotating at the reduced rotation, and a forward rotation that corresponds to the forward third speed is output from the counter gear 50. In this case, at this time, because the sun gear S3 and the ring gear R1 rotate at the reduced speed, the transmission member $40_1$ and the sleeve member $41_1$ transmit a comparatively large torque.

In a forward fourth speed in the drive (D) range, as shown in FIG. 4, the clutch C1 and the clutch C2 are engaged. Accordingly, as shown in FIG. 5, the rotation of the input shaft 20 is input to the sun gear S2 via the clutch C1 and to the carrier CR2 via the clutch C2. Thus, the rotation of the input shaft 20 is output as it is to the ring gear R2 in accordance with the rotation of the input shaft 20 input to the sun gear S2 and the rotation of the input shaft 20 input to the carrier CR2, that is, in a direct drive state. Accordingly, a forward rotation that corresponds to the forward fourth speed is output from the counter gear 50. In this case, at this time, in the planetary gear PR, the rotation of the input shaft 20 is input to the carrier CR1 via the clutch C3, and the rotation of the input shaft 20 (the direct drive rotation) is input to the ring gear R1 from the sun gear S3. However, because the brake B1 is disconnected and the sun gear S1 is in the slipping state, torque transmission does not occur.

In a forward fifth speed in the drive (D) range, as shown in FIG. 4, the clutch C2 and the clutch C3 are engaged, and the brake B1 is engaged. Accordingly, as shown in FIG. 5, the rotation of the input shaft 20 is input to the carrier CR1 via the clutch C3 and to the carrier CR2 via the clutch C2, and the sun gear S1 is fixed in accordance with the engagement of the brake B1. Thus, the ring gear R1 rotates at a reduced speed in accordance with the rotation of the input shaft 20 input to the carrier CR1 and the fixed sun gear S1, and the reduced rotation is output to the sun gear S3 via the transmission member $40_1$ and the sleeve member $41_1$. The reduced rotation is output to the ring gear R2 as an increased rotation in accordance with the reduced rotation of the sun gear S3 and the carrier CR2 to which the rotation of the input shaft 20 is input, and a forward rotation that corresponds to the forward fifth speed is output from the counter gear 50. In this case, at this time, because the sun gear S3 and the ring gear R1 rotate at the reduced speed in the same manner as the forward third speed state described above, the transmission member $40_1$ and the sleeve member $41_1$ transmit a comparatively large torque.

In a forward sixth speed in the drive (D) range, as shown in FIG. 4, the clutch C2 is engaged, and the brake B2 is engaged. Accordingly, as shown in FIG. 5, the rotation of the input shaft 20 is input to the carrier CR2 via the clutch C2, and the sun gear S3 is fixed in accordance with the engagement of the brake B2. Thus, the rotation becomes an increased rotation (larger than the forward fifth speed described above) in accordance with the rotation of the input shaft 20 input to the carrier CR2 and the fixed sun gear S2, and the increased rotation is output to the ring gear R2. Accordingly, a forward rotation that corresponds to the forward sixth speed is output from the counter gear 50. In this case, at this time, in the planetary gear PR, because the sun gear S3 and the ring gear R1 are fixed in accordance with the engagement of the brake B2 in the same manner as the forward second speed state described above, and the clutch C3 is disengaged, the carrier CR1 and the sun gear S1 are in a stopped state.

In a backward first speed in a reverse (R) range, as shown in FIG. 4, the clutch C3 is engaged, and the brakes B1, B4 are engaged. Accordingly, as shown in FIG. 5, the rotation of the input shaft 20 is input to the carrier CR1 via the clutch C3, the sun gear S1 is fixed in accordance with the engagement of the brake B1, and the carrier CR2 is fixed in accordance with the engagement of the brake B4. Thus, the ring gear R1 rotates at a reduced speed in accordance with the rotation of the input shaft 20 input to the carrier CR1, and the fixed sun gear S1, and the reduced rotation is output to the sun gear S3 via the transmission member 401 and the sleeve member $41_1$. Accordingly, the rotation is output as a reduced rotation to the ring gear R2 in accordance with the reduced rotation of the sun gear S3 and the fixed carrier CR2, and a reverse rotation that corresponds to the backward first speed is output from the counter gear 50. In this case, at this time, because the sun gear S3 and the ring gear R1 rotate at the reduced speed in the same manner as in the forward third speed and the forward fifth speed state, the transmission member $40_1$ and the sleeve member $41_1$ transmit a comparatively large torque.

Further, at this time, the brake B4 is structured such that it receives the rotation of the sun gear S3 to which reduced rotation is input. However, because the brake B4 is arranged comparatively close to the outer peripheral side of the planetary gear unit PU, it is possible to make the hub member 47, that transmits the torque on the basis of the reduced rotation, comparatively short.

In a parking (P) range and a neutral (N) range, in particular, the clutch C1, the clutch C2 and the clutch C3 are disengaged, and power transmission between the input shaft 20 and the counter gear 50 is in an interrupted state, such that the entire automatic transmission $2_1$ is in a slipping state (a neutral state). In this case, the brake B1 fixing the sun gear S1 is engaged; this prevents frequent repetition of engagement and disengagement of the brake B1, but does not have any particular influence on the rotation state of the other rotation elements within the automatic speed change mechanism $2_1$.

In this case, in the automatic transmission $1_1$ described above, the clutch C3 is engaged as in the state of the forward third speed, the forward fifth speed and the backward first speed as described above, and inputs the rotation of the input shaft 20 to the carrier CR1. However, the invention is not limited to this, and the clutch C3 may be interposed between the ring gear R1 and the sun gear S3; the carrier CR1 may be placed in a constantly connected state with the input shaft 20; and the clutch C3 may be engaged in the same state as the forward third speed, the forward fifth speed and the backward first speed. Even so, in the same manner, it is possible to output the reduced rotation to the sun gear S3 by the planetary gear PR, the clutch C3 and the transmission member $40_1$, and it is possible to obtain the forward sixth speed and the backward first speed in the same manner. However, because the clutch C3, in this case, is such that it connects and disconnects the reduced rotation, and it is necessary to connect and disconnect a greater torque than when connecting and disconnecting the rotation of the input shaft 20 in the embodiment described above, it is necessary to make the clutch C3 comparatively large.

As described above, in accordance with the automatic transmission $1_1$ according to the invention, the planetary gear PR, the clutch C3 and the transmission member $40_1$ which correspond to the reduced rotation output unit are arranged at one side (the left side in FIGS. 1, 2 and 3) in the axial direction of the planetary gear unit PU, the clutch C1 and the clutch C2 are arranged at the other side (the right side in FIGS. 1, 2 and 3) in the axial direction of the planetary gear unit PU, and the counter gear 50, that corresponds to the output member, is arranged between the clutch C1, the clutch C2 and the planetary gear unit PU. Accordingly, it is possible to position, in particular, the planetary gear PR and the planetary gear unit PU close to each other, and it is possible to make the axial length of the transmission member $40_1$ and the sleeve member $41_1$, that transmits the reduced rotation, comparatively short. Accordingly, because it is possible to achieve a compact structure and weight saving of the automatic transmission $1_1$, and it is possible to make the inertia (the inertia force) small in accordance with the weight saving of the transmission member $40_1$ and the sleeve member $41_1$, it is possible to improve the controllability of the automatic transmission $1_1$. Further, it is possible to reduce the generation of shift shock.

Because the clutch C2 is connected to the carrier CR2 via the outer peripheral side of the clutch C1, it is possible to prevent the member that connects each of the rotation elements from being complicated, and it is possible to make the automatic transmission $1_1$ compact.

Further, the clutch C1 is structured such that the clutch C2 is arranged at the outer peripheral side thereof, and thus, can not have its diameter enlarged toward the outer peripheral side. However, it is possible to ensure that the hydraulic servo 62, and more particularly, the pressure receiving area of the oil chamber 62a for the hydraulic servo 62, is large at the inner peripheral side by providing the hydraulic servo 62 on the input shaft 20 (in comparison with the case, for example, that the hydraulic servo 62 is provided on the boss portion 3c), and it is possible to increase the capacity of the clutch C1.

Further, the planetary gear PR, the planetary gear unit PU and the counter gear 50 are provided coaxially with the input shaft 20. Accordingly, it is possible to make the driven wheel transmission mechanism (for example, the counter shaft portion 4, or the like) compact, particularly in the case that the automatic transmission $1_1$ is mounted in the FF vehicle (for example, in comparison with the case when the speed reduction planetary gear, or the like, is provided on another shaft). Thus, for example, it is possible to prevent the driven wheel transmission mechanism from being interfered with by, for example, a vehicle body member, and it is possible to improve ease of vehicle mounting of the automatic transmission $1_1$.

Further, for example, as disclosed in Japanese Patent Laid-Open Publication No. 2001-263438, in the case that the clutch C3 is interposed between the ring gear R1 and the sun gear S3, it is necessary to connect and disconnect the reduced rotation, so that the structure becomes comparatively large, and the distance between the planetary gear PR and the planetary gear unit PU is lengthened. However, as a result of interposition between the input shaft 20 and the carrier CR1, the reduced rotation output from the ring gear R1 of the planetary gear PR is connected and disconnected by connecting and disconnecting the rotation of the input shaft 20 by using the clutch C3. Thus, it is possible to make the clutch C3 compact, and it is possible to arrange the planetary gear PR and the planetary gear unit PU at comparatively close positions. Therefore, it is possible to make the automatic transmission $1_1$ compact.

Further, because the hydraulic servo 62 is provided on the input shaft 20, it is possible to supply oil to the oil chamber 62a of the hydraulic servo 62 by preventing the oil leaking from the case 3 using the pair of sealing rings 81, and supplying the oil to the oil passages 20a, 20b provided within the input shaft 20, for example, without providing a sealing ring between the input shaft 20 and the hydraulic servo 62. Further, the hydraulic servos 61, 66 can supply the oil from the boss portions 3c, 3d that respectively extend from the case 3, for example, without passing it through other members. That is, the oil can be supplied by respectively arranging the pair of sealing rings 80, 82. Accordingly, it is possible to supply the oil to the hydraulic servos 62, 61, 66 by simply respectively arranging the pairs of sealing rings 81, 80, 82, and it is possible to minimize the sliding resistance resulting from the sealing rings, whereby it is possible to improve the efficiency of the automatic transmission $1_1$.

Further, because the friction disk 33 is arranged at an outer peripheral side of the planetary gear PR in the diametrical direction, it is possible to make the automatic transmission $1_1$ compact in the axial direction. As it is possible to arrange the planetary gear PR and the planetary gear unit PU adjacent to each other by arranging the planetary gear PR between the hydraulic servo 66 of the clutch C3 and the planetary gear unit PU in the axial direction (because the hydraulic servo 66 of the clutch C3 is not provided between the planetary gear PR and the planetary gear unit PU), it is possible to make the transmission member $40_1$ and the sleeve member $41_1$ comparatively short. Accordingly, because it is possible to achieve a compact structure and weight saving of the automatic transmission $1_1$, and it is possible to make the inertia (the inertia force) small, it is possible to improve the controllability of the automatic transmission $1_1$, and reduce the generation of shift shock.

Because the planetary gear PR is a double pinion planetary gear, it is possible to output the rotation of the input shaft 20 as reduced rotation. Further, even in the case that the gear ratio of the automatic transmission $1_1$ is favorably set, high speed rotation can be restricted without making each of the rotation elements of the planetary gear unit and the speed reduction planetary gear large. Accordingly, it is possible to make the automatic transmission $1_1$ compact.

As the configuration of the planetary gear PR is provided with the carrier CR1, that is the input rotation element, the sun gear S1, that is the fixed element, and the ring gear R1, that is the output rotation element, it is possible to output the rotation of the input shaft 20 as the reduced rotation.

In addition, because the planetary gear unit PU is a Ravigneaux type planetary gear configured from the sun gear S2, the sun gear S3, the carrier CR2 and the ring gear R2, it is possible to arrange the planetary gear PR and the planetary gear unit PU close to each other, while at the same it is possible to achieve, for example, six forward speeds and one backward speed. Accordingly, it is possible to make the transmission member $40_1$ and the sleeve member $41_1$, that transmit the reduced rotation, comparatively short.

Additionally, as the one-way clutch F3 is provided in parallel to the brake B4 so as to restrict the rotation of the carrier CR2 to one direction, it is possible to achieve the forward first speed at a time of normal running in accordance with the engagement of the clutch C1 and the one-way clutch F3. Thus, it is possible to smoothly achieve the forward first speed, for example, at a time of changing from a non-running range to a running range.

Further, the brake B4 is arranged at the outer peripheral side of the planetary gear unit PU, and the one-way clutch F3 is arranged adjacent to the clutch C2. Accordingly, while the one way clutch F3 is engaged with the clutch C1, that inputs the rotation of the input shaft at the time of realizing the forward first speed, the brake B4 is able to achieve the backward first speed by being engaged with the clutch C3, that connects and disconnecting the reduced rotation. As a result, a reaction force torque applied to the brake B4 becomes larger than a reaction force torque applied to the one-way clutch F3. Accordingly, it is possible to make the hub member 47, that transmits the torque resulting from the reduced rotation to the brake B4, comparatively short by providing a brake B4 close to the outer peripheral side of the planetary gear unit PU. Further, even in the case where the one-way clutch F3 is provided close to the clutch C2 which is separate from the planetary gear unit PU, it is not necessary to make the hub member 25, that connects the clutch C2 and the carrier CR2 and the side plate 44, large. Further, because the one-way clutch F3 is not arranged at the outer periphery of the planetary gear unit PU, it is possible to improve design freedom of the brake. Accordingly, it is possible to achieve a compact structure and weight saving of the automatic transmission $1_1$.

Further, as shown in the velocity diagram, it is possible to arrange the planetary gear PR and the planetary gear unit PU close to each other while achieving the six forward speeds and one backward speed, and it is possible to make the transmission member $40_1$, that transmits the reduced rotation, and the sleeve member $41_1$ comparatively short. Accordingly, because it is possible to achieve a compact structure and weight saving of the automatic transmission $1_1$, and it is possible to make the inertia (the inertia force) small, it is possible to improve the controllability of the automatic transmission 11 and it is possible to reduce the generation of shift shock.

Further, the configuration allows the six forward speeds and one backward speed to be realized, and both the clutches C1, C2 are engaged in the forward fourth speed, that is, the directly connected state is established in the forward fourth speed. As a result, it is possible to set the gear ratio in the forward fifth speed and the forward sixth speed so that it is high. In the case, in particular, of a vehicle running at a high speed for which mounting has been executed, it is possible to make the engine speed low, and it is possible to contribute to quietness of the vehicle when running at high speed.

Further, because the driven wheel transmission mechanism has the differential portion 5 that outputs the rotation to the driven wheels, the counter shaft portion 4 that engages with the differential portion 5, and the output member that is the counter gear that engages with the counter shaft portion 4, it is possible to mount the automatic transmission $1_1$, for example, in the FF vehicle.

Hereinafter, a description will be given, with reference to FIGS. 6 to 10, of a second embodiment that is a partial modification of the first embodiment. Note that, in the second embodiment, with the exception of partially modified portions, the same reference numerals denote the same elements as those of the first embodiment and a description thereof will be omitted.

Figure 6:
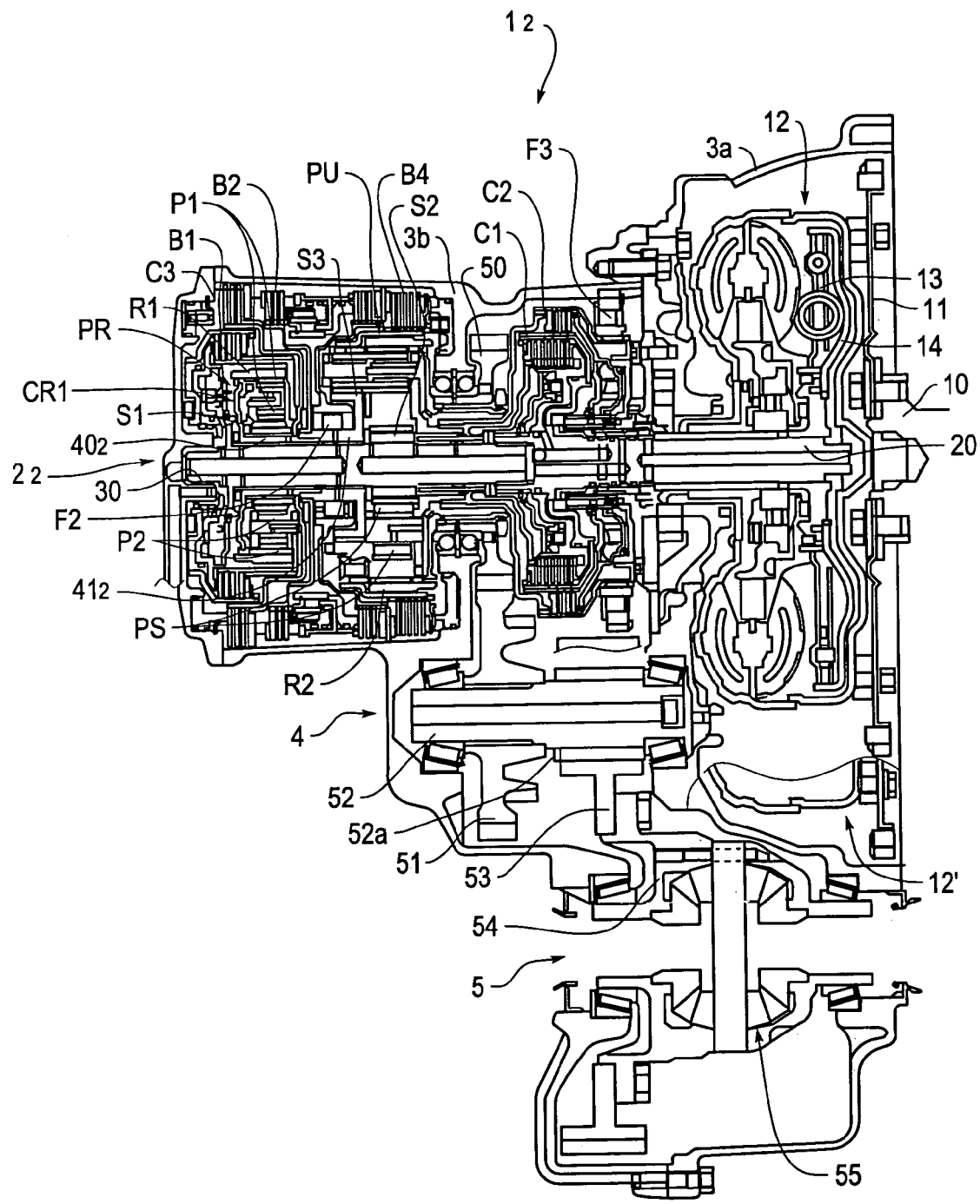
FIG. 6 is a cross sectional development view showing an automatic transmission in accordance with a second embodiment.

As shown in FIG. 6, an automatic transmission $1_2$ in accordance with the second embodiment, as compared to the automatic transmission $1_1$ according to the first embodiment (refer to FIG. 1), is structured such that a one-way clutch (a second one-way clutch) F2 is arranged between the planetary gear unit PU and the planetary gear (the reduced rotation output unit, the speed reduction planetary gear) PR. A brake (a fourth brake) B3 that connects and disconnects engagement of the one-way clutch F2 is also provided.

Figure 7:
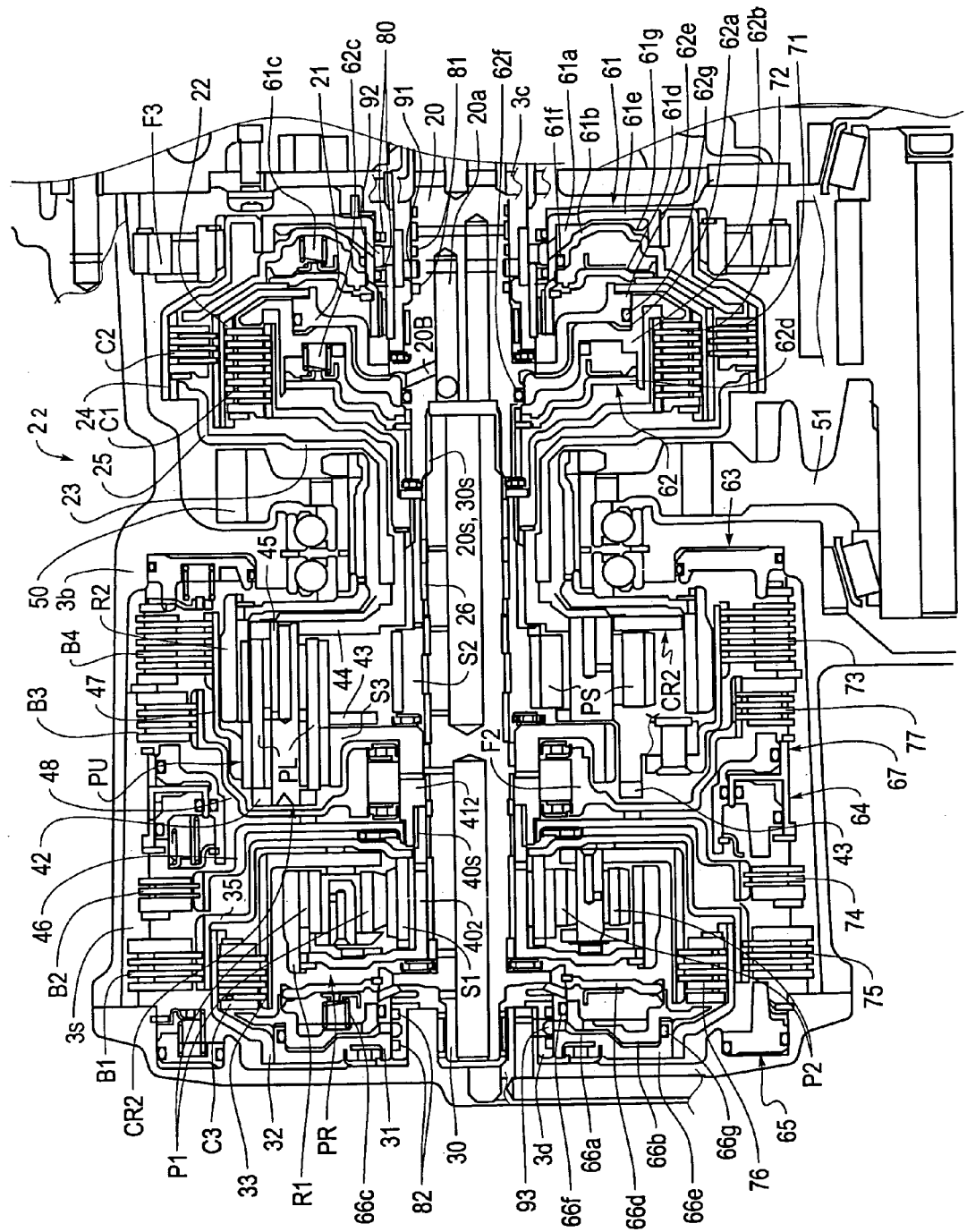
FIG. 7 is a cross sectional view showing an automatic speed change mechanism of the automatic transmission in accordance with the second embodiment.

As shown in FIG. 7, a transmission member $40_2$ connected to the ring gear R1 of the planetary gear PR is spline engaged to a sleeve member $41_2$ with which the sun gear S3 of the planetary gear unit PU is integrally formed. Further, an inner race of the one-way clutch F2 is integrally formed in the sleeve member $41_2$, and an outer race of the one-way clutch F2 is integrally formed with the hub member 48. A brake (a fourth brake) B3 which has a hydraulic servo 67 for the brake B3 and a friction disk 77, and which can be selectively engaged by the hydraulic servo 67 for the brake B3, is arranged at an outer peripheral side of the hub member 48 in such a manner that the friction disk 77 is spline engaged. Further, an outer peripheral side of the friction disk 77 in the brake B3 is spline engaged to the spline $3s$ formed in the inner peripheral side of the transmission case $3b$. Note that, the hub member 46, that is spline engaged to the brake B2, is spline engaged to the sleeve member $41_2$ in an inner peripheral side thereof, that is, it is connected to the transmission member $40_2$ via the sleeve member $41_2$.

Figure 10:
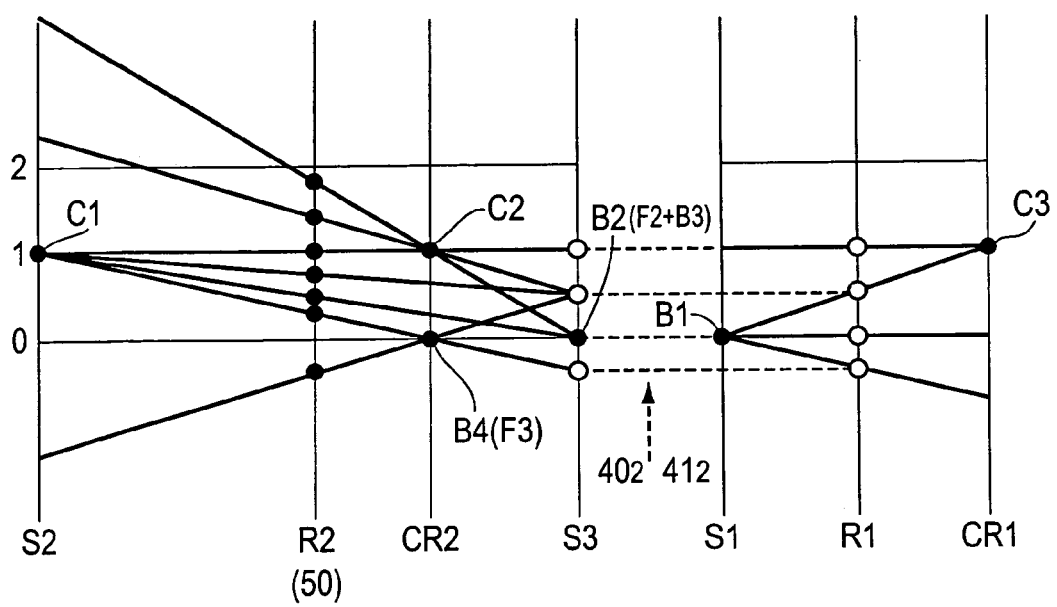
FIG. 10 is a velocity diagram of the automatic transmission in accordance with the second embodiment.

Next, a description will be given of operation of the one-way clutch F2 of the automatic transmission $1_2$ with reference to FIGS. 8, 9 and 10 on the basis of the structure described above. It should be noted that, in the same manner as the first embodiment, in the velocity diagram shown in FIG. 10, the vertical axis indicates a rotation speed of each of the rotation elements, and the horizontal axis indicates and corresponds to a gear ratio of each of the rotation elements. Further, in the portion for the planetary gear unit PU in the velocity diagram, the vertical axis of the endmost portion in the horizontal direction (the right side in FIG. 10) corresponds to the sun gear S3, and from there toward the left side of the drawing, the vertical axes correspond to the carrier CR2, the ring gear R2 and the sun gear S2, in that order.

Figures 8, 9:
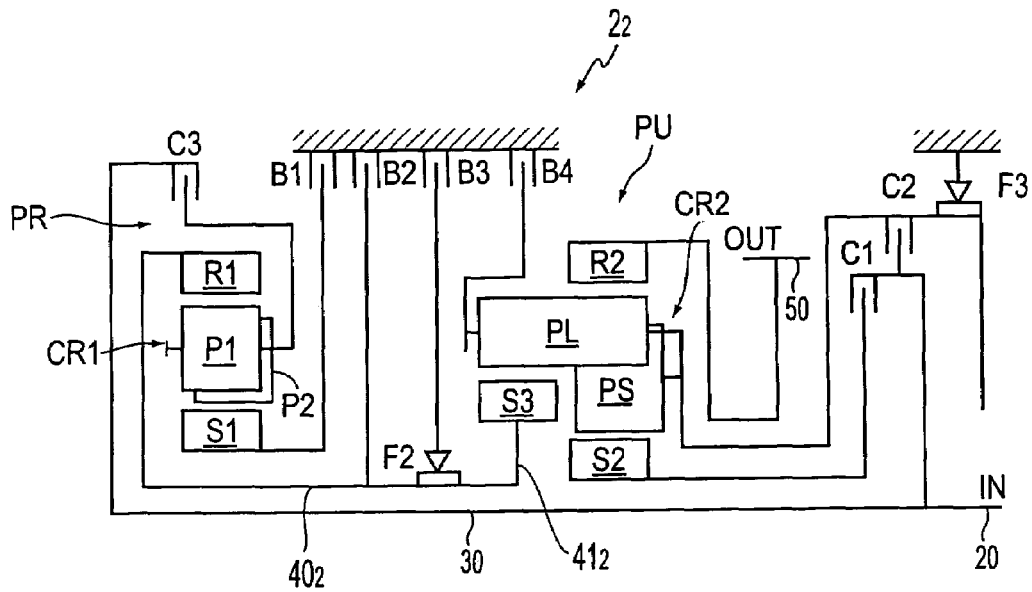
FIG. 8 is a schematic view showing the automatic transmission in accordance with the second embodiment.
FIG. 9 is an engagement table for the automatic transmission in accordance with the second embodiment.

As shown in FIG. 8, the one-way clutch F2 is arranged in parallel to the brake B2, and restricts the rotation of the ring gear R1 to one direction (a forward rotation direction) via the sleeve member $41_2$, that is, via the sun gear S3 and the transmission member $40_2$, in accordance with the engagement of the brake B3.

Accordingly, as shown in FIG. 9, in the forward second speed in the drive (D) range, the clutch C1 is engaged, and the one-way clutch F2 is engaged in accordance with the engagement of the brake B3. Accordingly, as shown in FIG. 10, the rotation of the input shaft 20 is input to the sun gear S2 via the clutch C1, and the rotation of the sun gear S3 is restricted to one direction (the forward rotation direction) by the one-way clutch F2 in accordance with the engagement of the brake B3. Thus, the carrier CR2 rotates at a slightly reduced speed, the rotation input to the sun gear S2 is output to the ring gear R2 via the carrier CR2 with reduced rotation, and a forward rotation that corresponds to the forward second speed is output from the counter gear 50. In this case, at this time, in the planetary gear PR described above, the sun gear S3 and the ring gear R1 are prevented from rotating in reverse by the one-way clutch F2, and the clutch C3 is disengaged. Accordingly, the carrier CR1 and the sun gear S1 are in a stopped state.

In this case, the brake B3 is engaged and the one-way clutch F2 prevents the sun gear S3 from rotating in reverse, whereby the sun gear S2 rotates forward and is automatically released by the one-way clutch F3 engaged in the forward first speed. Thus, shifting can be smoothly executed from the forward first speed to the forward second speed, for example, while preventing the engine from racing. Further, when engine brake (at a time of coasting) takes place, the sun gear S3 (and the ring gear R1) is fixed by engagement of the brake B2 provided in parallel with the one-way clutch F2, and the forward second speed state described above is maintained such that the sun gear S3 is prevented from rotating forward.

As described above, with the automatic transmission $1_2$ according to the invention, the planetary gear PR, the clutch C3 and the transmission member $40_2$ which correspond to the reduced rotation output unit are arranged at one side (the left side in FIGS. 6, 7 and 8) in the axial direction of the planetary gear unit PU; the clutch C1 and the clutch C2 are arranged at the other side (the right side in FIGS. 6, 7 and 8) in the axial direction of the planetary gear unit PU; and the counter gear 50, that corresponds to the output member, is arranged between the clutch C1, the clutch C2 and the planetary gear unit PU. As a result, it is possible, in particular, to arrange the planetary gear PR and the planetary gear unit PU at positions close to each other, and it is possible to make the axial direction length of the transmission member $40_2$, that transmits the reduced rotation and the sleeve member $41_2$, comparatively short. Accordingly, it is possible to achieve a compact structure and weight saving of the automatic transmission $1_2$, and it is possible to make the inertia (the inertia force) small as a result of the weight saving of the transmission member $40_2$ and the sleeve member $41_2$. As a result, it is possible to improve the controllability of the automatic transmission $1_2$, and it is possible to reduce the generation of shift shock.

Further, because the clutch C2 is connected to the carrier CR2 via the outer peripheral side of the clutch C1, it is possible to prevent the member that connects each of the rotation elements from being complicated, and it is possible to make the automatic transmission $1_2$ compact.

Further, the clutch C1 is structured such that the clutch C2 is arranged at the outer peripheral side thereof, and can not have its diameter enlarged toward the outer peripheral side. However, it is possible to ensure that the hydraulic servo 62 and, more particularly, the pressure receiving area of the oil chamber 62a for the hydraulic servo 62, is large at the inner peripheral side by providing the hydraulic servo 62 on the input shaft 20 (in comparison with the case, for example, that the hydraulic servo 62 is provided on the boss portion 3c), and it is possible to increase the capacity of the clutch C1.

Further, the planetary gear PR, the planetary gear unit PU and the counter gear 50 are provided coaxially with the input shaft 20. Accordingly, it is possible to make the driven wheel transmission mechanism (for example, the counter shaft portion 4, or the like) compact, particularly in the case where the automatic transmission $1_2$ is mounted in the FF vehicle (for example, in comparison with the case when the speed reduction planetary gear, or the like, is provided on another shaft). Thus, for example, it is possible to prevent the driven wheel transmission mechanism from being interfered with by, for example, a vehicle body member, and it is possible to improve the ease of vehicle mounting of the automatic transmission $1_2$.

Further, in the same manner as the first embodiment, in the case where the clutch C3 is interposed between the ring gear R1 and the sun gear S3, it is necessary to connect and disconnect the reduced rotation. Thus, the structure becomes comparatively large, and the distance between the planetary gear PR and the planetary gear unit PU is lengthened. However, because the reduced rotation output from the ring gear R1 of the planetary gear PR is connected and disconnected by connecting and disconnecting the rotation of the input shaft 20 using the clutch C3, it is possible to make the clutch C3 compact, and it is possible to arrange the planetary gear PR and the planetary gear unit PU at comparatively close positions. Therefore, it is possible to make the automatic transmission $1_2$ compact.

Further, because the hydraulic servo 62 is provided on the input shaft 20, it is possible to supply the oil to the oil chamber 62a of the hydraulic servo 62 by preventing the oil from leaking from the case 3 using the pair of sealing rings 81 and supplying the oil to the oil passages 20a, 20b provided within the input shaft 20, for example, without providing a sealing ring between the input shaft 20 and the hydraulic servo 62. Further, the hydraulic servos 61, 66 can supply the oil from the boss portions 3c, 3d that respectively extend from the case 3, for example, without passing it through other members, that is, the oil can be supplied by respectively arranging the pair of sealing rings 80, 82. Accordingly, it is possible to supply the oil to the hydraulic servos 62, 61, 66 by simply arranging the pairs of respective sealing rings 81, 80, 82, and it is possible to minimize the sliding resistance resulting from the sealing rings. As a result, it is possible to improve the efficiency of the automatic transmission $1_2$.

Further, because the friction disk 33 is arranged at an outer peripheral side of the planetary gear PR in the diametrical direction, it is possible to make the automatic transmission $1_2$ compact in the axial direction. Because it is possible to arrange the planetary gear PR and the planetary gear unit PU adjacent to each other by arranging the planetary gear PR between the hydraulic servo 66 of the clutch C3 and the planetary gear unit PU in the axial direction (as the hydraulic servo 66 of the clutch C3 is not provided between the planetary gear PR and the planetary gear unit PU), it is possible to make the transmission member $40_2$ and the sleeve member $41_2$ comparatively short. Accordingly, because it is possible to achieve a compact structure and weight saving of the automatic transmission $1_2$, and it is possible to make the inertia (the inertia force) small, it is possible to improve the controllability of the automatic transmission $1_2$, and it is possible to reduce the generation of shift shock.

In addition, because the planetary gear PR is the double pinion planetary gear, it is possible to output the rotation of the input shaft 20 as a reduced rotation. Further, even in the case that the gear ratio of the automatic transmission $1_2$ is favorably set, high speed rotation can be restricted without making each of the rotation elements of the planetary gear unit and the speed reduction planetary gear large. Accordingly, it is possible to make the automatic transmission $1_2$ compact.

Additionally, as the configuration of the planetary gear PR is provided with the carrier CR1, that corresponds to the input rotation element, the sun gear S1, that corresponds to the fixed element, and the ring gear R1, that corresponds to the output rotation element, it is possible to output the rotation of the input shaft 20 as the reduced rotation.

Further, because the planetary gear unit PU is a Ravigneaux type planetary gear configured from the sun gear S2, the sun gear S3, the carrier CR2 and the ring gear R2, it is possible to arrange the planetary gear PR and the planetary gear unit PU close to each other, while at the same time it is possible to achieve, for example, six forward speeds and one backward speed. Accordingly, it is possible to make the transmission member $40_2$ that transmits the reduced rotation and the sleeve member $41_2$ comparatively short.

Because the one-way clutch F3 is provided in parallel to the brake B4 and restricts the rotation of the carrier CR2 to one direction, it is possible to achieve the forward first speed at a time of normal running in accordance with the engagement of the clutch C1 and the one-way clutch F3. Thus, it is possible to smoothly achieve the forward first speed, for example, at a time of changing from a non-running range to a running range. Further, the brake B4 is arranged at the outer peripheral side of the planetary gear unit PU, and the one-way clutch F3 is arranged adjacent to the clutch C2. Accordingly, while the one way clutch F3 is engaged with the clutch C1 that inputs the rotation of the input shaft at the time of realizing the forward first speed, the brake B4 is able to achieve the backward first speed by being engaged with the clutch C3 that connects and disconnects the reduced rotation. As a result, the reaction force torque applied to the brake B4 becomes larger than the reaction force torque applied to the one-way clutch F3. Accordingly, it is possible to make the hub member 47, that transmits the torque resulting from the reduced rotation to the brake B4, comparatively short, by providing a brake B4 close to the outer peripheral side of the planetary gear unit PU. Further, even in the case that the one-way clutch F3 is provided close to the clutch C2 which is separate from the planetary gear unit PU, it is not necessary to make the hub member 25, that connects the clutch C2 and the carrier CR2 and the side plate 44, large.

Further, because the one-way clutch F3 is not arranged at the outer periphery of the planetary gear unit PU, it is possible to improve design freedom of the brake. Accordingly, it is possible to achieve a compact structure and weight saving in the automatic transmission $1_2$.

Moreover, because the one-way clutch F2 is provided in parallel to the brake B2 and restricts the rotation of the sun gear S3 to one direction in accordance with the engagement of the brake B3, it is possible to smoothly execute shifting from the forward second speed to the forward third speed.

Further, the inner race of the one-way clutch F2 is integrally formed with the sleeve member $41_2$. Accordingly, it is possible to make the automatic transmission $1_2$ compact, particularly in the diametrical direction, at the same time as being able to smoothly execute shifting from the forward second speed to the forward third speed.

Further, as shown in the velocity diagram, it is possible to arrange the planetary gear PR and the planetary gear unit PU close to each other while achieving the six forward speeds and the one backward speed, and it is possible to make the transmission member $40_2$ that transmits the reduced rotation and the sleeve member $41_2$ comparatively short. Accordingly, as it is possible to achieve a compact structure and weight saving in the automatic transmission $1_2$, and it is possible to make the inertia (the inertia force) small, it is possible to improve the controllability of the automatic transmission $1_2$ and to reduce the generation of shift shock.

Further, the configuration allows the six forward speeds and the one backward speed to be realized, and both the clutches C1, C2 are engaged in the forward fourth speed, that is, the directly connected state is established in the forward fourth speed. As a result, it is possible to set the gear ratio in the forward fifth speed and the forward sixth speed so that it is high. In the case, in particular, of a vehicle running at a high speed for which mounting has been executed, it is possible to make the engine speed low, and it is possible to contribute to quietness of the vehicle when running at high speed.

Also, because the driven wheel transmission mechanism has the differential portion 5 outputting the rotation to the driven wheel, the counter shaft portion 4 that engages with the differential portion 5, and the output member that is the counter gear that engages with the counter shaft portion 4, it is possible to mount the automatic transmission $1_2$, for example, in the FF vehicle.

Hereinafter, a description will be given, with reference to FIGS. 11 to 14, of a third embodiment that is a partial modification of the first and second embodiments. Note that, in the third embodiment, with the exception of the partially modified portions, the same reference numerals denote the same elements as those of the first embodiment and a description thereof will be omitted.

Figure 11:
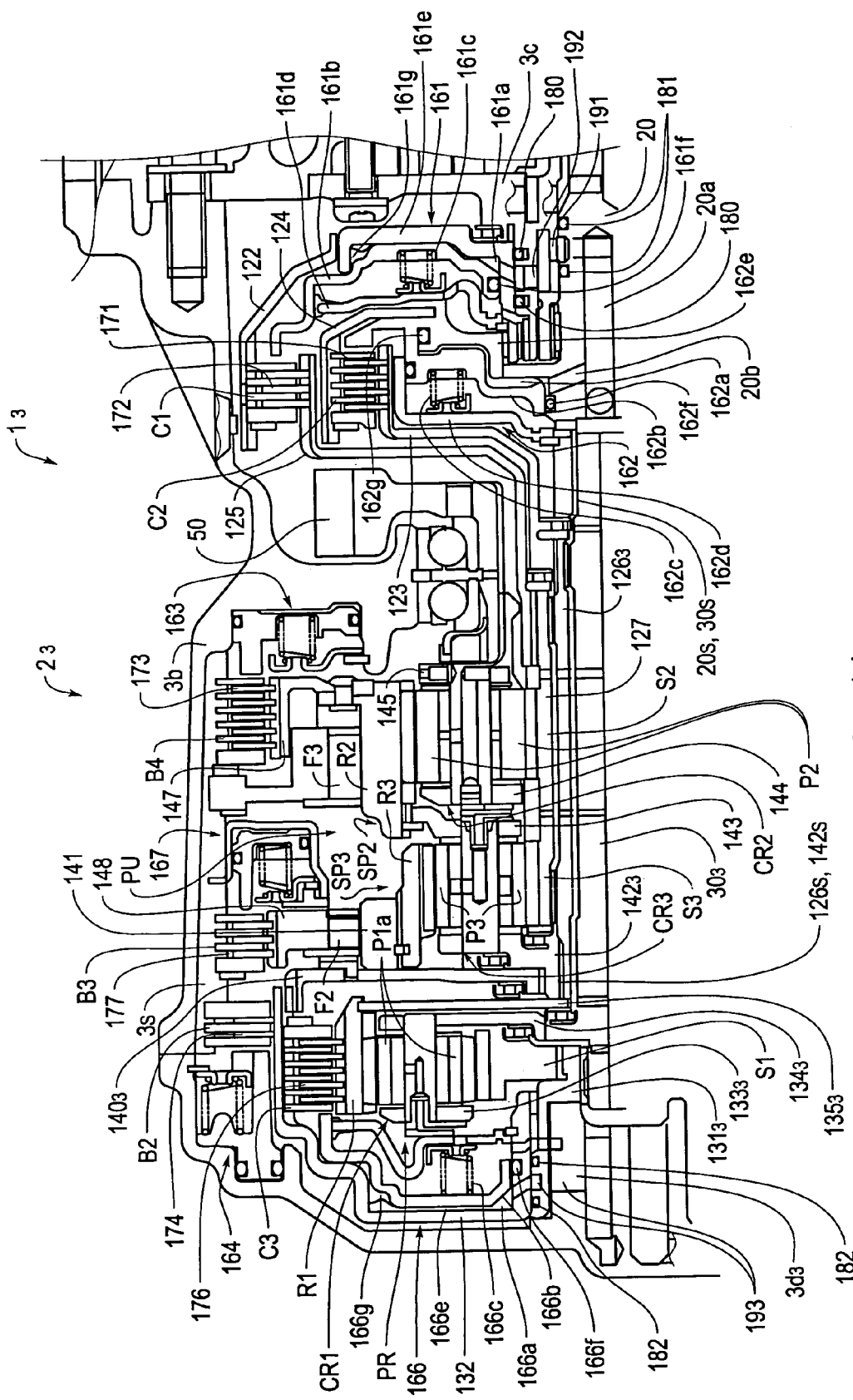
FIG. 11 is a cross sectional view showing an automatic speed change mechanism of an automatic transmission in accordance with a third embodiment.

As shown in FIG. 11, an automatic transmission $1_3$ in accordance with the third embodiment is such that the automatic speed change mechanism 2 of the automatic transmissions $1_1$, $1_2$, according to the first and second embodiments, is modified. An automatic speed change mechanism $2_3$ is structured, in the same manner as the automatic speed change mechanism $2_1$, $2_2$ according to the first and second embodiments, such that a spline 20s, which is formed at an inner peripheral side of the input shaft 20 at the opposite end to the torque converter 12 (refer to FIGS. 1 and 6), is engaged with a spline 30s formed in an outer peripheral side of one end of a center shaft $30_3$, that is, the input shaft 20 and the center shaft $30_3$ are connected in a rotation direction. The planetary gear unit PU and the planetary gear (the reduced rotation output unit, the speed reduction planetary gear) PR are provided on the center shaft $30_3$.

The planetary gear unit PU is a so-called Simpson type planetary gear which is configured from a first simple planetary gear SP2 and a second simple planet SP3. The planetary gear unit PU has, as four rotation elements, a sun gear (a third rotation element, a second sun gear) S2 and a sun gear (also a third rotation element, a third sun gear) S3 which are connected via a sleeve 127 described below, a carrier (a second rotation element, a third carrier) CR3 and a ring gear (a second rotation element, a second ring gear) R2 which are connected by a side plate 143, a ring gear (a first rotation element, a third ring gear) R3, and a carrier (a fourth rotation element, a second carrier) CR2. Further, the planetary gear PR is a so-called double pinion planetary gear having a carrier (an input rotation element, a first carrier) CR1 that is provide with, in an intermeshing manner, a pinion P1a which meshes with a ring gear R1 (an output rotation element, a first ring gear) and a pinion P1b which meshes with a sun gear (a fixed element, a first sun gear) S1.

A multiple disc clutch (a second clutch) C1 having a cylinder member 161e and a drum-like member 122 which form a hydraulic servo 161, a friction disk 172 and a clutch drum (a second clutch drum), and a hub member (a member connected to the third rotation element) 125 connected to the sleeve member 127, is arranged on the input shaft 20 at an outer peripheral side thereof. A multiple disc clutch (a first clutch) C2 having a cylinder member 162e and a drum-like member 124 which form a hydraulic servo 162, a friction disk 171 and a clutch drum (a first clutch drum), and a hub member (a member connected to the second rotation member) 123 connected to a sleeve member $126_3$, is arranged at an inner peripheral side thereof.

The hydraulic servo 161 is configured from a piston member (a second piston) 161b that presses the friction disk 172, a cylinder member 161e that is spline engaged to a cylinder member 162e described below and to which the rotation of the input shaft 20 is input, an oil chamber (a second hydraulic servo oil pressure chamber) 161a which is formed between the piston member 161b and the cylinder member 161e and which is sealed by sealing rings 161f, 161g, a return spring 161c that energizes the piston member 161b in the direction of the oil chamber 161a, and a return plate 161d that receives the energy of the return spring 161c. The oil chamber 161a extends to one end of the case 3, and communicates with an oil passage 192 of a boss portion (a first boss portion) 3c provided on the input shaft 20 such that it has a sleeve shape. Further, the oil passage 192 communicates with the hydraulic control apparatus (not shown). In other words, in the hydraulic servo 161, an oil passage from the hydraulic control apparatus (not shown) to the oil chamber 161a is configured from a pair of sealing rings 80 that seal a portion between the boss portion 3c of the case 3 and the cylinder member 161e.

Further, the hydraulic servo 162 is configured from a piston member (a first piston) 162b, that presses the friction disk 171, a cylinder member 162e, that is firmly fixed to the input shaft 20, an oil chamber (a first hydraulic servo oil pressure chamber) 162a which is formed between the piston member 162b and the cylinder member 162e and which is sealed by sealing rings 162f, 162g, a return spring 162c that energizes the piston member 162b in the direction of the oil chamber 162a, and a return plate 162d that receives the energy of the return spring 162c. The oil chamber 162a communicates with the oil passages 20a, 20b formed in the input shaft 20, and the oil passage 20 communicates with an oil passage 191 of the boss portion 3c. Further, the oil passage 191 communicates with the hydraulic control apparatus (not shown). In other words, because the hydraulic servo 162 is arranged on the input shaft 20, an oil passage from the hydraulic control apparatus (not shown) to the oil chamber 162a is configured from the pair of sealing rings 81 sealing a portion between the boss portion 3c of the case 3 and the input shaft 20.

In other words, the cylinder member 161e described above is connected to the input shaft 20 via the cylinder member 162e described above, and the drum-like member 122 is connected to an outer peripheral side of the cylinder member 161e. The friction disk 172 of the clutch C1, that can be selectively engaged by the hydraulic servo 161 for the clutch C1, is positioned so as to be spline engaged at an inner peripheral side of a leading end portion of the drum-like member 122, and an inner peripheral side of the friction disk 172 of the clutch C1 is connected by spline engagement to the hub member 125. Further, an inner peripheral side of the hub member 125 is connected to one end of the sleeve member 127 which is rotatably provided on the center shaft $30_3$, and the sun gear S2 and the sun gear S3 are integrally formed in an outer peripheral side of the sleeve member 127.

Further, the drum-like member 124 is connected to an outer peripheral side of the cylinder member 162e, the friction disk 171 of the clutch C2, that can be selectively engaged by the hydraulic servo 162 for the clutch C2, is positioned so as to be spline engaged at an inner peripheral side of the leading end portion of the drum-like member 124, and an inner peripheral side of the friction disk 171 of the clutch C2 is connected by spline engagement to the hub member 123. Further, an inner peripheral side of the hub member 123 is connected to one end of the sleeve member 126 rotatably provided on the center shaft $30_3$, a spline 126s is formed in an outer peripheral side of a leading end portion at the other end of the sleeve member 126, and a side plate $142_3$ is connected via a spline 142s of the side plate $142_3$ of the carrier CR3.

On the other hand, provided on a boss portion (a second boss portion) $3d_3$, which extends at the other end of the case 3 opposite to the boss portion 3c and which has a fixed sleeve-like member $131_3$, is a multiple disc clutch (a reduced rotation output unit, a third clutch) C3 having a clutch drum (a third clutch drum) 132 including a hydraulic servo 166, a friction disk 176 and a cylinder portion 166e. The hydraulic servo 166 is configured from a piston member 166b that presses the friction disk 176, an oil chamber 166a which is formed between the piston member 166b and the cylinder portion 166e and is sealed by sealing rings 166f, 166g, a return spring 166c that energizes the piston member 166b in the direction of the oil chamber 166a, and a return plate 166d that receives the energy of the return spring 166c. Note that, the clutch drum 132 is open in the direction of the planetary gear PR, and the planetary gear PR is arranged between the hydraulic servo 166 and the planetary gear unit PU in the axial direction. Further, the friction disk 176 is arranged in a position at which it overlaps the planetary gear PR at an outer diameter side in a diametrical direction.

The oil chamber 166a communicates with an oil passage 193 of the boss portion $3d_3$, and the oil passage 193 communicates with the hydraulic control apparatus (not shown). In other words, in the hydraulic servo 166, an oil passage from the hydraulic control apparatus (not shown) to the oil chamber 166a is configured from a pair of sealing rings 182 sealing a portion between the boss portion $3d_3$ of the case 3 and the drum-like member 132 having the cylinder portion 166e.

The friction disk 176 is spline engaged to an inner peripheral side of the clutch drum 132 of the clutch C3, and an inner peripheral side of the friction disk 176 is spline engaged to the ring gear R1. That is, the clutch drum 132 and the ring gear R1 can be selectively engaged by the clutch C3. Further, the brake (the second brake) B2 having the hydraulic servo 164 and the friction disk 174 is arranged at an outer peripheral side of the clutch drum 132, an outer peripheral side of the friction disk 174 is spline engaged to the spline 3s formed in the inner periphery of the transmission case 3b, and an inner peripheral side of the friction disk 174 is spline engaged to an outer peripheral side of a leading end portion of the clutch drum 132, that is, the clutch drum 132 can be selectively engaged by the brake B2.

The carrier CR1 which has a side plate $133_3$, a side plate $134_3$, and the pinions P1a, P1b (refer to FIG. 12) supported by the side plates $133_3$, $134_3$, meshes with the ring gear R1 via the pinion P1a. The side plate $134_3$ is firmly fixed to the center shaft $30_3$ described above (the input rotation is always input). Further, the carrier CR1 meshes with the sun gear S1 which is spline engaged to the boss portion $3d_3$ of the case 3 as described above so as to be incapable of rotating (be always fixed), via the pinion P1b. In this case, the ring gear R1 is rotatably supported on the center shaft $30_3$ by a disc-shaped member $135_3$.

Further, a transmission member (a reduced rotation output unit) $140_3$, which is rotatably supported on the center shaft $30_3$ via the sleeve member $126_3$ and the side plate $142_3$ of the carrier CR3 and which transmits the rotation of the clutch drum 132, is connected to an inner peripheral side of a leading end portion of the clutch drum 132. The ring gear R3 of the second simple planetary SP3 in the planetary gear unit PU is firmly fixed to approximately an intermediate portion of the transmission member $140_3$.

The one-way clutch (the second one-way clutch) F2 is positioned at the outer peripheral side of the ring gear R3, and the inner race 141 of the one-way clutch F2 is spline engaged to the outer peripheral side of the ring gear R3. Further, the brake (the fourth brake) B3, having the hydraulic servo 167 and the friction disk 177, is positioned at the outer peripheral side of the outer race 148 in the one-way clutch F2, the inner peripheral side of the friction disk 177, is spline engaged to the outer race 148, and the outer peripheral side of the friction disk 177 is spline engaged to the spline 3s formed in the inner periphery of the transmission case 3b, that is, the outer race 148 that can be selectively engaged by the brake B3.

Further, the carrier CR3, which has the side plate $142_3$, that is spline engaged to the sleeve member $126_3$ as described above, the side plate 143, and the pinion P3 supported in the side plates $142_3$, 143, meshes with the inner peripheral side of the ring gear R3 via the pinion P3, and the carrier CR3 meshes with the sun gear S3 formed in the sleeve member 127 via the pinion P3. The side plate 143 of the carrier CR3 is spline engaged to the ring gear R2 of the first simple planetary SP2 of the planetary gear unit PU.

The ring gear R2 is configured such that the ring gear R2 itself forms the inner race of the one-way clutch F3, the one-way clutch (the first one-way clutch) F3 is arranged at the outer peripheral side of one end of the ring gear R2, and the outer race of the one-way clutch F3 is spline engaged to the spline 3s formed in the inner periphery of the transmission case 3b. Further, the brake (the third brake) B4, having the hydraulic servo 163 and the friction disk 173, is arranged at the outer peripheral side of the other end of the ring gear R2, the inner peripheral side of the friction disk 173 is spline engaged to the hub member 147 firmly fixed to the ring gear R2, and the outer peripheral side of the friction disk 173 is spline engaged to the spline 3s formed in the inner periphery of the transmission case 3b, that is, the ring gear R2 that can be selectively engaged by the brake B4.

Further, the carrier CR2 having the side plate 144, the side plate 145, and the pinion P2, supported by the side plates 144, 145, meshes with the inner peripheral side of the ring gear R2 via the pinion P2, and the carrier CR2 meshes with the sun gear S2 formed in the sleeve member 127 via the pinion P2. Further, the carrier CR2 is connected to the counter gear 50 via the side plate 145.

In the same manner, for example, as in the automatic transmissions $1_1$, $1_2$, shown in FIG. 1 or 6, the gear 51 that is fixed onto the fourth counter shaft 52 of the counter shaft portion 4 meshes with the counter gear 50, and the gear 53 of the differential portion 5 meshes with the counter shaft 52 via the gear 52a formed on an outer peripheral surface. Further, the gear 53 is fixed to the housing 54, and the housing 54 is connected to the right and left axles (not shown) via the differential gear 55.

As described above, the clutch C1 and the clutch C2 are arranged on the input shaft 20, and the counter gear 50, the planetary gear unit PU and the planetary gear PR are arranged on the center shaft $30_3$ in that order. In other words, the planetary gear PR is arranged at one side of the planetary gear unit PU in the axial direction, the clutch C1 and the clutch C2 are arranged at the other side in the axial direction, and the counter gear 50 is arranged between the clutch C1, the clutch C2 and the planetary gear unit PU. Further, the clutch C3 and the brake B2 are arranged at the outer peripheral side of the planetary gear PR, and the brake B3 and the brake B4 are arranged at the outer peripheral side of the planetary gear unit PU, respectively. Further, the planetary gear PR, the planetary gear unit PU and the counter gear 50 are provided coaxially with the input shaft 20.

Figure 14:
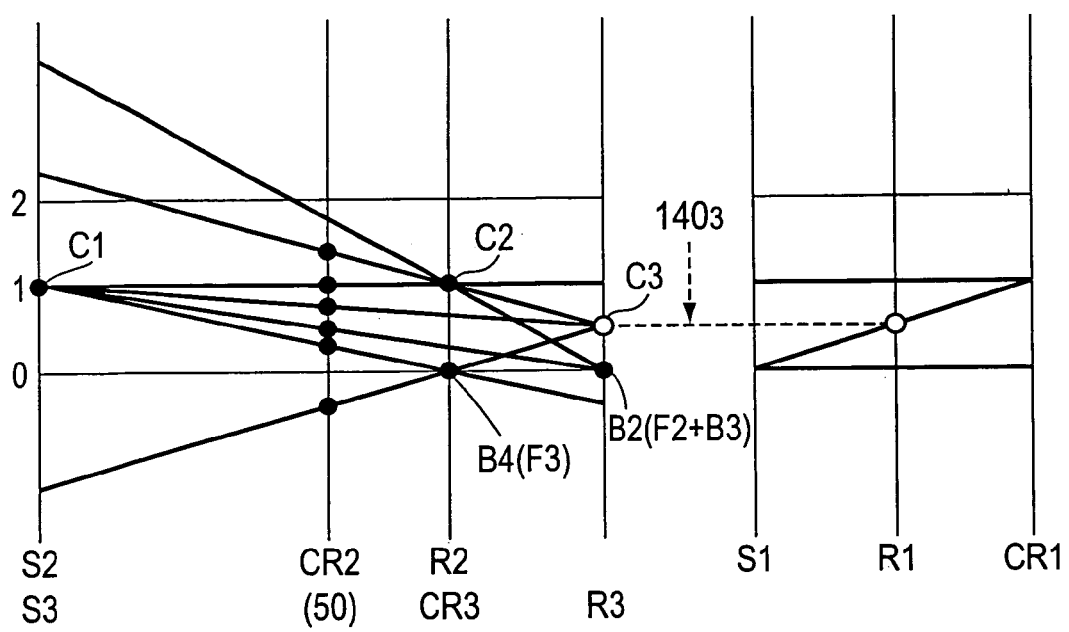
FIG. 14 is a velocity diagram of the automatic transmission in accordance with the third embodiment.

Next, a description will be given of an operation of the automatic transmission $1_3$ with reference to FIGS. 12, 13 and 14 on the basis of the structure described above. It should be noted that, in the velocity diagram shown in FIG. 14, the vertical axis indicates a rotation speed of each of the rotation elements, and the horizontal axis indicates and corresponds to a gear ratio of each of the rotation elements. Further, in the portion for the planetary gear unit PU in the velocity diagram, the vertical axis of the endmost portion in the horizontal direction (the right side in FIG. 14) corresponds to the ring gear R3, and from there toward the left side of the drawing, the vertical axes corresponds to the ring gear R2 and the carrier CR3, the carrier CR2, and the sun gears S2, S3, in that order.

Figures 12, 13:
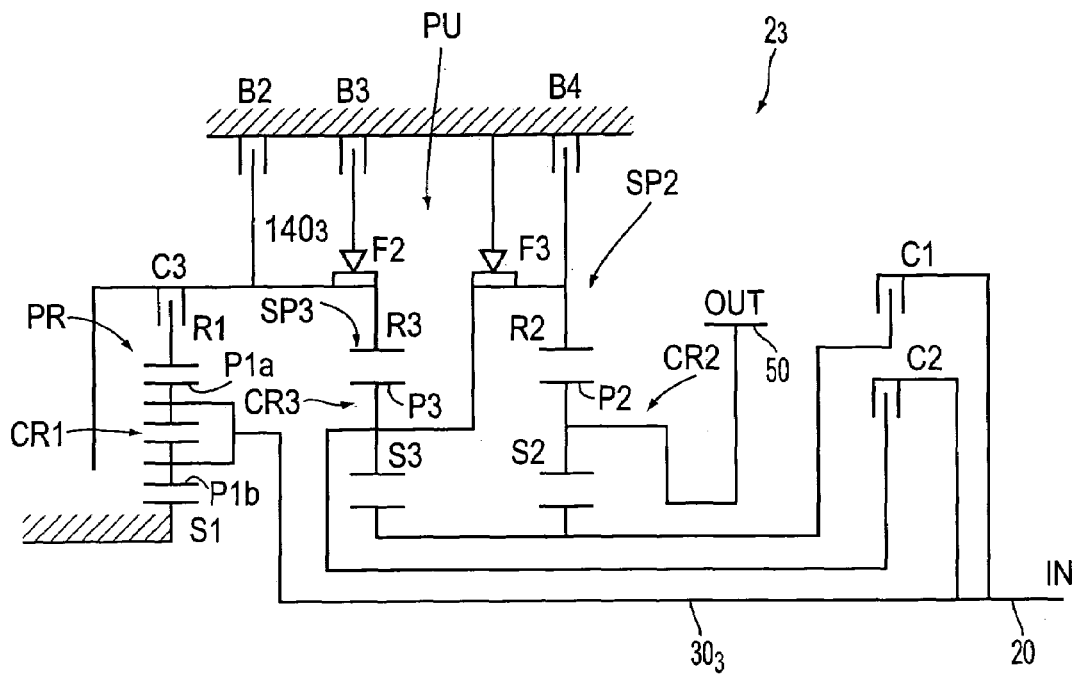
FIG. 12 is a schematic view showing the automatic transmission in accordance with the third embodiment.
FIG. 13 is an engagement table for the automatic transmission in accordance with the third embodiment.

As shown in FIG. 12, the rotation of the input shaft 20 is input to the sun gear S2 and the sun gear S3 with the engagement of the clutch C1. The rotation of the input shaft 20 is input to the carrier CR3 and the ring gear R2 with engagement of the clutch C2; and the carrier CR2 and the ring gear R2 can have their rotation selectively fixed in accordance with engagement of the brake B4, and restricted to one direction by the one-way clutch F3.

On the other hand, the rotation of the input shaft 20 is input to the carrier CR1 via the center shaft $30_3$, the sun gear S1 is fixed in rotation with respect to the case 3, and the ring gear R1 is rotated at a reduced speed as a result of the rotation of the input shaft 20 input to the carrier CR1. The reduced rotation of the ring gear R1 is input to the ring gear R3 via the transmission member $140_3$ with the engagement of the clutch C3. Further, the ring gear R3 is controlled so as to rotate in one direction by the one-way clutch F3 that operates with engagement of the brake B3, and can have its rotation selectively fixed with the engagement of brake B2. Further, the rotation of the ring gear R2 is output to the counter gear 50, and is output to the driven wheel (not shown) via the counter gear 50, the counter shaft portion 4 and the differential portion 5 (refer to FIG. 1 or 6).

In the forward first speed in the drive (D) range, as shown in FIG. 13, the clutch C1 and the one-way clutch F3 are engaged. Accordingly, as shown in FIG. 14, the rotation of the input shaft 20 is input to the sun gears S2, S3 via the clutch C1, and the rotation of the carrier CR3 and the ring gear R2 is restricted to one direction (a forward rotation direction), that is, the ring gear R2 is prevented from rotating backward, and is thereby placed in a fixed state. Further, the reduced rotation is output to the carrier CR2 by the rotation of the input shaft 20 input to the sun gear S2 and the fixed ring gear R2, and a forward rotation that corresponds to the forward first speed is output from the counter gear 50. In this case, in the planetary gear PR, the reduced rotation is output to the ring gear R1 by the carrier CR1 to which the rotation of the input shaft 20 is input and the fixed sun gear S1. However, because the clutch C3 is disengaged, the torque is not transmitted to the transmission member $140_3$. Further, when engine braking (coasting) takes place, the forward first speed state is maintained such that the brake B4 is engaged so as to fix the ring gear R2, and prevent the ring gear R2 from rotating forward.

In this case, in the forward first speed, because the one-way clutch F3 prevents the ring gear R2 from rotating backward and allows it to rotate forward, it is possible to smoothly achieve the forward first speed by automatic engagement of the one-way clutch F3, for example, at a time of changing from a non-running range to a running range.

In the forward second speed in the drive (D) range, as shown in FIG. 13, the clutch C1 and the one-way clutch F2 are engaged. Accordingly, as shown in FIG. 14, the rotation of the input shaft 20 is input to the sun gears S2, S3 via the clutch C1, and the rotation of the ring gear R3 is restricted to one direction (the forward rotation direction), that is, the ring gear R3 is prevented from rotating in reverse and is in a fixed state. Thus, the reduced rotation is output to the carrier CR3 and the ring gear R2 by the rotation of the input shaft 20 input to the sun gear S3 and the fixed ring gear R3; accordingly, a larger reduced rotation than that of the forward first speed described above is output to the carrier CR2 by the rotation of the input shaft 20 input to the sun gear S2 and the reduced rotation input to the ring gear R2, and a forward rotation that corresponds to the forward second speed is output from the counter gear 50. In this case, at this time, in the planetary gear PR, the reduced rotation is output to the ring gear R1 by the carrier CR1 to which the rotation of the input shaft 20 is input and the fixed sun gear S1. However, the clutch C3 is disengaged, so the torque is not transmitted to the transmission member $140_3$. Further, when engine brake (coasting) takes place, the forward second speed state is maintained such that the brake B2 is engaged so as to fix the ring gear R3, and prevent the ring gear R3 from forward rotating.

In this case, when shifting from the forward first speed to the forward second speed, the brake B3 is engaged and the one-way clutch F2 prevents the ring gear R3 from rotating in reverse, whereby the carrier CR3 and the ring gear R2 rotate forward and are automatically disconnected by the one-way clutch F3 engaged in the forward first speed. Accordingly, the shift to the forward second speed can be smoothly executed, for example, while preventing the engine from racing.

In the forward third speed in the drive (D) range, as shown in FIG. 13, the clutch C1 and the clutch C3 are engaged. Accordingly, as shown in FIG. 14, the rotation of the input shaft 20 is input to the carrier CR1, and the ring gear R1 is rotated at reduced speed by the fixed sun gear S1. Further, the reduced rotation of the ring gear R1 is input to the ring gear R3 via the transmission member $140_3$. On the other hand, the rotation of the input shaft 20 is input to the sun gear S3, a slightly larger reduced rotation is output to the carrier CR3 and the ring gear R2 in accordance with the rotation of the input shaft 20 input to the sun gear S3 and the reduced rotation of the ring gear R3, a lager reduced rotation than that of the forward second speed described above is output to the carrier CR2 in accordance with the rotation of the input shaft 20 input to the sun gear S2 and the slightly larger reduced rotation input to the ring gear R2. Thus, and the forward rotation that corresponds to the forward third speed is output from the counter gear 50. In this case, at this time, because the ring gear R1 and the ring gear R3 rotate at the reduced speed, the transmission member $140_3$ transmits a comparatively large torque.

In the forward fourth speed in the drive (D) range, as shown in FIG. 13, the clutch C1 and the clutch C2 are engaged. Accordingly, as shown in FIG. 14, the rotation of the input shaft 20 is input to the sun gears S2, S3 via the clutch C1 and to the carrier CR3 and the ring gear R2 via the clutch C2. Thus, the rotation of the input shaft 20 is output as it is to the carrier CR2 in accordance with the rotation of the input shaft 20 input to the sun gear S2 and the rotation of the input shaft 20 input to the ring gear R2, that is, in a directly connected state, and a forward rotation that corresponds to the forward fourth speed is output from the counter gear 50. In this case, at this time, in the planetary gear PR, the reduced rotation is output to the ring gear R1 by the carrier CR1 to which the rotation of the input shaft 20 is input and the fixed sun gear S1. However, because the clutch C3 is disconnected, the torque is not transmitted to the transmission member $140_3$.

In the forward fifth speed in the drive (D) range, as shown in FIG. 13, the clutch C2 and the clutch C3 are engaged. Accordingly, as shown in FIG. 14, the rotation of the input shaft 20 is input to the carrier CR1, and the ring gear R1 is rotated at a reduced speed by the fixed sun gear S1. Further, the reduced rotation of the ring gear R1 is input to the ring gear R3 via the transmission member $140_3$ in accordance with the engagement of the clutch C3. On the other hand, the rotation of the input shaft 20 is input to the carrier CR3 and the ring gear R2; an increased rotation is output to the sun gears S2, S3 in accordance with the rotation of the input shaft 20 input to the carrier CR3 and the reduced rotation of the ring gear R3; an increased rotation is output to the carrier CR2 in accordance with the rotation of the input shaft 20 input to the ring gear R2 and the increased rotation input to the sun gear S2, and a forward rotation that corresponds to the forward fifth speed is output from the counter gear 50. In this case, at this time, in the same manner as the forward third speed state described above, because the ring gear R1 and the ring gear R3 rotate at the reduced speed, the transmission member $140_3$ transmits a comparatively large torque.

In the forward sixth speed in the drive (D) range, as shown in FIG. 13, the clutch C2 and the brake B2 are engaged. Accordingly, as shown in FIG. 14, the rotation of the input shaft 20 is input to the carrier CR3 and the ring gear R2 via the clutch C2, and the ring gear R3 is fixed in accordance with the engagement of the brake B2. Thus, the rotation becomes an increased rotation (larger than the forward fifth speed described above) in accordance with the rotation of the input shaft 20 input to the carrier CR3 and the fixed ring gear R3, and the increased rotation is output to the sun gears S3, S2, and a greater increased rotation than the forward fifth speed is output to the carrier CR2 in accordance with the rotation of the input shaft 20 input to the ring gear R2 and the increased rotation input to the sun gear S2. Accordingly, a forward rotation that corresponds to the forward sixth speed is output from the counter gear 50. In this case, at this time, in the planetary gear PR, the reduced rotation is output to the ring gear R1 by the carrier CR1 to which the rotation of the input shaft 20 is input and the fixed sun gear S1. However, because the clutch C3 is disengaged, the torque is not transmitted to the transmission member $140_3$.

In the backward first speed in the reverse (R) range, as shown in FIG. 13, the clutch C3 and the brake B4 are engaged. Accordingly, as shown in FIG. 14, the rotation of the input shaft 20 is input to the carrier CR1, and the ring gear R1 rotates at a reduced speed due to the fixed sun gear S1. Further, the reduced rotation of the ring gear R1 is input to the ring gear R3 via the transmission member $140_3$ in accordance with the engagement of the clutch C3. On the other hand, the rotation of the carrier CR3 and the ring gear R2 is fixed in accordance with the engagement of the brake B4. Accordingly, a reverse rotation is output to the sun gears S2, S3 by the fixed carrier CR3 and the reduced rotation of the ring gear R3, the reverse rotation is output to the carrier CR2 by the fixed ring gear R2 and the reverse rotation input to the sun gear S2, and a reverse rotation that corresponds to the backward first speed is output from the counter gear 50. In this case, at this time, because the ring gear R1 and the ring gear R3 rotate at the reduced speed in the same state as in the forward third speed and the forward fifth speed, the transmission member $140_3$ transmits a comparatively large torque.

In the parking (P) range and the neutral (N) range, in particular, the clutch C1, the clutch C2 and the clutch C3 are disengaged, and power transmission between the input shaft 20 and the counter gear 50 is in an interrupted state, so that the entire automatic transmission $1_3$ is in a slipping state (a neutral state).

As described above, in the automatic transmission $1_3$ according to the invention, the planetary gear PR, the clutch C3 and the transmission member $140_3$ which correspond to the reduced rotation output unit are arranged at one side (the left side in FIGS. 11 and 12) in the axial direction of the planetary gear unit PU, the clutch C1 and the clutch C2 are arranged at the other side (the right side in FIGS. 11 and 12) in the axial direction of the planetary gear unit PU, and the counter gear 50 that corresponds to the output member is arranged between the clutch C1, the clutch C2 and the planetary gear unit PU. As a result, it is possible to arrange, in particular, the planetary gear PR and the planetary gear unit PU at positions that are close to each other, and it is possible to make the axial direction length of the transmission member $140_3$, that transmits the reduced rotation, comparatively short. Therefore, it is possible to achieve a compact structure and weight saving of the automatic transmission $1_3$, and it is possible to make the inertia (the inertia force) small in accordance with the weight saving of the transmission member $140_3$. Accordingly, it is possible to improve the controllability of the automatic transmission $1_3$, and it is possible to reduce the generation of shift shock.

Further, because the clutch C1 is connected to the sun gear S2 and the sun gear S3 via the outer peripheral side of the clutch C2, it is possible to prevent the member that connects each of the rotation elements from being complicated, and it is possible to make the automatic transmission $1_3$ compact.

Further, the clutch C2 is structured such that the clutch C1 is arranged at the outer peripheral side thereof, and thus can not have its diameter enlarged to the outer peripheral side. However, it is possible to ensure that the hydraulic servo 162 and, more particularly, the pressure receiving area of the oil chamber 162a for the hydraulic servo 162, is large at the inner peripheral side by providing the hydraulic servo 162 on the input shaft 20 (in comparison with the case, for example, that the hydraulic servo 162 is provided on the boss portion 3c), and it is possible to increase the capacity of the clutch C1.

Further, because the planetary gear PR, the planetary gear unit PU and the counter gear 50 are provided coaxially with the input shaft 20, it is possible to make the driven wheel transmission mechanism (for example, the counter shaft portion 4, or the like) compact, in particular, in the case that the automatic transmission $1_3$ is mounted in the FF vehicle (for example, in comparison with the case that the speed reduction planetary gear, or the like, is provided on another shaft). Thus, for example, it is possible to prevent the driven wheel transmission mechanism from being interfered with by, for example, a vehicle body member, and it is possible to improve ease of vehicle mounting of the automatic transmission $1_3$.

Further, the clutch C3 connects and disconnects the output of the reduced rotation. Accordingly, by disengaging the clutch C3, it is possible to make the rotation of the input shaft that is input to the carrier CR1 rotate idly using the planetary gear PR and, more particularly, using the ring gear R1, while at the same time it is possible to selectively output the reduced rotation to the ring gear R3. As a result, it is possible to directly fix the sun gear S1 to the case 3, or the like, without providing a brake, and it is possible to achieve a compact structure and weight saving of the automatic transmission $1_3$. Further, because a brake fixing the sun gear S1 is not provided, it is possible to dispose the brake B2 that selectively engages the ring gear R3 at the outer peripheral side of the planetary gear PR.

Additionally, because the hydraulic servo 162 is provided on the input shaft 20, it is possible to supply oil to the oil chamber 162a of the hydraulic servo 162 by preventing the oil from leaking from the case 3 using a pair of sealing rings 181, and supplying the oil to the oil passages 20a, 20b provided within the input shaft 20, for example, without providing a sealing ring between the input shaft 20 and the hydraulic servo 162. Further, the hydraulic servos 161, 166 can supply the oil from the boss portions 3c, $3d_3$ that respectively extend from the case 3, for example, without passing through other members, that is, the oil can be supplied by respectively arranging a pair of sealing rings 180, 182. Accordingly, it is possible to supply the oil to the hydraulic servos 162, 161, 166 by simply providing the respective pairs of sealing rings 181, 180, 182, and it is possible to minimize the sliding resistance resulting from the sealing rings, whereby it is possible to improve the efficiency of the automatic transmission $1_3$.

Further, because the friction disk 176 is arranged at an outer peripheral side of the planetary gear PR in the diametrical direction, it is possible to make the automatic transmission $1_3$ compact in the axial direction. Also, because it is possible to arrange the planetary gear PR and the planetary gear unit PU adjacent to each other by arranging the planetary gear PR between the hydraulic servo 166 of the clutch C3 and the planetary gear unit PU in the axial direction (as the hydraulic servo 166 of the clutch C3 is not provided between the planetary gear PR and the planetary gear unit PU), it is possible to make the transmission member $140_3$ comparatively short. Accordingly, it is possible to achieve a compact structure and weight saving for the automatic transmission $1_3$. It is also possible to make the inertia (the inertia force) small, to improve the controllability of the automatic transmission $1_3$, and to reduce the generation of shift shock.

Further, as the planetary gear PR is a double pinion planetary gear, it is possible to output the rotation of the input shaft 20 as the reduced rotation. Further, even in the case that the gear ratio of the automatic transmission $1_3$ is set favorably, high speed rotation can be restricted without making each of the rotation elements of the planetary gear unit and the speed reduction planetary gear large. Accordingly, it is possible to make the automatic transmission $1_3$ compact.

Further, because the planetary gear unit PR is configured such that it includes the carrier CR1 that corresponds to the input rotation element, the sun gear S1 that corresponds to the fixed element, and the ring gear R1 that corresponds to the output rotation element, it is possible to output the rotation of the input shaft 20 as the reduced rotation.

In addition, as the planetary gear unit PU is configured from the first simple planetary gear SP2 having the sun gear S2, the carrier CR2 and the ring gear R2, and the second simple planetary gear SP3 having the sun gear S3, the carrier CR3 and the ring gear R3, it is possible to position the planetary gear PR and the planetary gear unit PU close to each other while, at the same time, it is possible to achieve, for example, the six forward speeds and the one backward speed. Accordingly, it is possible to make the transmission member $140_3$, that transmits the reduced rotation, comparatively short.

Further, the one-way clutch F3 is provided in parallel to the brake B4 and restricts the rotation of the carrier CR3 and the ring gear R2 to one direction. Thus, it is possible to achieve, for example, the forward first speed at a time of normal running in accordance with the engagement of the clutch C1 and the one-way clutch F3. As a result, it is possible to smoothly achieve the forward first speed, for example, at a time of changing from a non-running range to a running range.

Further, as the brake B4 and the one-way clutch F3 are arranged at the outer peripheral side of the planetary gear unit PU, it is possible to make the portion in which the clutches C1, C2 are arranged compact in the axial direction in comparison with the case, for example, where the one-way clutch F3 is positioned adjacent to the clutch C2 (particularly for restricting the rotation of the hub member 123 in one direction). As a result, it is possible to position the counter gear 50 closer to the torque converter side. Further, it is possible to position the gear 51 of the counter shaft 52 closer to the torque converter side, and it is possible to make the counter shaft portion 4 compact in the axial direction.

In addition, because the inner race of the one-way clutch F3 and the ring gear R2 are integrally formed, it is possible to make the automatic speed change mechanism $2_3$ of the automatic transmission $1_3$ compact in the diametrical direction, while, at the same time, is possible to make the counter shaft portion 4 compact in the axial direction.

Further, the one-way clutch F2 is provided which is positioned in parallel to the brake B2 and which restricts the rotation of the ring gear R3 to one direction in accordance with the braking of the brake B3. Thus, it is possible to smoothly carry out shifting, for example, from the forward second speed to the forward third speed.

Additionally, as shown in the velocity diagram, it is possible to arrange the planetary gear PR and the planetary gear unit PU close to each other while achieving the six forward speeds and the one backward speed, and it is possible to make the transmission member $140_3$, that transmits the reduced rotation, short. Accordingly, it is possible to achieve a compact structure and weight saving in the automatic transmission $1_3$, and it is possible to make the inertia (the inertia force) small. As a result, it is possible to improve the controllability of the automatic transmission $1_3$ and to reduce the generation of shift shock.

Further, the configuration allows the six forward speeds and the one backward speed to be achieved. Both the clutches C1, C2 are engaged in the forward fourth speed, that is, the directly connected state is established in the forward fourth speed. As a result, it is possible to set the gear ratio in the forward fifth speed and the forward sixth speed so that it is high. In the case, in particular, of a vehicle running at a high speed for which mounting has been executed, it is possible to make the engine speed low, and it is possible to contribute to quietness of the vehicle when running at high speed.

Further, the driven wheel transmission mechanism has the differential portion 5 that outputs the rotation to the driven wheel, the counter shaft portion 4 that engages with the differential portion 5, and the output member that is the counter gear that engages with the counter shaft portion 4; accordingly, it is possible to mount the automatic transmission $1_3$, for example, in the FF vehicle.

Hereinafter, a description will be given, with reference to FIGS. 15 to 18, of a fourth embodiment that is a partial modification of the third embodiment. It should be noted that, in the fourth embodiment, with the exception of partially modified portions, the same reference numerals denote the same portions as those of the third embodiment, and a description thereof will be omitted.

Figure 15:
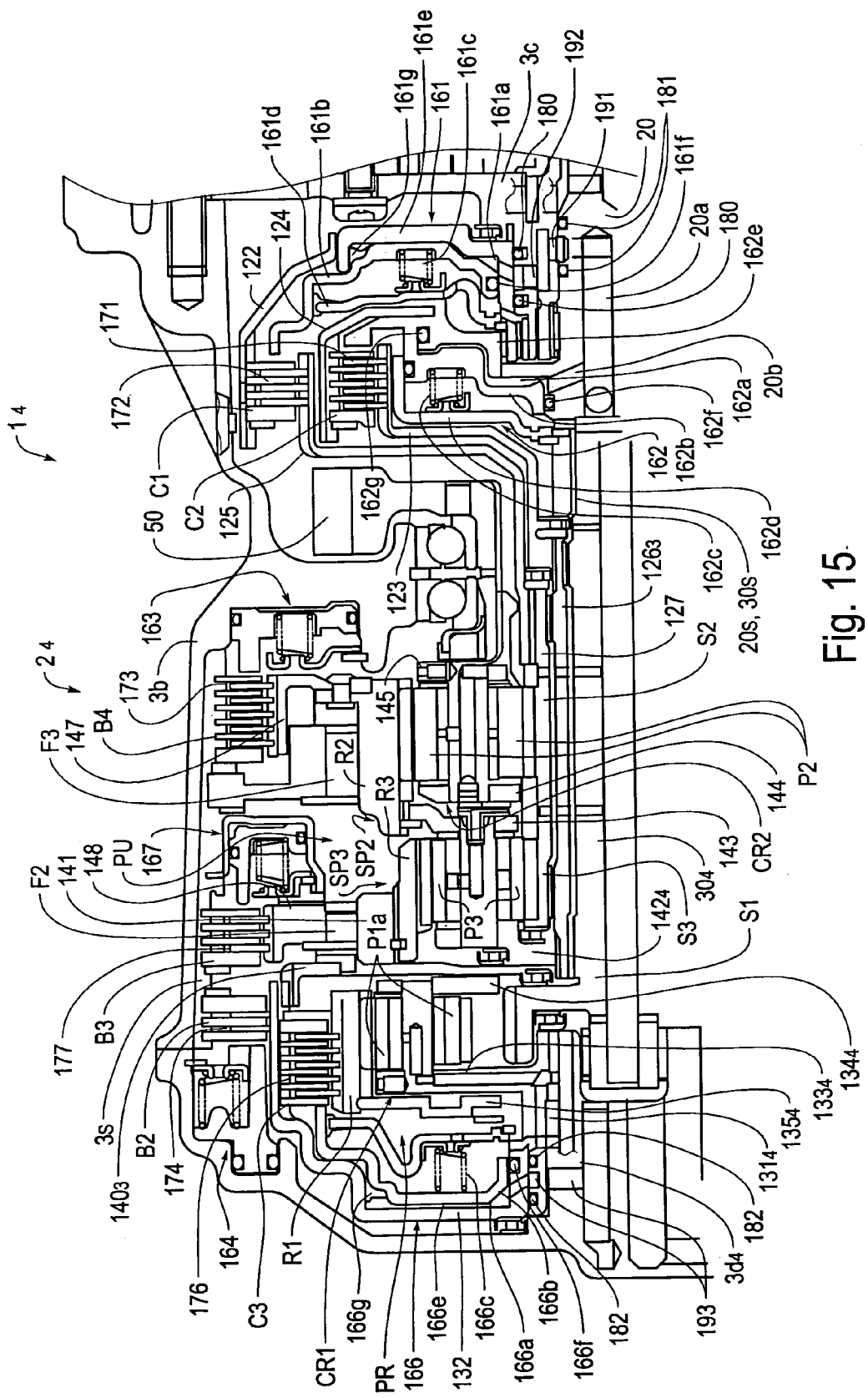
FIG. 15 is a cross sectional view showing an automatic speed change mechanism of an automatic transmission in accordance with a fourth embodiment.
Figures 16, 17:
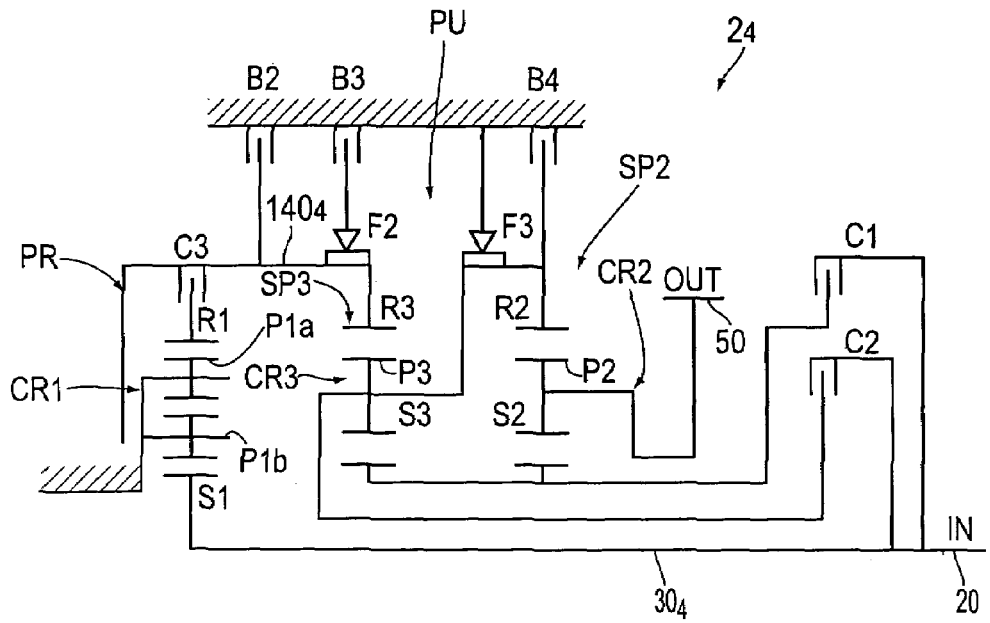
FIG. 16 is a schematic view showing the automatic transmission in accordance with the fourth embodiment.
FIG. 17 is an engagement table for the automatic transmission in accordance with the fourth embodiment.

As shown in FIGS. 15 and 16, an automatic transmission $1_4$ according to the fourth embodiment, as compared with the automatic transmission $1_3$ according to the third embodiment (refer to FIGS. 11 and 12), is structured such that the rotation of the input shaft 20 is input to the sun gear (the input rotation element, the first sun gear) S1 instead of the carrier CR1 of the planetary gear (the reduced rotation output unit, the speed reduction planetary gear) PR.

As shown in FIG. 15, in an automatic speed change mechanism $2_4$, the sun gear S1 is integrally formed with an intermediate shaft $30_4$ at an outer peripheral side (the left side in FIG. 15) of one end of the intermediate shaft $30_4$ at the opposite side to the input shaft 20, and the input rotation is always input. Further, on a boss portion $3d_4$, that is provided with a fixed sleeve-like member $131_4$, a side plate $133_4$ of the carrier (the fixed element, the first carrier) CR1 is spline engaged to the sleeve-like member $131_4$ so as to be firmly fixed (always fixed) onto the boss portion $3d_4$. The carrier CR1 has the pinions P1a, P1b (refer to FIG. 16) that are supported by the other side plate $134_4$; the pinion P1b meshes with the sun gear S1, and the pinion P1a meshes with the ring gear (the output rotation element, the first ring gear) R1. The ring gear R1 is rotatably supported in the sleeve-like member $131_4$ by a disc-shaped member $135_4$.

On the other hand, a transmission member (the reduced rotation output unit) $140_4$, which is rotatably supported on the center shaft $30_4$ and which transmits the rotation of the clutch drum 132, is connected to an inner peripheral side of a leading end portion of the clutch drum (the third clutch drum) 132. Further, the ring gear R3 of the second simple planet SP3 in the planetary gear unit PU is firmly fixed to a substantially central portion of the transmission member $140_4$. Further, the side plate $142_4$ of the carrier CR3 in the second simple planet SP3 is integrally formed with a sleeve member $126_4$ which is spline engaged to the hub member 123 of the clutch C2. In this case, the clutch drum 132 is open in the direction of the planetary gear PR, and the planetary gear PR is arranged between the hydraulic servo 166 and the planetary gear unit PU in the axial direction. Further, the friction disk 176 is positioned so as to overlap with the outer diameter side of the planetary gear PR in the diametrical direction.

Next, a description will be given of an operation of the planetary gear PR of the automatic transmission $1_4$ with reference to FIGS. 16, 17 and 18 on the basis of the structure described above. In this case, in the same manner as the third embodiment described above, in the velocity diagram shown in FIG. 18, the vertical axis indicates the rotation speed of each of the rotation elements, and the horizontal axis indicates and corresponds to a gear ratio of each of the rotation elements. Further, in a portion for the planetary gear unit PU in the velocity diagram, the vertical axis of the endmost portion in the horizontal direction (the right side in FIG. 18) corresponds to the ring gear R3, and from there toward the left side of the drawing, the vertical axes correspond to the ring gear R2 and the carrier CR3, the carrier CR2, the sun gears S2, S3, in that order.

As shown in FIG. 16, the rotation of the input shaft 20 is input to the sun gear S1 via the intermediate shaft $30_4$, the carrier CR1 is fixed in rotation with respect to the case 3, and the ring gear R1 rotates at a reduced speed as a result of the rotation of the input shaft 20 input to the sun gear S1. The reduced rotation of the ring gear R1 is input to the ring gear R3 via the transmission member $140_4$ in accordance with the engagement of the clutch C3.

Figure 18:
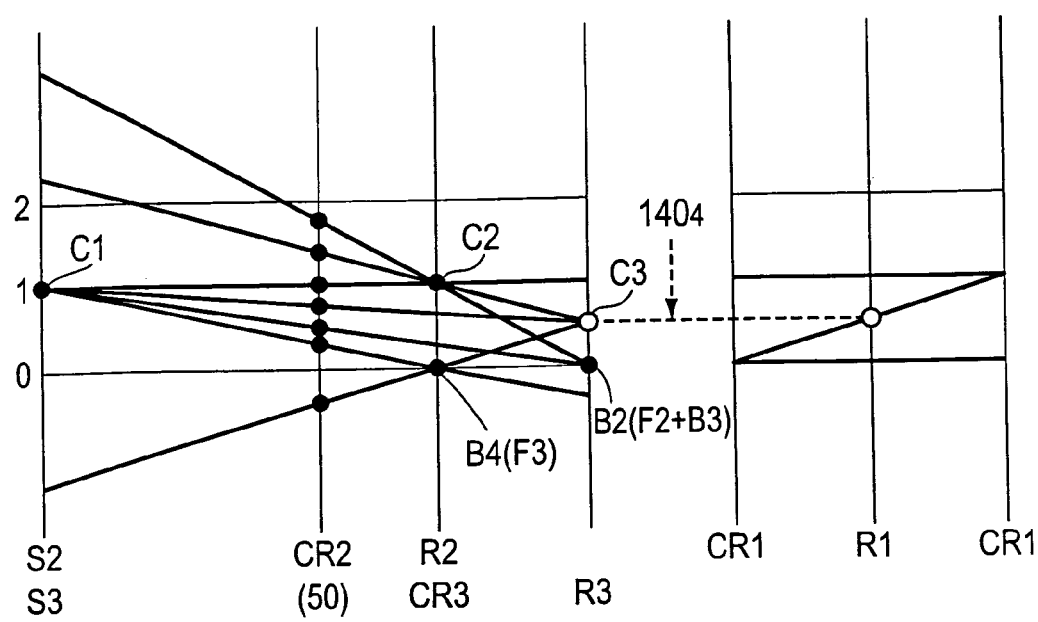
FIG. 18 is a velocity diagram of the automatic transmission in accordance with the fourth embodiment.

Accordingly, as shown in FIGS. 17 and 18, in the forward first speed, the forward second speed, the forward fourth speed and the forward sixth speed, in the planetary gear PR, the reduced rotation is output to the ring gear R3 by the sun gear S1 to which the rotation of the input shaft 20 is input and the fixed carrier CR1. However, because the clutch C3 is disengaged, the torque is not transmitted to the transmission member $140_4$. On the other hand, in the forward third speed, the forward fifth speed and the backward first speed, in the planetary gear PR, because the clutch C3 is engaged, the ring gear R3 rotates at a reduced speed due to the sun gear S1 to which the rotation of the input shaft 20 is input and the fixed carrier CR1, and the reduced rotation of the ring gear R1 is output to the ring gear R3 via the clutch C3 and the transmission member $140_4$. At this time, as the ring gear R1 and the ring gear R3 rotate at the reduced speed, the transmission member $140_4$ transmits a comparatively large torque.

It should be noted that because the operations other than that of the planetary gear PR are the same as those of the third embodiment described above, a description thereof will be omitted.

As described above, with the automatic transmission $1_4$ according to the invention, the planetary gear PR, the clutch C3 and the transmission member $140_4$ which correspond to the reduced rotation output unit are arranged at one side (the left side in FIGS. 15 and 16) in the axial direction of the planetary gear unit PU; the clutch C1 and the clutch C2 are arranged at the other side (the right side in FIGS. 15 and 16) in the axial direction of the planetary gear unit PU, and the counter gear 50 that corresponds to the output member is arranged between the clutch C1, the clutch C2 and the planetary gear unit PU. As a result, it is possible, in particular, to position the planetary gear PR and the planetary gear unit PU close to each other, and it is possible to make the length of the transmission member $140_4$ that transmits the reduced rotation comparatively short in the axial direction. Accordingly, because it is possible to achieve a compact structure and weight saving in the automatic transmission $1_4$, and it is possible to make the inertia (the inertia force) small in accordance with the weight saving of the transmission member $140_4$, it is possible to improve the controllability of the automatic transmission $1_4$ and to reduce the generation of shift shock.

Further, because the clutch C1 is connected to the sun gears S2, S3 via the outer peripheral side of the clutch C2, it is possible to prevent the member that connects each of the rotation elements from being complicated, and it is possible to make the automatic transmission $1_4$ compact.

Further, the clutch C2 is structured such that the clutch C1 is arranged at the outer peripheral side thereof, and can not have its diameter enlarged to the outer peripheral side. However, it is possible to ensure that the hydraulic servo 162, and more particularly, the pressure receiving area of the oil chamber 162a for the hydraulic servo 162, is large at the inner peripheral side by providing the hydraulic servo 162 on the input shaft 20 (in comparison with the case, for example, that the hydraulic servo 162 is provided on the boss portion 3c), and it is possible to increase the capacity of the clutch C1.

Further, since the planetary gear PR, the planetary gear unit PU and the counter gear 50 are provided coaxially with the input shaft 20, it is possible to make the driven wheel transmission mechanism (for example, the counter shaft portion 4, or the like) compact, in particular, in the case that the automatic transmission $1_4$ is mounted in the FF vehicle, (for example, in comparison with the case that the speed reduction planetary gear, or the like, is provided on another shaft). Thus, for example, it is possible to prevent the driven wheel transmission mechanism from being interfered with, for example, by a vehicle body member, and it is possible to improve the ease of mounting of the automatic transmission $1_4$.

Further, the clutch C3 connects and disconnects the output of the reduced rotation. Accordingly, by disengaging the clutch C3, it is possible to make the rotation of the input shaft that is input to the sun gear S1 rotate idly using the planetary gear PR and, more particularly, using the ring gear R1, while, at the same time, it is possible to selectively output the reduced rotation to the ring gear R3. As a result, it is possible to directly fix the sun gear S1 to the case 3, or the like, without providing a brake, and it is possible to achieve a compact structure and weight saving for the automatic transmission $1_3$. Further, because a brake for fixing the carrier CR1 is not provided, it is possible to dispose the brake B2 that selectively engages the ring gear R3 at the outer peripheral side of the planetary gear PR.

Further, as the hydraulic servo 162 is provided on the input shaft 20, it is possible to supply oil to the oil chamber 162a of the hydraulic servo 162 by preventing the oil from leaking from the case 3 using a pair of sealing rings 181, and supplying the oil to the oil passages 20a, 20b provided within the input shaft 20, for example, without providing a sealing ring between the input shaft 20 and the hydraulic servo 162. Further, the hydraulic servos 161, 166 can supply the oil from the boss portions 3c, 3d that extend from the case 3, for example, without passing the oil through other members, that is, the oil can be supplied by respectively providing the pairs of sealing rings 180, 182. Accordingly, it is possible to supply the oil to the hydraulic servos 162, 161, 166 by simply providing the respective pairs of sealing rings 181, 180, 182 and to minimize the sliding resistance resulting from the sealing rings. As a result, it is possible to improve the efficiency of the automatic transmission $1_4$.

Further, because the friction disk 176 is positioned at an outer peripheral side of the planetary gear PR in the diametrical direction, it is possible to make the automatic transmission $1_4$ compact in the axial direction. Additionally, as it is possible to position the planetary gear PR and the planetary gear unit PU adjacent to each other by arranging the planetary gear PR between the hydraulic servo 166 of the clutch C3 and the planetary gear unit PU in the axial direction (because the hydraulic servo 166 of the clutch C3 is not provided between the planetary gear PR and the planetary gear unit PU), it is possible to make the transmission member $140_4$ comparatively short. Accordingly, it is possible to achieve a compact structure and weight saving for the automatic transmission $1_4$ and to make the inertia (the inertia force) small. Accordingly, it is possible to improve the controllability of the automatic transmission $1_4$ and to reduce the generation of shift shock.

Further, because the planetary gear PR is the double pinion planetary gear, it is possible to output the rotation of the input shaft 20 as the reduced rotation. Further, even in the case that the gear ratio of the automatic transmission $1_4$ is set favorably, high speed rotation can be restricted without making each of the rotation elements of the planetary gear unit and the speed reduction planetary gear larger. Accordingly, it is possible to make the automatic transmission $1_4$ compact.

In addition, because the planetary gear unit PR is structured such that the sun gear S1 corresponds to the input rotation element, the carrier CR1 corresponds to the fixed element, and the ring gear R1 corresponds to the output rotation element, it is possible to output the rotation of the input shaft 20 as the reduced rotation.

Further, the planetary gear unit PU is configured from the first simple planetary gear SP2 having the sun gear S2, the carrier CR2 and the ring gear R2, and the second simple planetary gear SP3 having the sun gear S3, the carrier CR3 and the ring gear R3; accordingly, the configuration allows realization of, for example, the six forward speeds and the one backward speed, while, at the same time, it is also possible to position the planetary gear PR and the planetary gear unit PU closer to each other, and make the transmission member $140_4$, that transmits the reduced rotation comparatively short.

Also, because the one-way clutch F3 is positioned in parallel to the brake B4 and restricts the rotation of the carrier CR3 and the ring gear R2 to one direction, it is possible to achieve, for example, the forward first speed at a time of normal running by engagement of the clutch C1 and the one-way clutch F3. Thus, it is possible to smoothly achieve the forward first speed, for example, at a time of changing from a non-running range to a running range.

Further, because the brake B4 and the one-way clutch F3 are arranged at the outer peripheral side of the planetary gear unit PU, it is possible to make the portion in which the clutches C1, C2 are arranged compact in the axial direction in comparison with the case, for example, where the one-way clutch F3 is positioned adjacent to the clutch C2 (particularly for restricting the rotation of the hub member 123 in one direction). As a result, it is possible to position the counter gear 50 closer to the torque converter side. Accordingly, it is possible to position the gear 51 of the counter shaft 52 closer to the torque converter side, and it is possible to make the counter shaft portion 4 compact in the axial direction.

In addition, as the inner race of the one-way clutch F3 and the ring gear R2 are integrally formed, it is possible to make the automatic speed change mechanism $2_4$ of the automatic transmission $1_4$ compact in the diametrical direction, while at the same time is possible to make the counter shaft portion 4 compact in the axial direction.

Further, as the one-way clutch F2 is disposed to be parallel with the brake B2 and restricts the rotation of the ring gear R3 to one direction with the braking of the brake B3, it is possible to smoothly carry out shifting, for example, from the forward second speed to the forward third speed.

Further, as shown in the velocity diagram, the configuration is such that it is possible to arrange the planetary gear PR and the planetary gear unit PU close to each other while achieving the six forward speeds and the one backward speed, and it is possible to make the transmission member $140_4$ that transmits the reduced rotation comparatively short. Accordingly, because it is possible to achieve a compact structure and weight saving for the automatic transmission $1_4$, and it is possible to make the inertia (the inertia force) small, it is possible to improve the controllability of the automatic transmission $1_4$ and reduce the generation of shift shock.

Additionally, the configuration can realize the six forward speeds and the one backward speed, and both the clutches C1, C2 are engaged in the forward fourth speed, that is, the directly connected state is established in the forward fourth speed. As a result, it is possible to set the gear ratio in the forward fifth speed and the forward sixth speed so that it is high. In the case, in particular, of a vehicle running at a high speed for which mounting has been executed, it is possible to make the engine speed low and it contributes to a quietness of the vehicle when running at high speed.

Further, the driven wheel transmission mechanism has the differential portion 5 that outputs the rotation to the driven wheel, the counter shaft portion 4 that engages with the differential portion 5, and the output member that is the counter gear that engages with the counter shaft portion 4. Therefore, it is possible to mount the automatic transmission $1_4$, for example, in the FF vehicle.

Note that, in the first to fourth embodiments, a description is given of embodiments in which the torque converter 12 is provided in the automatic transmission $1_4$. However, the invention is not limited to this, and any structure may be employed so long as the take-off apparatus transmits torque (rotation) at the time of take-off. Further, the description is given for the case that the automatic transmission is mounted in a vehicle in which the drive source is an engine. However, the invention is not limited to this, and the automatic transmission may be mounted in a hybrid vehicle. That is, it goes without saying that the automatic transmission may be mounted in a vehicle having any drive source. Further, the automatic transmission $1_4$ is preferably employed in an FF vehicle. However, the invention is not limited to this, and the automatic transmission may be employed for other drive system vehicles, such as an FR vehicle, a four-wheel drive vehicle, or the like.

A description will be given below, with reference to FIGS. 19 to 21, of a fifth embodiment that is a partial modification of the first and second embodiments. In this case, in the fifth embodiment, with the exception of partially modified portions, the same reference numerals denote the same members as those of the first and second embodiments, and a description thereof will be omitted.

First, a description will be given of an automatic speed change mechanism $2_5$ of the automatic transmission 1 in accordance with the fifth embodiment with reference to FIG. 19. As shown in FIG. 19, the planetary gear unit PU and the planetary gear (the reduced rotation output unit, the speed reduction planetary gear) PR are provided on the input shaft 20. The planetary gear unit PU is a so-called Ravigneaux type planetary gear having four rotation elements, namely, a sun gear (a second rotation element, a third sun gear) S2, a carrier (a third rotation element, a second carrier) CR2, a ring gear (a fourth rotation element, a second ring gear) R2 and a sun gear (a first rotation element, a second gear) S3, in which the carrier CR2 is provided with, in an intermeshing manner, a long pinion PL supported by side plates 242, 244, that meshes with the sun gear S3 and the ring gear R2, and a short pinion PS that meshes with the sun gear S2. Further, the planetary gear PR is a so-called double pinion planetary gear having a carrier (an input rotation element, a first carrier) CR1 that is provided with, in an intermeshing manner, a pinion P2 which meshes with a ring gear (an output rotation element, a first ring gear) R1 and a pinion P1 which meshes with a sun gear (an input rotation element, a first sun gear) S1.

A multiple disc clutch (a first clutch) C1 having a hydraulic servo 262, a friction disk 272, a drum-like member 222 forming a clutch drum (a first clutch drum), and a hub member (a member connected to the second rotation element) 223 connected to the sun gear S2, is arranged on the input shaft 20. A multiple disc clutch (a second clutch) C2 having a hydraulic servo 261, a friction disk 271, a drum member 224 forming a clutch drum (a second clutch drum), and a hub member (a member connected to the third rotation member) 225 connected to the carrier CR2, is arranged at an outer peripheral side of the first clutch C1.

The hydraulic servo 262 is configured from a piston member (a first piston) 262b that presses the friction disk 272, a drum-like member 222 having a cylinder portion 262e, an oil chamber (a first hydraulic servo oil pressure chamber) 262a formed between the piston member 262b and the cylinder portion 262e and sealed by sealing rings 262f, 262g, a return spring 262c that energizes the piston member 262b in the direction of the oil chamber 262a, and a return plate 262d that receives the energy of the return spring 262c. The oil chamber 262a communicates with the oil passages 20a, 20b formed in the input shaft 20, and the oil passage 20a extends to one end of the case 3 and communicates with an oil passage 291 of the boss portion 3c provided so as to have a sleeve shape on the input shaft 20. Further, the oil passage 291 communicates with the hydraulic control apparatus (not shown). In other words, because the hydraulic servo 262 is arranged on the input shaft 20, an oil passage from the hydraulic control apparatus (not shown) to the oil chamber 262a is configured by a pair of sealing rings 281 sealing a portion between the boss portion 3c of the case 3 and the input shaft 20.

Further, the hydraulic servo 261 is configured from a piston member (a second piston) 261b that presses the friction disk 271, a drum-like member 224 having a cylinder member 261e, an oil chamber (a second hydraulic servo oil pressure chamber) 261a formed between the piston member 261b and the cylinder member 261e and sealed by sealing rings 261f, 261g, a return spring 261c that energizes the piston member 261b in the direction of the oil chamber 261a, and a return plate 261d that receives the energy of the return spring 261c. The oil chamber 261a communicates with an oil passage 292 of the boss portion 3c, and the oil passage 292 communicates with the hydraulic control apparatus (not shown). In other words, in the hydraulic servo 261, an oil passage from the hydraulic control apparatus (not shown) to the oil chamber 261a is configured from a pair of sealing rings 280 that seal a portion between the boss portion 3c of the case 3 and the cylinder member 261e.

In other words, the drum-like member 222 described above is connected to the input shaft 20, and the clutch C1, that can be selectively engaged by the hydraulic servo 262 for the clutch C1, is positioned and spline engaged at an inner peripheral side of a leading end portion of the drum-like member 222. An inner peripheral side of the clutch C1 is connected by spline engagement to the hub member 223 and the hub member 223 is connected to the sun gear S2. Further, the clutch C2, that can be selectively engaged by the hydraulic servo 261 for the clutch C2, is positioned and spline engaged at an inner peripheral side of a leading end portion of the drum-like member 224. The hub member 225 is connected by spline engagement to the inner peripheral side of the clutch C2 and is further connected to the carrier CR2.

On the other hand, a multiple disc clutch C3, having a hydraulic servo 265, a friction disk 275, a drum-like member 232 forming a clutch drum (a third clutch drum), and a hub member 235 connected to the ring gear R1, is arranged on the other end (the left side in the drawing) of the input shaft 20. The hydraulic servo 265 is configured from a piston member 265b that presses the friction disk 275, a drum-like member 232 having a cylinder portion 265e, an oil chamber 265a formed between the piston member 265b and the cylinder portion 265e and sealed by sealing rings 265f, 265g, a return spring 265c that energizes the piston member 265b in the direction of the oil chamber 265a, and a return plate 265d that receives the energy of the return spring 265c. Note that the clutch drum, configured from the drum-like member 232, is open in the direction of the planetary gear PR, and the planetary gear PR is arranged between the hydraulic servo 265 and the planetary gear unit PU in an axial direction. Further, the friction disk 275 is positioned such that it overlaps with the planetary gear PR at an outer diameter side in a diametrical direction.

The oil chamber 265a extends to the other end of the case 3 at the opposite side to the boss portion 3c, and communicates with an oil passage 293 of the boss portion 3d provided so as to have a sleeve shape on the input shaft 20, and the oil passage 293 communicates with the hydraulic control apparatus (not shown). In other words, in the hydraulic servo 265, an oil passage from the hydraulic control apparatus (not shown) to the oil chamber 265a is configured by a pair of sealing rings 282 that seal a portion between the boss portion 3d of the case 3 and the drum-like member 232 having the cylinder portion 265e.

Further, a multiple disc brake B1 having a hydraulic servo 264 and a friction disk 274 is arranged at the outer peripheral side of the clutch C3 and an inner peripheral side of the case 3b. The hydraulic servo 264 is configured from a piston member 264b that presses the friction disk 274, a cylinder portion 264e formed in a part of the case 3b, an oil chamber 264a formed between the piston member 264b and the cylinder portion 264e and sealed by sealing rings 264f, 264g, a return spring 264c that energizes the piston member 264b in the direction of the oil chamber 264a, and a return plate 264d that receives the energy of the return spring 264c.

In other words, the drum-like member 232 is rotatably supported on the boss portion 3d, at the left side in the drawing, and the clutch (the third clutch) C3, that can be selectively engaged by the hydraulic servo 265 for the clutch C3, is positioned so as to be spline engaged at an inner peripheral side of a leading end portion of the drum-like member 232. The hub member 235 in which the ring gear R1 is formed is arranged so as to be spline engaged at the inner peripheral side of the clutch C3, and the hub member 235 is rotatably supported by the input shaft 20. Further, the brake (the second brake) B1, that can be selectively engaged by the hydraulic servo 264 for the brake B1, is arranged so as to be spline engaged at an outer peripheral side of the leading end portion of the drum-like member 232. Further, the carrier CR1 has the pinion P1 and the pinion P2. The pinion P2 meshes with the ring gear R1, and the pinion P1 meshes with the sun gear S1 connected to the input shaft 20. The carrier CR1 is fixed to the boss portion 3d of the case 3b via the side plate 231.

Further, the drum-like member 232 with which the clutch C3 and the brake B1 are spline engaged is rotatably supported on the boss portion 3d. The transmission member 240, that transmits the rotation of the ring gear R1, is connected when the clutch C3 is engaged, and the sun gear S3 of the planetary gear unit PU is connected to the other side of the transmission member 240.

On the other hand, a multiple disc brake (a third brake) B2 having a hydraulic servo 263, a friction disk 273 and a hub member 247 is arranged at an outer peripheral side of the planetary gear unit PU. The hydraulic servo 263 is configured from a piston member 263b that presses the friction disk 273, a cylinder portion 263e formed in a part of the case 3b, an oil chamber 263a formed between the piston member 263b and the cylinder portion 263e and sealed by sealing rings 263f, 263g, a return spring 263c that energizes the piston member 263b in the direction of the oil chamber 263a, and a return plate 263d that receives the energy of the return spring 263c.

Further, the one-way clutch (the first one-way clutch) F3 is arranged at an outer peripheral side of the planetary gear unit PU, and an outer race of the one-way clutch F3 is spline engaged to the inner periphery of the transmission case 3d. A hub member 247 with which the brake B2 is spline engaged is connected to the side plate 242 of the carrier CR2 in the planetary gear unit PU, and an inner race of the one-way clutch F3 is connected to the hub member 247. Further, the ring gear R2 meshes with the long pinion PL of the carrier CR2, the connection member 245 is connected to one end of the ring gear R2, and the ring gear R2 is connected to the counter gear 50 via the connection member 245.

As described above, the planetary gear PR is arranged at one side of the planetary gear unit PU in an axial direction, the clutch C1 and the clutch C2 are arranged at the other side in the axial direction, and the counter gear is arranged between the clutch C1, the clutch C2 and the planetary gear unit PU. Further, the clutch C3 and the brake B1 are arranged at the outer peripheral side of the planetary gear PR, and the brake B2 is arranged at the outer peripheral side of the planetary gear unit PU, respectively. Further, the planetary gear PR, the planetary gear unit PU and the counter gear 50 are provided coaxially with the input shaft 20.

Next, a description will be given of an operation of the automatic speed change mechanism 25 with reference to FIGS. 19, 20 and 21 on the basis of the structure described above. It should be noted that, in the velocity diagram shown in FIG. 21, the vertical axis indicates the rotation speed of each of the rotation elements, and the horizontal axis indicates and corresponds to a gear ratio of each of the rotation elements. Further, in the portion for the planetary gear unit PU in the velocity diagram, the vertical axis of the endmost portion in the horizontal direction (the right side in FIG. 21) corresponds to the sun gear S3, and from there toward the left side of the drawing, the vertical axes correspond to the carrier CR2, the ring gear R2, and the sun gear S2.

Figure 19:
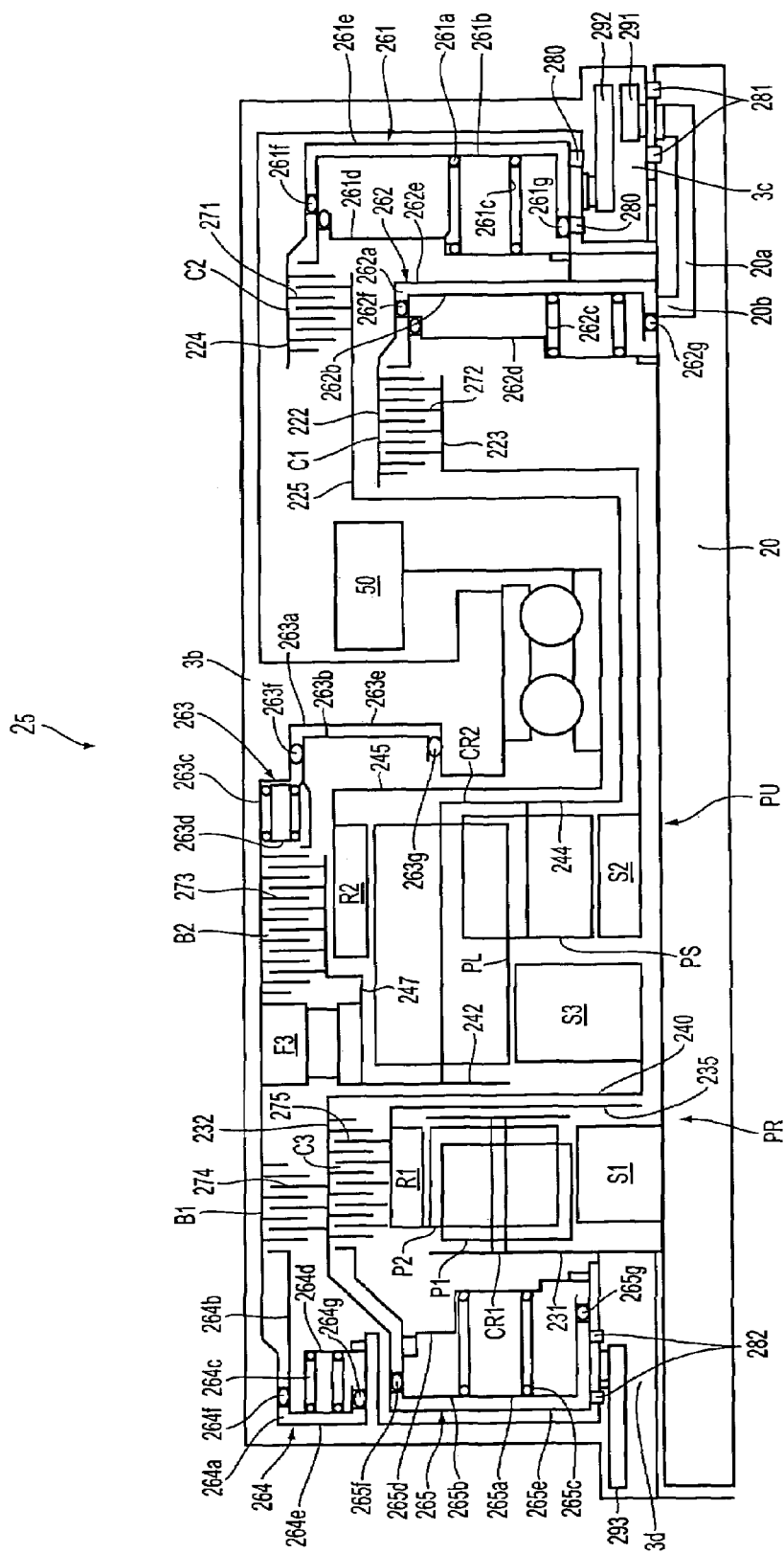
FIG. 19 is a schematic cross sectional view showing an automatic speed change mechanism of an automatic transmission in accordance with a fifth embodiment.

As shown in FIG. 19, the rotation of the input shaft 20 is input to the sun gear S2 in accordance with the engagement of the clutch C1. The rotation of the input shaft 20 is input to the carrier CR2 in accordance with the engagement of the clutch C2, and the carrier CR2 has its rotation selectively fixed in accordance with braking of the brake B2, and is restricted to rotating in one direction by the one-way clutch F3. Further, the sun gear S3 can have its rotation selectively fixed in accordance with braking of the brake B1.

On the other hand, the sun gear S1 is connected to the input shaft 20, the rotation of the input shaft 20 is input to the sun gear S1, and the carrier CR1 is connected to the case 3b and has its rotation fixed. As a result, the ring gear R1 is rotated at a reduced speed. Further, the reduced rotation of the ring gear R1 is input to the sun gear S3 in accordance with the engagement of the clutch C3.

Further, the rotation of the ring gear R2 is output to the counter gear 50, and is output to the driven wheel (not shown) via the counter shaft portion 4 and the differential portion 5 (refer to FIG. 1).

Figures 20, 21:
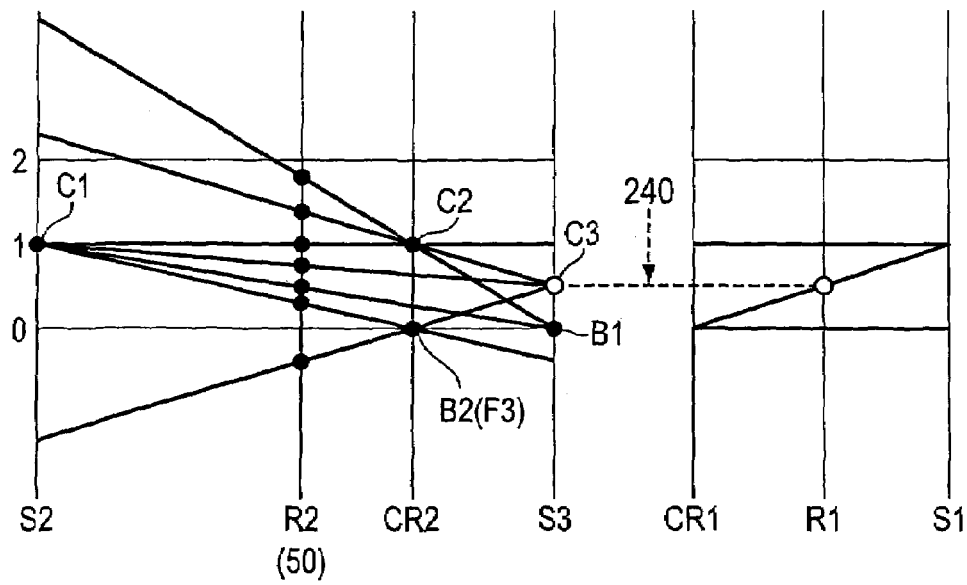
FIG. 20 is an engagement table for the automatic transmission in accordance with the fifth embodiment.
FIG. 21 is a velocity diagram of the automatic transmission in accordance with the fifth embodiment.

In the forward first speed in a drive (D) range, as shown in FIG. 20, the clutch C1 and the one-way clutch F3 are engaged. Accordingly, as shown in FIG. 21, the rotation of the input shaft 20 is input to the sun gear S2 via the clutch C1, and the rotation of the carrier CR2 is restricted to one direction (a forward rotation direction), that is, the carrier CR2 is prevented from being backward rotated, thereby being placed in a fixed state. Further, the rotation of the input shaft 20 input to the sun gear S2 is output to the ring gear R2 via the fixed carrier CR2, and a forward rotation that corresponds to the forward first speed is output from the counter gear 50. In this case, when engine brake (coasting) takes place, the forward first speed state is maintained such that the brake B2 is engaged so as to fix the carrier CR2, and prevent the carrier CR2 from rotating forward. Further, in the forward first speed, the one-way clutch F3 prevents the carrier CR2 from rotating backward and allows it to rotate forward. Accordingly, it is possible to smoothly achieve the forward first speed, for example, at a time of changing from a non-running range to a running range, as a result of automatic engagement of the one-way clutch.

In the forward second speed in the drive (D) range, as shown in FIG. 20, the clutch C1 is engaged, and the brake B1 is engaged. Accordingly, as shown in FIG. 21, the rotation of the input shaft 20 is input to the sun gear S2 via the clutch C1, and the sun gear S3 is fixed in accordance with the engagement of the brake B1. Accordingly, the carrier CR2 rotates at a slightly reduced speed, the rotation of the input shaft 20 input to the sun gear S2 is output to the ring gear R2 via the carrier CR2 rotating at the reduced speed, and a forward rotation that corresponds to the forward second speed is output from the counter gear 50.

In the forward third speed in the drive (D) range, as shown in FIG. 20, the clutch C1 and the clutch C3 are engaged. Accordingly, as shown in FIG. 21, the rotation of the input shaft 20 is input to the sun gear S2 via the clutch C1. Further, the ring gear R1 is rotated at a reduced speed by the rotation of the input shaft input to the sun gear S1 and the fixed carrier CR1. The reduced rotation of the ring gear R1 is output to the sun gear S3 via the clutch C3 and the transmission member 240. Accordingly, the carrier CR2 is rotated at a slightly larger reduced speed than the reduced rotation of the sun gear S3 in accordance with the rotation of the input shaft 20 input to the sun gear S2 and the reduced rotation of the sun gear S3. Further, the rotation of the input shaft 20 input to the sun gear S2 is output to the ring gear R2 via the carrier CR2 rotating at the reduced speed, and the forward rotation that corresponds to the forward third speed is output from the counter gear 50. In this case, at this time, because the sun gear S3 and the ring gear R1 rotate at the reduced speed, the transmission member 240 transmits a comparatively large torque.

In the forward fourth speed in the drive (D) range, as shown in FIG. 20, the clutch C1 and the clutch C2 are engaged. Accordingly, as shown in FIG. 21, the rotation of the input shaft 20 is input to the sun gear S2 via the clutch C1 and to the carrier CR2 via the clutch C2. Thus, the rotation of the input shaft 20 is output as it is to the ring gear R2 in accordance with the rotation of the input shaft 20 input to the sun gear S2 and the rotation of the input shaft 20 input to the carrier CR2, that is, in a directly connected state, and a forward rotation that corresponds to the forward fourth speed is output from the counter gear 50.

In the forward fifth speed in the drive (D) range, as shown in FIG. 20, the clutch C2 and the clutch C3 are engaged. Accordingly, as shown in FIG. 21, the rotation of the input shaft 20 is input to the carrier CR2 via the clutch C2. Further, the ring gear R1 is rotated at a reduced speed by the rotation of the input shaft 20 input to the sun gear S1 and the fixed carrier CR1, and the reduced rotation of the ring gear R1 is output to the sun gear S3 via the clutch C3 and the transmission member 240. Accordingly, an increased rotation is output to the ring gear R2 by the reduced rotation of the sun gear S3 and the carrier CR2 to which the rotation of the input shaft 20 is input, and a forward rotation that corresponds to the forward fifth speed is output from the counter gear 50. In this case, at this time, as with the forward third speed state described above, because the sun gear S3 and the ring gear R1 rotate at the reduced speed, the transmission member 240 transmits a comparatively large torque.

In the forward sixth speed in the drive (D) range, as shown in FIG. 20, the clutch C2 is engaged, and the brake B1 is engaged. Accordingly, as shown in FIG. 21, the rotation of the input shaft 20 is input to the carrier CR2 via the clutch C2, and the sun gear S3 is fixed in accordance with the engagement of the brake B1. Thus, the rotation becomes an increased rotation (larger than the forward fifth speed described above) in accordance with the rotation of the input shaft 20 input to the carrier CR2 and the fixed sun gear S3, and the increased rotation is output to the ring gear R2. Accordingly, a forward rotation that corresponds to the forward sixth speed is output from the counter gear 50.

In the backward first speed in the reverse (R) range, as shown in FIG. 20, the clutch C3 is engaged, and the brake B2 is engaged. Accordingly, as shown in FIG. 21, the ring gear R1 rotates at a reduced speed as a result of the rotation of the input shaft 20 input to the sun gear S1 and the fixed carrier CR1. Further, the reduced rotation of the ring gear R1 is output to the sun gear S3 via the clutch C3 and the transmission member 240. Further, the carrier CR2 is fixed in accordance with the engagement of the brake B2. Accordingly, the rotation is output to the ring gear R2 as reverse rotation in accordance with the reduced rotation of the sun gear S3 and the fixed carrier CR2, and a reverse rotation that corresponds to the backward first speed is output from the counter gear 50. In this case, at this time, because the sun gear S3 and the ring gear R1 rotate at the reduced speed as in the state of the forward third speed and the forward fifth speed, the transmission member 240 transmits a comparatively large torque.

In the parking (P) range and the neutral (N) range, in particular, the clutch C1, the clutch C2 and the clutch C3 are disengaged, and power transmission between the input shaft 20 and the counter gear 50 is in an interrupted state, so that the entire automatic transmission 25 is in a slipping state (a neutral state).

As described above, with the automatic transmission $1_5$ having an automatic speed change mechanism $2_5$, the planetary gear PR, the clutch C3 and the transmission member 240 which correspond to the reduced rotation output unit are arranged at one side (the left side in FIG. 19) in the axial direction of the planetary gear unit PU, the clutch C1 and the clutch C2 are arranged at the other side (the right side in FIG. 19) in the axial direction of the planetary gear unit PU, and the counter gear 50 that corresponds to the output member is arranged between the clutch C1, the clutch C2 and the planetary gear unit PU. Accordingly, it is possible to position, in particular, the planetary gear PR and the planetary gear unit PU close to each other, and it is possible to make the length of the transmission member 240 that transmits the reduced rotation comparatively short in the axial direction. Thus, it is possible to achieve a compact structure and weight saving for the automatic transmission $1_5$, and it is possible to make the inertia (the inertia force) small in accordance with the weight saving of the transmission member 240. Accordingly, it is possible to improve the controllability of the automatic transmission $1_5$, and it is possible to reduce the generation of shift shock.

Further, because the clutch C2 is connected to the carrier CR2 via the outer peripheral side of the clutch C1, it is possible to prevent the member that connects each of the rotation elements from being complicated, and it is possible to make the automatic transmission $1_5$ compact.

Further, the clutch C1 is structured such that the clutch C2 is arranged at the outer peripheral side thereof and, thus, cannot have its diameter enlarged toward the outer peripheral side. However, it is possible to ensure that the hydraulic servo 262, and more particularly, the pressure receiving area of the oil chamber 262a for the hydraulic servo 262, is large at the inner peripheral side by providing the hydraulic servo 262 on the input shaft 20 (in comparison with the case, for example, of provision on the boss portion 3c), and it is possible to increase the capacity of the clutch C1.

Further, because the planetary gear PR, the planetary gear unit PU and the counter gear 50 are provided coaxially with the input shaft 20, it is possible to make the driven wheel transmission mechanism (for example, the counter shaft portion 4, or the like) compact, in particular, in the case that the automatic transmission $1_5$ is mounted in the FF vehicle (for example, in comparison with the case that the speed reduction planetary gear, or the like, is provided on another shaft). Thus, for example, it is possible to prevent the driven wheel transmission mechanism from being interfered with by, for example, a vehicle body member, and it is possible to improve the ease of mounting of the automatic transmission $1_5$.

Further, the clutch C3 connects and disconnects the output of the reduced rotation. Therefore, by disengaging the clutch C3, it is possible to make the rotation of the input shaft input to the sun gear S1 rotate idly using the planetary gear PR and, more particularly, using the ring gear R1, while, at the same time, it is possible to selectively output the reduced rotation to the sun gear S3. Accordingly, it is possible to directly fix the carrier CR1 to the case 3, or the like, without providing a brake. It is also possible to achieve a compact structure and weight saving of the automatic transmission $1_5$. Further, as a brake fixing the carrier CR1 is not provided, it is possible to arrange the brake B1 that selectively engages the sun gear S3 at the outer peripheral side of the planetary gear PR.

Further, because the hydraulic servo 262 is provided on the input shaft 20, it is possible to supply the oil to the oil chamber 262a of the hydraulic servo 262 by preventing the oil from leaking from the case 3 by using the pair of sealing rings 281, and supplying the oil to the oil passages 20a, 20b provided within the input shaft 20, for example, without providing a sealing ring between the input shaft 20 and the hydraulic servo 262. Further, the hydraulic servos 261, 265 can supply oil from the boss portions 3c, 3d that extend from the case 3, for example, without passing the oil through other members, that is, the oil can be supplied by respectively arranging the pairs of sealing rings 280, 282. Accordingly, it is possible to supply the oil to the hydraulic servos 262, 261, 265 by simply providing the pairs of sealing rings 281, 280, 282. It is also possible to minimize the sliding resistance that results from the sealing ring whereby it is possible to improve the efficiency of the automatic transmission $1_5$.

Further, because the friction disk 275 is arranged at an outer peripheral side of the planetary gear PR in the diametrical direction, it is possible to make the automatic transmission $1_5$ compact in the axial direction. Because it is possible to arrange the planetary gear PR and the planetary gear unit PU adjacent to each other by arranging the planetary gear PR between the hydraulic servo 265 of the clutch C3 and the planetary gear unit PU in the axial direction (as the hydraulic servo 265 of the clutch C3 is not provided between the planetary gear PR and the planetary gear unit PU), it is possible to make the transmission member 240 comparatively short. Accordingly, it is possible to achieve a compact structure and weight saving in the automatic transmission $1_5$, and it is possible to make the inertia (the inertia force) small. As a result, it is possible to improve the controllability of the automatic transmission $1_5$, and to reduce the generation of shift shock.

In addition, because the planetary gear PR is the double pinion planetary gear, it is possible to output the rotation of the input shaft 20 as the reduced rotation. Further, even in the case that the gear ratio of the automatic transmission $1_5$ is set favorably, high speed rotation can be restricted without making each of the rotation elements of the planetary gear unit and the speed reduction planetary gear large. Accordingly, it is possible to make the automatic transmission $1_5$ compact.

Additionally, as the planetary gear unit PR is structured such that it includes the sun gear S1 that corresponds to the input rotation element, the carrier CR1 that corresponds to the fixed element, and the ring gear R1 that corresponds to the output rotation element, it is possible to output the rotation of the input shaft 20 as the reduced rotation.

Further, the planetary gear unit PU is a Ravigneaux type planetary gear configured from the sun gear S2, the sun gear S3, the carrier CR2 and the ring gear R2. Accordingly, the configuration makes it possible to achieve, for example, the six forward speeds and the one backward speed, while, at the same time, it is possible to position the planetary gear PR and the planetary gear unit PU close to each other. As a result, it is possible to make the transmission member 240 that transmits the reduced rotation comparatively short.

Because the one-way clutch F3, which is positioned in parallel with the brake B2 and restricts the rotation of the carrier CR2 to one direction, it is possible to achieve, for example, the forward first speed at a time of normal running by engagement of the clutch C1 and the one-way clutch F3. As a result, it is possible to smoothly achieve the forward first speed, for example, at a time of changing from a non-running range to a running range.

As the brake B2 and the one-way clutch F3 are arranged at the outer peripheral side of the planetary gear unit PU, it is possible to make the portion in which the clutches C1, C2 are arranged compact in the axial direction in comparison with the case, for example, where the one-way clutch F3 is arranged adjacent to the clutch C2 (particularly for restricting the rotation of the hub member 223 in one direction). As a result, it is possible to position the counter gear 50 closer to the torque converter side. Thus, it is possible to position the gear 51 of the counter shaft 52 closer to the torque converter side and to make the counter shaft portion 4 compact in the axial direction.

Further, as shown in the velocity diagram, the configuration makes it possible to achieve the six forward speeds and the one backward speed, while it is also possible to arrange the planetary gear PR and the planetary gear unit PU close to one another, and make the transmission member 240, that transmits the reduced rotation, comparatively short. Accordingly, it is possible to achieve a compact structure and weight saving of the automatic transmission $1_5$, and to make the inertia (the inertia force) small. As a result, it is possible to improve the controllability of the automatic transmission $1_5$ and it is possible to reduce the generation of shift shock.

Further, the configuration can realize the six forward speeds and the one backward speed, and both the clutches C1, C2 are engaged in the forward fourth speed, that is, the directly connected state is established in the forward fourth speed. As a result, it is possible to set the gear ratio in the forward fifth speed and the forward sixth speed so that it is high in the case, in particular, of a vehicle running at a high speed for which the mounting has been executed, to make the engine speed low, and to contribute to quietness of the vehicle when running at high speed.

Further, the driven wheel transmission mechanism has the differential portion 5 that outputs the rotation to the driven wheel, the counter shaft portion 4 that engages with the differential portion 5, and the output member that is the counter gear that engages with the counter shaft portion 4. Therefore, it is possible to mount the automatic transmission $1_5$, for example, in the FF vehicle.

Hereinafter, a description will be given, with reference to FIG. 22, of a sixth embodiment that is a partial modification of the fifth embodiment. In this case, in the sixth embodiment, with the exception of the partially modified portions, the same reference numerals denote the same elements as those of the first and second embodiments, and a description thereof will be omitted.

Figure 22:
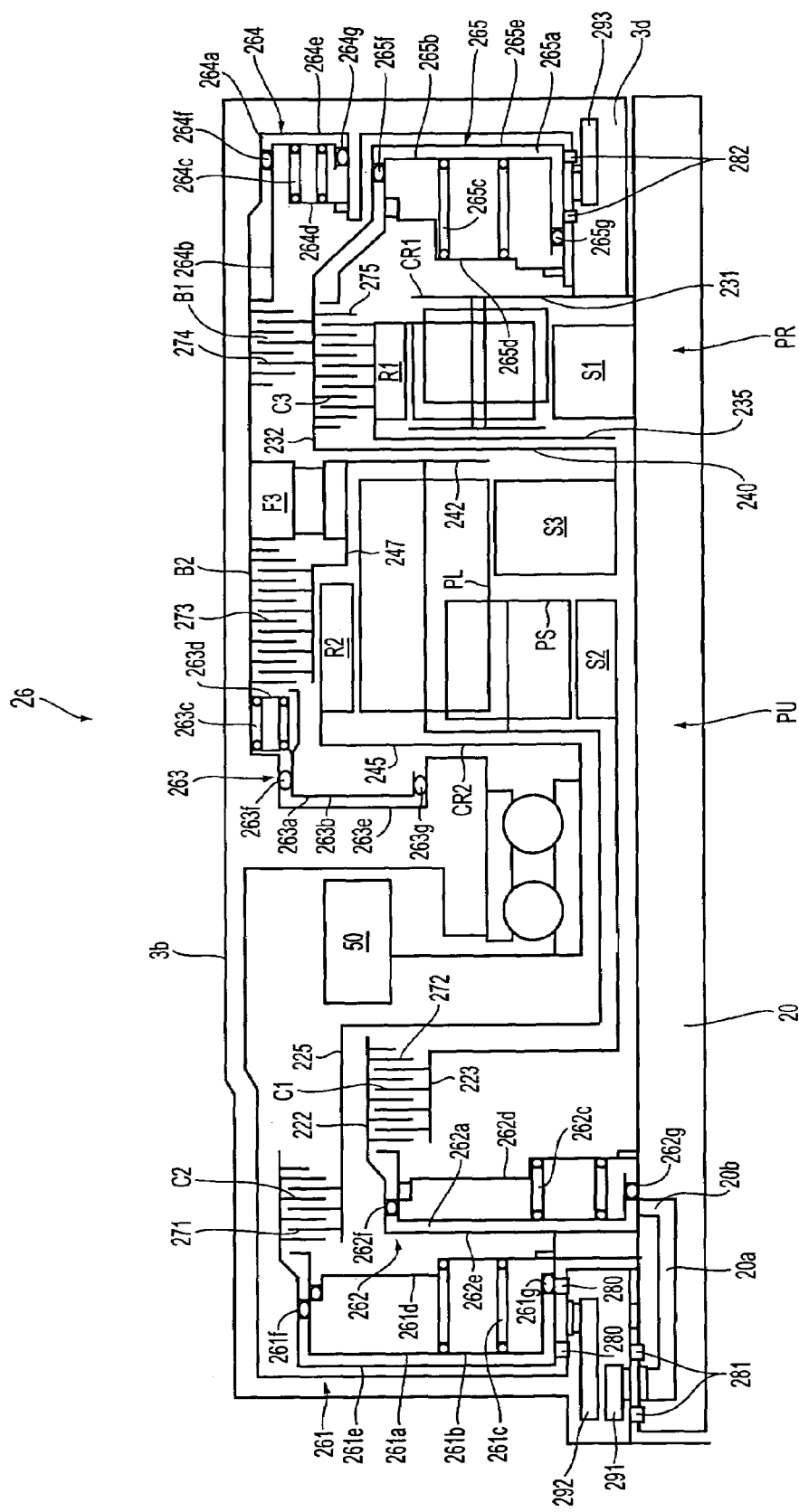
FIG. 22 is a schematic cross sectional view showing an automatic speed change mechanism of an automatic transmission in accordance with a sixth embodiment.

As shown in FIG. 22, an automatic speed change mechanism $2_6$ of the automatic transmission 1 according to the sixth embodiment is structured such that the input side and the output side are reversed with respect to the automatic speed change mechanism $2_5$ (refer to FIG. 19) in accordance with the fifth embodiment. Further, the operations in the forward first speed, the forward sixth speed, and the backward first speed, are the same (refer to FIGS. 20 and 21).

Therefore, in the same manner as the fifth embodiment, in the automatic transmission $1_6$ having the automatic speed change mechanism $2_6$, the planetary gear PR, the clutch C3 and the transmission member 240 which correspond to the reduced rotation output unit are arranged at one side (the right side in FIG. 22) in the axial direction of the planetary gear unit PU, the clutch C1 and the clutch C2 are arranged at the other side (the left side in FIG. 22) in the axial direction of the planetary gear unit PU, and the counter gear 50, that corresponds to the output member, is arranged between the clutch C1, the clutch C2 and the planetary gear unit PU. As a result, it is possible to position, in particular, the planetary gear PR and the planetary gear unit PU close to each other, and it is possible to make the length of the transmission member 240 that transmits the reduced rotation comparatively short in the axial direction. Accordingly, it is possible to achieve a compact structure and weight saving for the automatic transmission $1_6$ and to make the inertia (the inertia force) small in accordance with the weight saving of the transmission member 240. Thus, it is possible to improve the controllability of the automatic transmission $1_6$ and to reduce the generation of shift shock.

Further, because the clutch C2 is connected to the carrier CR2 via the outer peripheral side of the clutch C1, it is possible to prevent the member that connects each of the rotation elements from being complicated and to make the automatic transmission $1_6$ compact.

Further, the clutch C1 is structured such that the clutch C2 is arranged at the outer peripheral side thereof and, thus, can not have its diameter enlarged toward the outer peripheral side. However, it is possible to ensure that the hydraulic servo 262, and more particularly, the pressure receiving area of the oil chamber 262a for the hydraulic servo 262 is large at the inner peripheral side by providing the hydraulic servo 262 on the input shaft 20 (in comparison with the case, for example, of provision on the boss portion 3c), and it is possible to increase the capacity of the clutch C1.

Further, because the planetary gear PR, the planetary gear unit PU and the counter gear 50 are provided coaxially with the input shaft 20, it is possible to make the driven wheel transmission mechanism (for example, the counter shaft portion 4, or the like) compact, in particular, in the case that the automatic transmission $1_6$ is mounted in the FF vehicle, (for example, in comparison with the case that the speed reduction planetary gear, or the like, is provided on another shaft). Thus, for example, it is possible to prevent the driven wheel transmission mechanism from being interfered with, for example, by a vehicle body member, and it is possible to improve the ease of mounting of the automatic transmission $1_6$.

Further, the clutch C3 connects and disconnects the output of the reduced rotation. Accordingly, by disengaging the clutch C3, it is possible to make the rotation of the input shaft that is input to the sun gear S1 rotate idly using the planetary gear PR and, more particularly, using the ring gear R1, while at the same time it is possible to selectively output the reduced rotation to the sun gear S3. Accordingly, it is possible to directly fix the carrier CR1 to the case 3, or the like, without providing a brake, and it is possible to achieve a compact structure and weight saving for the automatic transmission $1_6$. Further, because a brake fixing the carrier CR1 is not provided, it is possible to arrange the brake B1 that can selectively brake the sun gear S3 at the outer peripheral side of the planetary gear PR.

Because the hydraulic servo 262 is provided on the input shaft 20, it is possible to supply the oil to the oil chamber 262a of the hydraulic servo 262 and prevent the oil from leaking from the case 3 by using the pair of sealing rings 281, and to supply the oil to the oil passages 20a, 20b provided within the input shaft 20, without, for example, providing a sealing ring between the input shaft 20 and the hydraulic servo 262. Further, the hydraulic servos 261, 265 can supply the oil from the boss portions 3c, 3d that extend from the case 3, for example, without passing it through other members, that is, the oil can be supplied by respectively arranging the pair of sealing rings 280, 282. Accordingly, it is possible to supply the oil to the hydraulic servos 262, 261, 265 by simply providing the respective pairs of sealing rings 281, 280, 282, and it is possible to minimize the sliding resistance resulting from the sealing rings. As a result, it is possible to improve the efficiency of the automatic transmission $1_6$.

In addition, because the friction disk 275 is arranged at an outer peripheral side of the planetary gear PR in the diametrical direction, it is possible to make the automatic transmission $1_6$ compact in the axial direction. Further, as it is possible to arrange the planetary gear PR and the planetary gear unit PU adjacent to each other by arranging the planetary gear PR between the hydraulic servo 265 of the clutch C3 and the planetary gear unit PU in the axial direction (because the hydraulic servo 265 of the clutch C3 is not provided between the planetary gear PR and the planetary gear unit PU), it is possible to make the transmission member 240 comparatively short. Accordingly, it is possible to achieve a compact structure and weight saving in the automatic transmission $1_6$ as well as make the inertia (the inertia force) small. Thus, it is possible to improve the controllability of the automatic transmission $1_6$ and to reduce the generation of shift shock.

Further, as the planetary gear PR is a double pinion planetary gear, it is possible to output the rotation of the input shaft 20 as the reduced rotation. Further, even in the case that the gear ratio of the automatic transmission $1_6$ is set favorably, the high speed rotation can be restricted without making each of the rotation elements of the planetary gear unit and the speed reduction planetary gear large. Accordingly, it is possible to make the automatic transmission $1_6$ compact.

In addition, because the planetary gear unit PR is structured to include the sun gear S1, that corresponds to the input rotation element, the carrier CR1, that corresponds to the fixed element, and the ring gear R1, that corresponds to the output rotation element, it is possible to output the rotation of the input shaft 20 as the reduced rotation.

Additionally, the planetary gear unit PU is a Ravigneaux type planetary gear configured from the sun gear S2, the sun gear S3, the carrier CR2 and the ring gear R2. Accordingly, the configuration makes it possible to realize, for example, the six forward speeds and the one backward speed, while it is also possible to position the planetary gear PR and the planetary gear unit PU close to each other, and make the transmission member 240 that transmits the reduced rotation comparatively short.

Further, the one-way clutch F3 is provided in parallel to the brake B2 and restricts the rotation of the carrier CR2 to one direction. Accordingly, it is possible to achieve, for example, the forward first speed at a time of normal running by engagement of the clutch C1 and the one-way clutch F3, so that it is possible to smoothly achieve the forward first speed, for example, at a time of changing from a non-running range to a running range.

Further, because the brake B2 and the one-way clutch F3 are arranged at the outer peripheral side of the planetary gear unit PU, it is possible to make the portion in which the clutches C1, C2 are arranged compact in the axial direction in comparison with the case, for example, where the one-way clutch F3 is arranged adjacent to the clutch C2 (particularly for restricting the rotation of the hub member 223 in one direction). Therefore, it is possible to position the counter gear 50 close to the torque converter. Accordingly, it is possible to position the gear 51 of the counter shaft 52 close to the torque converter, and it is possible to make the counter shaft portion 4 compact in the axial direction.

Further, as shown in the velocity diagram of FIG. 21, it is possible to arrange the planetary gear PR and the planetary gear unit PU close to each other while achieving the six forward speeds and the one backward speed and to make the transmission member 240 that transmits the reduced rotation comparatively short. Thus, it is possible to achieve a compact structure and weight saving in the automatic transmission $1_6$ and to make the inertia (the inertia force) small. Accordingly, it is possible to improve the controllability of the automatic transmission $1_6$ and to reduce the generation of shift shock.

Further, the configuration makes it possible to realize the six forward speeds and the one backward speed, and both the clutches C1, C2 are engaged in the forward fourth speed, that is, the directly connected state is established in the forward fourth speed. Accordingly, it is possible to set the gear ratio in the forward fifth speed and the forward sixth speed so that it is high. In the case, in particular, of a vehicle running at a high speed for which mounting has been executed, it is possible to make the engine speed low and to contribute to quietness of the vehicle when running at high speed.

Further, the driven wheel transmission mechanism has the differential portion 5 that outputs the rotation to the driven wheel, the counter shaft portion 4 that engages with the differential portion 5, and the output member that is the counter gear that engages with the counter shaft portion 4. Accordingly, it is possible to mount the automatic transmission $1_6$, for example, in the FF vehicle.

Hereinafter, a description will be given, with reference to FIGS. 23 to 25, of a seventh embodiment that is a partial modification of the fifth embodiment. It should be noted that, in the seventh embodiment, with the exception of the partially modified portions, the same reference numerals denote the same elements as those of the fifth embodiment and a description thereof will be omitted.

Figure 23:
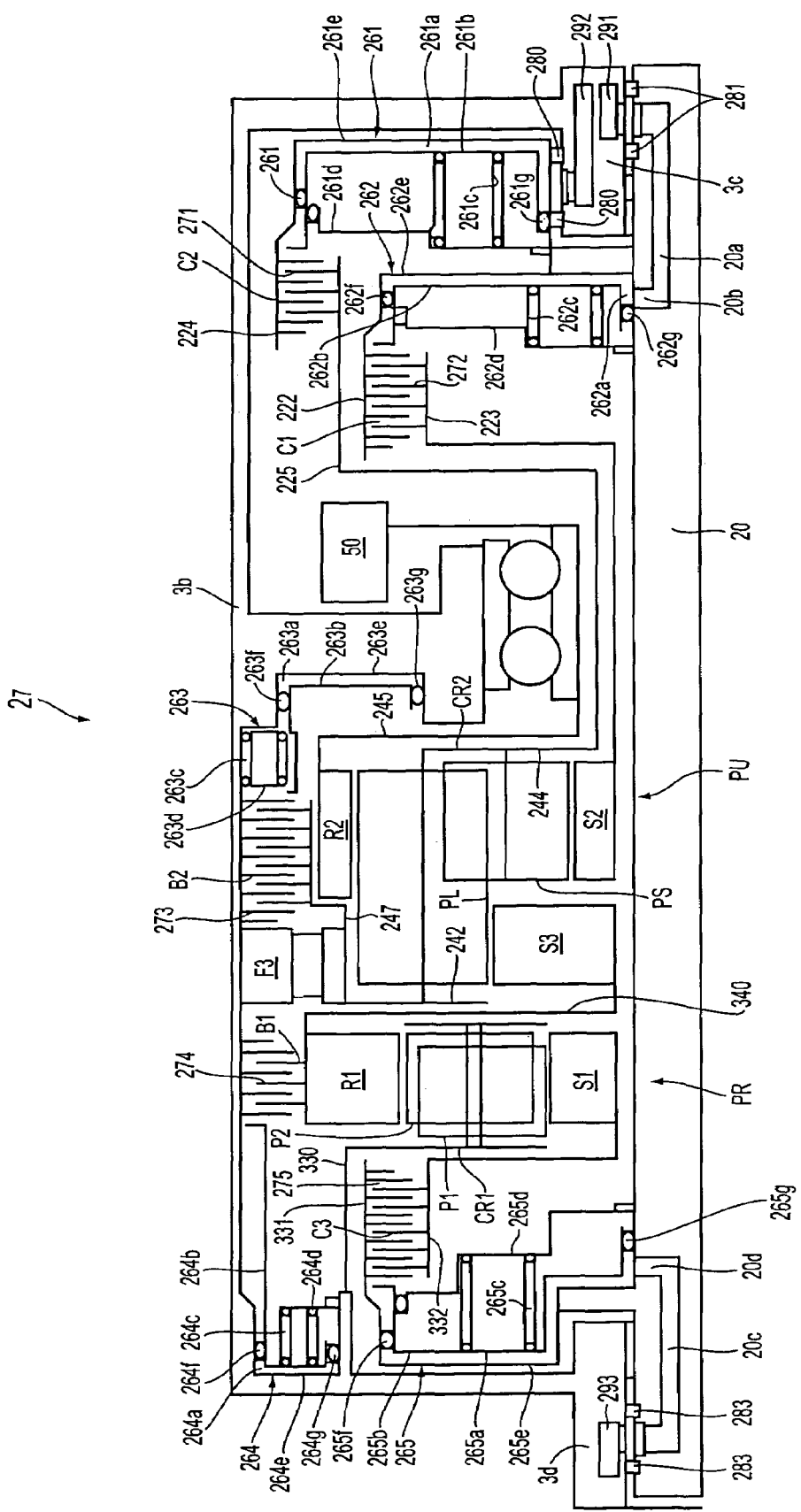
FIG. 23 is a schematic cross sectional view showing an automatic speed change mechanism of an automatic transmission in accordance with a seventh embodiment.

As shown in FIG. 23, an automatic speed change mechanism $2_7$ of the automatic transmission $1_7$ in accordance with the seventh embodiment is structured such that the arrangement of the planetary gear PR and the clutch C3 is changed with respect to the automatic speed change mechanism $2_5$ in accordance with the fifth embodiment (refer to FIG. 19).

In the automatic speed change mechanism $2_7$, the clutch (the third clutch) C3 is arranged at the opposite side (the left side in the drawing) of the planetary gear (the reduced rotation output unit, the speed reduction planetary gear) PR to the planetary gear unit PU. An inner peripheral side of a drum-like member 331 of the clutch C3 is spline engaged to the friction disk 275. Further, the drum-like member 331 of the clutch C3 is connected to the input shaft 20.

On the other hand, the sun gear (the input rotation element, the first sun gear) S1 is rotatably supported by the input shaft 20, and is connected to a hub member 332. The friction disk 275 is spline engaged to an outer peripheral side of a leading end portion of the hub member 332. Further, the carrier (the fixed element, the first carrier) CR1 is fixed and supported by the case 3b such that a fixed member 330 is connected to the side plate thereof. Further, the friction disk 274 of the brake B1 is spline engaged to the outer peripheral side of the ring gear (the output rotation element, the first ring gear) R1, a transmission member 340 is connected to the ring gear R1, and the sun gear S3 is connected via the transmission member 340.

The oil chamber 265a of the hydraulic servo 265 for the clutch C3 communicates with oil passages 20c, 20d formed in the input shaft 20, and the oil passage 20c communicates with an oil passage 293 of the boss portion 3d in the case 3. Further, the oil passage 293 communicates with the hydraulic control apparatus (not shown). In other words, the hydraulic servo 265 is arranged on the input shaft 20, an oil passage from the hydraulic control apparatus (not shown) to the oil chamber 265a is configured by a pair of sealing rings 283 that seal a portion between the boss portion 3d of the case 3 and the input shaft 20.

Next, a description will be given of an operation of the automatic speed change mechanism $2_7$ with reference to FIGS. 23, 24 and 25 on the basis of the structure described above. Note that, in the same manner as the fifth embodiment described above, in the velocity diagram shown in FIG. 25, the vertical axis indicates a rotation speed of each of the rotation elements, and the horizontal axis indicates and corresponds to a gear ratio of each of the rotation elements. Further, in the portion of the velocity diagram for the planetary gear unit PU, the vertical axis at the endmost portion in the horizontal direction (the right side in FIG. 25) corresponds to the sun gear S3, and from there toward the left side of the drawing, the vertical axes correspond to the carrier CR2, the ring gear R2 and the sun gear S2, respectively.

As shown in FIG. 23, the rotation of the input shaft 20 is input to the sun gear S1 in accordance with the engagement of the clutch C3. Further, the rotation of the carrier CR1 is fixed with respect to the case 3, and the ring gear R1 described above rotates at a reduced speed on the basis of the rotation of the input shaft 20 input to the sun gear S1. In other words, the reduced rotation of the ring gear R1 is input to the sun gear S3 via the transmission member 340 in accordance with the engagement of the clutch C3.

Figures 24, 25:
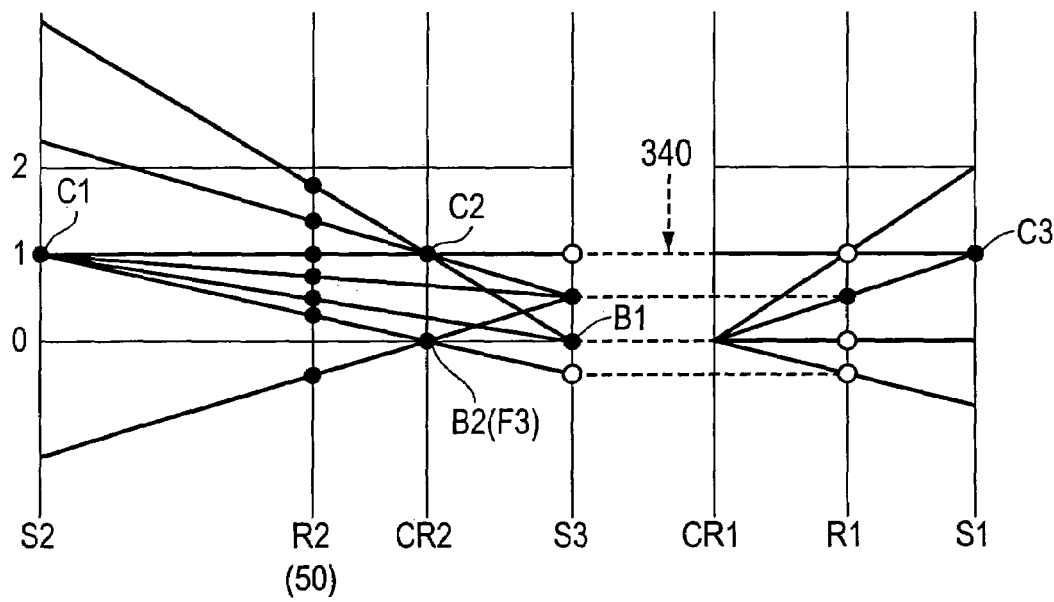
FIG. 24 is an engagement table for the automatic transmission in accordance with the seventh embodiment.
FIG. 25 is a velocity diagram of the automatic transmission in accordance with the seventh embodiment.

Accordingly, as shown in FIGS. 24 and 25, in the planetary gear PR, in the forward third speed, the forward fifth speed and the backward first speed, the clutch C3 is engaged, whereby the rotation of the input shaft 20 is input to the sun gear S1, the reduced rotation is output to the ring gear R3 by the fixed carrier CR1, and the reduced rotation is input to the sun gear S3 via the transmission member 340. At this time, because the ring gear R1 and the sun gear S3 are rotated at the reduced speed, the transmission member 340 transmits a comparatively large torque. On the other hand, in the forward first speed, the forward second speed, the forward fourth speed and the forward sixth speed, the rotation of the sun gear S3 is input to the ring gear R1 via the transmission member 340 and the clutch C3 is disengaged. Accordingly, the sun gear S1 is rotated on the basis of the rotation of the ring gear R1 in each of the shift speeds and the fixed carrier CR1 as shown in FIG. 25.

Note that, the operations other than that of the planetary gear PR are the same as those of the fifth embodiment described above. Accordingly, a description thereof will be omitted.

As described above, with the automatic transmission $2_7$, the planetary gear PR, the clutch C3, and the transmission member 340 which correspond to the reduced rotation output unit are arranged at one side (the left side in FIG. 23) in the axial direction of the planetary gear unit PU, the clutch C1 and the clutch C2 are arranged at the other side (the right side in FIG. 23) in the axial direction of the planetary gear unit PU, and the counter gear 50, that corresponds to the output member, is arranged between the clutch C1, the clutch C2 and the planetary gear unit PU. Accordingly, it is possible to position, in particular, the planetary gear PR and the planetary gear unit PU close to each other, and it is possible to make the length of the transmission member 340, that transmits the reduced rotation, comparatively short in the axial direction. Accordingly, it is possible to achieve a compact structure and weight saving for the automatic transmission $1_7$ to make the inertia (the inertia force) small in accordance with the weight saving of the transmission member 340. Accordingly, it is possible to improve the controllability of the automatic transmission $1_7$ and to reduce the generation of shift shock.

Further, because the clutch C2 is connected to the carrier CR2 via the outer peripheral side of the clutch C1, it is possible to prevent the member that connects each of the rotation elements from being complicated and to make the automatic transmission $1_7$ compact.

Further, the clutch C1 is structured such that the clutch C2 is arranged at the outer peripheral side thereof and, thus, its diameter cannot be enlarged toward the outer peripheral side. However, it is possible to ensure that the hydraulic servo 262, and more particularly, the pressure receiving area of the oil chamber 262a of the hydraulic servo 262, is large at the inner peripheral side by providing the hydraulic servo 262 on the input shaft 20 (in comparison with the case, for example, of provision on the boss portion 3c), and it is possible to increase the capacity of the clutch C1.

Further, because the planetary gear PR, the planetary gear unit PU and the counter gear 50 are provided coaxially with the input shaft 20, it is possible to make the driven wheel transmission mechanism (for example, the counter shaft portion 4, or the like) compact, in particular, in the case where the automatic transmission $1_7$ is mounted in the FF vehicle (for example, in comparison with the case that the speed reduction planetary gear, or the like, is provided on another shaft). Thus, for example, it is possible to prevent the driven wheel transmission mechanism from being interfered with by, for example, a vehicle body member, and it is possible to improve the ease of mounting of the automatic transmission $1_7$.

Further, for example, as disclosed in Japanese Patent Laid-Open Publication No. 2001-263438, in the case that the clutch C3 is interposed between the ring gear R1 and the sun gear S3, it is necessary to connect and disconnect the reduced rotation, so that the structure becomes comparatively large, and a distance between the planetary gear PR and the planetary gear unit PU is lengthened. However, as a result of interposition between the input shaft 20 and the sun gear S1, the reduced rotation output from the ring gear R1 of the planetary gear PR is connected and disconnected by connecting and disconnecting the rotation of the input shaft 20 using the clutch C3. Accordingly, it is possible to make the clutch C3 compact, and to arrange the planetary gear PR and the planetary gear unit PU at comparatively close positions. Therefore, it is possible to make the automatic transmission $1_7$ compact.

Further, as the hydraulic servos 262, 265 are provided on the input shaft 20, it is possible to supply the oil to the oil chambers 262a, 265a of the hydraulic servos 262, 265 by preventing the oil from leaking from the case 3 using the pairs of sealing rings 281, 283, and by supplying the oil to the oil passages 20a, 20b, 20c, 20d provided within the input shaft 20, for example, without providing a sealing ring between the input shaft 20 and the hydraulic servos 262, 265. Further, the hydraulic servo 261 can supply the oil from the boss portion 3c that extends from the case 3, for example, without passing it through other members, that is, the oil can be supplied by respectively arranging the pair of sealing rings 280. Accordingly, it is possible to supply the oil to the hydraulic servos 262, 261, 265 by simply arranging the respective pairs of sealing rings 281, 280, 283 and to minimize the sliding resistance that results from the sealing ring. As a result, it is possible to improve the efficiency of the automatic transmission $1_7$. Further, the hydraulic servos 262, 265 are arranged on the input shaft 20. However, as they are arranged separately at one end side (the right side in FIG. 23) and the other end side (the left side in FIG. 23) of the input shaft 20, respectively, it is not necessary to provide the hydraulic passages (for example, the oil passage 20a and the oil passage 20c) for the hydraulic servo within the input shaft 20 such that they overlap. Accordingly, it is possible to narrow the input shaft 20 and to further compact the automatic transmission $1_7$.

Additionally, because the planetary gear PR is a double pinion planetary gear, it is possible to output the rotation of the input shaft 20 as the reduced rotation. Further, even in the case where the gear ratio of the automatic transmission $1_7$ is set favorably, high speed rotation can be restricted without making each of the rotation elements of the planetary gear unit and the speed reduction planetary gear large. Accordingly, it is possible to further compact the automatic transmission $1_7$.

Further, as the planetary gear PR is structured to include the sun gear S1, that corresponds to the input rotation element, the carrier CR1, that corresponds to the fixed element, and the ring gear R1, that corresponds to the output rotation element, it is possible to output the rotation of the input shaft 20 as the reduced rotation.

In addition, the planetary gear unit PU is a Ravigneaux type planetary gear configured from the sun gear S2, the sun gear S3, the carrier CR2 and the ring gear R2. Accordingly, it is possible to arrange the planetary gear PR and the planetary gear unit PU close to each other so as to achieve, for example, the six forward speeds and the one backward speed. Thus, it is possible to make the transmission member 340 that transmits the reduced rotation comparatively short.

Further, because the one-way clutch F3 is provided in parallel to the brake B2 and restricts the rotation of the carrier CR2 to one direction, it is possible to achieve the forward first speed, for example, at a time of normal running by engagement of the clutch C1 and the one-way clutch F3. Accordingly, it is possible to smoothly achieve the forward first speed, for example, at a time of changing from a non-running range to a running range.

Further, as the brake B2 and the one-way clutch F3 are arranged at the outer peripheral side of the planetary gear unit PU, it is possible to make the portion in which the clutches C1, C2 are arranged compact in the axial direction in comparison with the case, for example, where the one-way clutch F3 is arranged adjacent to the clutch C2 (particularly for restricting the rotation of the hub member 223 in one direction). As a result, it is possible to position the counter gear 50 closer to the torque converter side. Therefore, it is possible to position the gear 51 of the counter shaft 52 closer to the torque converter side and to make the counter shaft portion 4 compact in the axial direction.

Further, as shown in the velocity diagram, the configuration is able to realize the six forward speeds and the one backward speed, while it is also possible to position the planetary gear PR and the planetary gear unit PU close to each other, and make the transmission member 340, that transmits the reduced rotation, comparatively short. Accordingly, it is possible to achieve a compact structure and weight saving of the automatic transmission $1_7$ and to make the inertia (the inertia force) small. As a result, it is possible to improve the controllability of the automatic transmission $1_7$ and to reduce the generation of shift shock.

Further, the configuration can realize the six forward speeds and the one backward speed, and both clutches C1, C2 are engaged in the forward fourth speed, that is, the directly connected state is established in the forward fourth speed. Accordingly, it is possible to set the gear ratio in the forward fifth speed and the forward sixth speed so that it is high. In the case, in particular, of a vehicle running at a high speed for which mounting has been executed, it is possible to make the engine speed low and to contribute to quietness of the vehicle when running at high speed.

Further, the driven wheel transmission mechanism has the differential portion 5 that outputs the rotation to the driven wheel, the counter shaft portion 4 that engages with the differential portion 5, and the output member that is the counter gear that engages with the counter shaft portion 4. Accordingly, it is possible to mount the automatic transmission $1_7$, for example, in the FF vehicle.

Hereinafter, a description will be given, with reference to FIGS. 26 to 28, of an eighth embodiment that is a partial modification of the fifth embodiment. In the eighth embodiment, with the exception of partially modified portions, the same reference numerals denote the same elements as those of the fifth embodiment and a description thereof will be omitted.

Figure 26:
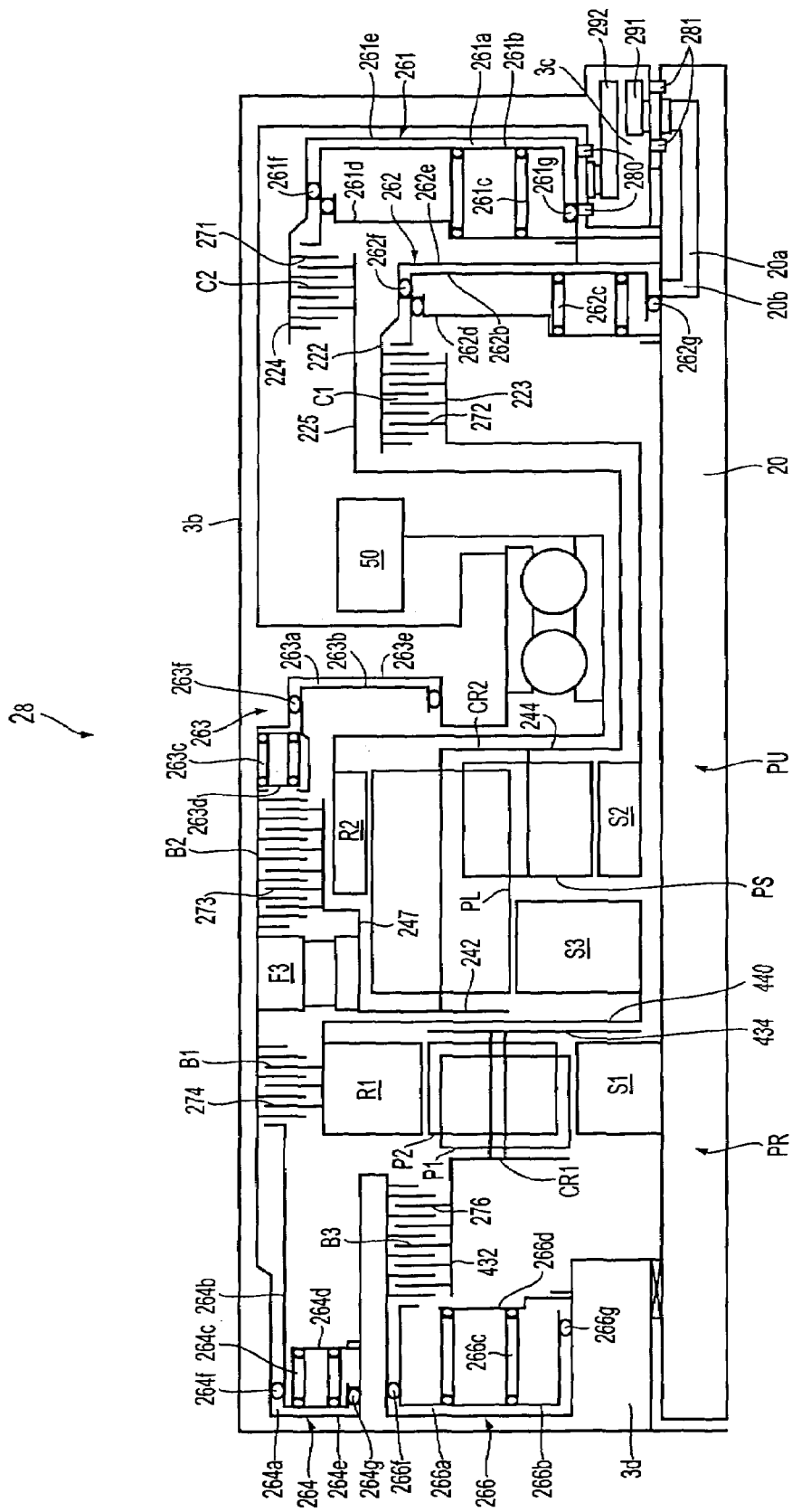
FIG. 26 is a schematic cross sectional view showing an automatic speed change mechanism of an automatic transmission in accordance with an eighth embodiment.

As shown in FIG. 26, an automatic speed change mechanism $2_8$ of the automatic transmission $1_8$ in accordance with the eighth embodiment, as compared to the automatic speed change mechanism $2_5$ in accordance with the fifth embodiment (refer to FIG. 19), is structured such that the brake (the third brake) B3 is provided instead of the clutch C3, and the carrier (the fixed element, the first carrier) CR1 of the planetary gear PR can be selectively engaged by the brake B3.

In the automatic speed change mechanism $2_7$, the brake B3 is arranged at the opposite side (the left side in the drawing) of the planetary gear (the reduced rotation output unit, the speed reduction planetary gear) PR to the planetary gear unit PU. The brake B3 has a hydraulic servo 266, a friction disk 276 and a hub member 432. The hydraulic servo 266 has a piston member 266b, that presses the friction disk 276, a cylinder portion 266e formed in a part of the case 3b, an oil chamber 266a formed between the piston member 266b and the cylinder portion 266e and sealed by sealing rings 266f, 266g, a return spring 266c, that energizes the piston member 266b in the direction of the oil chamber 266a, and a return plate 266d, that receives the energy of the return spring 266c.

The hub member 432 of the brake B3 is connected to a side plate at one side of the carrier CR1. The other side plate 434 of the carrier CR1 is rotatably supported by the input shaft 20. The sun gear (the input rotation element, the first sun gear) S1 is connected to the input shaft 20. Further, the friction disk 274 of the brake B1 is spline engaged to an outer peripheral side of the ring gear (the output rotation element, the first ring gear) R1, a transmission member 440 is connected to the ring gear R1, and the sun gear S3 is connected via the transmission member 440.

Next, a description will be given of an operation of the automatic speed change mechanism $2_8$ with reference to FIGS. 26, 27 and 28 on the basis of the structure described above. Note that, in the same manner as the fifth embodiment described above, in the velocity diagram shown in FIG. 28, the vertical axis indicates a rotation speed of each of the rotation elements, and the horizontal axis indicates and corresponds to a gear ratio of each of the rotation elements. Further, in the portion for the planetary gear unit PU of the velocity diagram, the vertical axis of the endmost portion in the horizontal direction (the right side in FIG. 28) corresponds to the sun gear S3, and from there toward the left side of the drawing, the vertical axes correspond to the carrier CR2, the ring gear R2 and the sun gear S2.

As shown in FIG. 26, the carrier CR1 is fixed to the case 3b by braking of the brake B3. Further, the rotation of the input shaft 20 is input to the sun gear S1, and the ring gear R1, described above, is rotated at a reduced speed on the basis of the rotation of the input shaft 20 input to the sun gear S1, as a result of fixing of the carrier CR1. In other words, the reduced rotation of the ring gear R1 is input to the sun gear S3 via the transmission member 440 due to the braking of the brake B3.

Figures 27, 28:
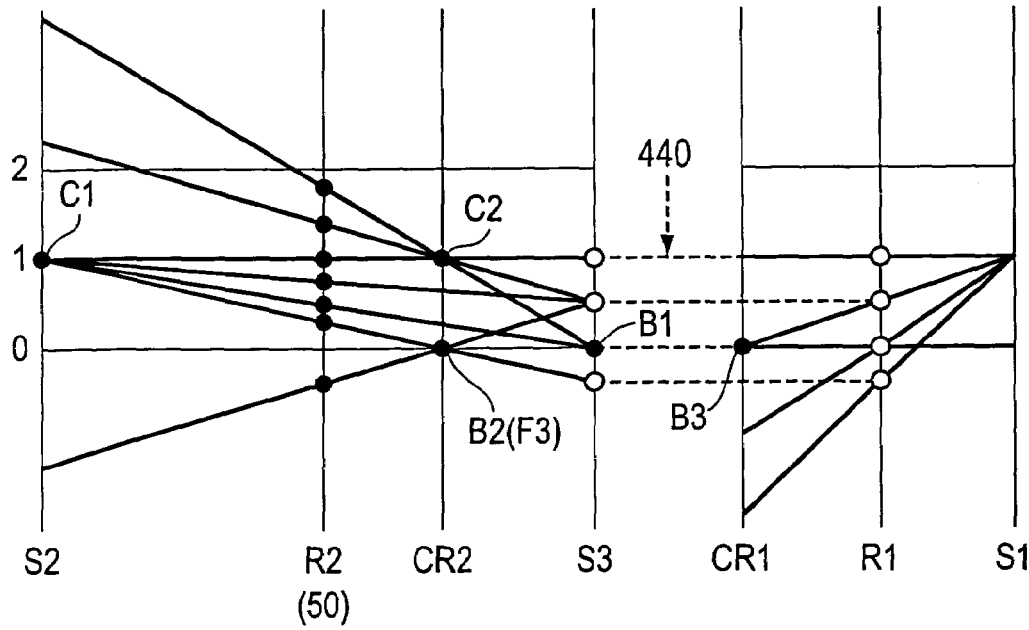
FIG. 27 is an engagement table for the automatic transmission in accordance with the eighth embodiment.
FIG. 28 is a velocity diagram of the automatic transmission in accordance with the eighth embodiment.

Accordingly, as shown in FIGS. 27 and 28, in the planetary gear PR, in the forward third speed, the forward fifth speed and the backward first speed, the carrier CR1 is fixed by braking of the brake B3, whereby the reduced rotation is output to the ring gear R3 in accordance with the rotation of the sun gear S1 to which the rotation of the input shaft 20 is input, and the reduced rotation is input to the sun gear S3 via the transmission member 440. At this time, as the ring gear R1 and the sun gear S3 are rotated at the reduced speed, the transmission member 440 transmits a comparatively large torque. On the other hand, in the forward first speed, the forward second speed, the forward fourth speed and the forward sixth speed, the rotation of the sun gear S3 is input to the ring gear R1 via the transmission member 440 and the brake B3 is disengaged. Accordingly, the carrier CR1 is rotated on the basis of the rotation of the ring gear R1 in each of the respective shift speeds and the sun gear S1 that has the rotation of the input shaft 20, as shown in FIG. 28.

Note that, because the operations other than that of the planetary gear PR are the same as those of fifth embodiment described above, a description thereof will be omitted.

As described above, with the automatic transmission $2_8$, the planetary gear PR, the brake B3 and the transmission member 440 which correspond to the reduced rotation output unit are arranged at one side (the left side in FIG. 26) in the axial direction of the planetary gear unit PU, the clutch C1 and the clutch C2 are arranged at the other side (the right side in FIG. 26) in the axial direction of the planetary gear unit PU, and the counter gear 50 that corresponds to the output member is arranged between the clutch C1, the clutch C2 and the planetary gear unit PU. Accordingly, it is possible to position, in particular, the planetary gear PR and the planetary gear unit PU close to each other and thereby make the length of the transmission member 340, that transmits the reduced rotation, comparatively short in the axial direction. Accordingly, it is possible to achieve a compact structure and weight saving for the automatic transmission $1_8$ and to make the inertia (the inertia force) small in accordance with the weight saving of the transmission member 440. As a result, it is possible to improve the controllability of the automatic transmission $1_8$ and to reduce the generation of shift shock.

Further, because the clutch C2 is connected to the carrier CR2 through the outer peripheral side of the clutch C1, it is possible to prevent the member that connects each of the rotation elements from being complicated and to make the automatic transmission $1_8$ compact.

Further, the clutch C1 is structured such that the clutch C2 is arranged at the outer peripheral side thereof and, thus, cannot have its diameter enlarged at the outer peripheral side. However, it is possible to ensure that the hydraulic servo 262 and, more particularly, the pressure receiving area of the oil chamber 262a for the hydraulic servo 262, is large at the inner peripheral side by providing the hydraulic servo 262 on the input shaft 20 (in comparison with the case, for example, of provision on the boss portion 3c), and to increase the capacity of the clutch C1.

Further, because the planetary gear PR, the planetary gear unit PU and the counter gear 50 are provided coaxially with the input shaft 20, it is possible to make the driven wheel transmission mechanism (for example, the counter shaft portion 4 or the like) compact, in particular, in the case where the automatic transmission $1_8$ is mounted in the FF vehicle (for example, in comparison with the case that the speed reduction planetary gear, or the like, is provided on another shaft). Thus, for example, it is possible to prevent the driven wheel transmission mechanism from being interfered with by, for example, a vehicle body member, and to improve the ease of mounting of the automatic transmission $1_8$.

In addition, because the reduced rotation output is connected and disconnected in accordance with the braking of the brake B3, it is possible to make the brake B3 compact, for example, in comparison with a clutch connecting and disconnecting the reduced rotation, and to position the planetary gear PR and the planetary gear unit PU close to each other. Therefore, it is possible to achieve a compact structure and weight saving in the automatic transmission $1_8$.

Because the hydraulic servo 262 is provided on the input shaft 20, it is possible to supply the oil to the oil chamber 262a of the hydraulic servo 262 and prevent oil from leaking from the case 3 by using the pair of sealing rings 281, and to supply the oil to the oil passages 20a, 20b provided within the input shaft 20, for example, without providing a sealing ring between the input shaft 20 and the hydraulic servo 262. Further, the hydraulic servo 261 can supply the oil from the boss portions 3c that extends from the case 3, for example, without passing it through other members, that is, the oil can be supplied by respectively arranging the pair of sealing rings 280. Accordingly, it is possible to supply the oil to the hydraulic servos 262, 261 by simply providing the respective pairs of sealing rings 281, 280 and it is possible to minimize the sliding resistance that results from the sealing ring, whereby it is possible to improve the efficiency of the automatic transmission $1_8$.

Further, because the planetary gear PR is a double pinion planetary gear, it is possible to output the rotation of the input shaft 20 as a reduced rotation. Further, even in the case where the gear ratio of the automatic transmission $1_8$ is set favorably, high speed rotation can be restricted without making each of the rotation elements of the planetary gear unit and the speed reduction planetary gear large. Accordingly, it is possible to make the automatic transmission $1_8$ compact.

Additionally, because the planetary gear PR is structured so as to include the sun gear S1, that corresponds to the input rotation element, the carrier CR1, that corresponds to the fixed element, and the ring gear R1, that corresponds to the output rotation element, it is possible to output the rotation of the input shaft 20 as the reduced rotation.

Further, as the planetary gear unit PU is a Ravigneaux type planetary gear configured from the sun gear S2, the sun gear S3, the carrier CR2 and the ring gear R2, it is possible to arrange the planetary gear PR and the planetary gear unit PU close to each other while it is also possible to achieve, for example, the six forward speeds and the one backward speed. Accordingly, it is possible to make the transmission member 440 that transmits the reduced rotation comparatively short.

Further, as the one-way clutch F3 is provided in parallel to the brake B2 and restricts the rotation of the carrier CR2 to one direction, it is possible to achieve the forward first speed, for example, at a time of normal running by engagement of the clutch C1 and the one-way clutch F3. As a result, it is possible to smoothly achieve the forward first speed, for example, at a time of changing from a non-running range to a running range.

Further, because the brake B2 and the one-way clutch F3 are arranged at the outer peripheral side of the planetary gear unit PU, it is possible to make the portion in which the clutches C1, C2 are arranged compact in the axial direction in comparison with the case, for example, where the one-way clutch F3 is arranged adjacent to the clutch C2 (particularly for restricting the rotation of the hub member 223 in one direction), so that it is possible to position the counter gear 50 closer to the torque converter side. Accordingly, it is possible to position the gear 51 of the counter shaft 52 closer to the torque converter side, and it is possible to make the counter shaft portion 4 compact in the axial direction.

Additionally, as shown in the velocity diagram, the configuration makes it possible to realize the six forward speeds and one backward speed, while, at the same time, it is also possible to arrange the planetary gear PR and the planetary gear unit PU close to each other and make the transmission member 440, that transmits the reduced rotation, comparatively short. Accordingly, it is possible to achieve a compact structure and weight saving in the automatic transmission $1_8$, and it is possible to make the inertia (the inertia force) small. Thus, it is possible to improve the controllability of the automatic transmission 18 and it is possible to reduce the generation of shift shock.

Further, the configuration is able to realize the six forward speeds and the one backward speed, and both the clutches C1, C2 are engaged in the forward fourth speed, that is, the directly connected state is established in the forward fourth speed. Accordingly, it is possible to set the gear ratio in the forward fifth speed and the forward sixth speed so that it is high. In the case, in particular, of a vehicle running at a high speed for which mounting has been executed, it is possible to make the engine speed low and to contribute to quietness of the vehicle when running at high speed.

Further, because the driven wheel transmission mechanism has the differential portion 5 that outputs the rotation to the driven wheel, the counter shaft portion 4 that engages with the differential portion 5, and the output member that is the counter gear that engages with the counter shaft portion 4, it is possible to mount the automatic transmission $1_8$, for example, in the FF vehicle.

Hereinafter, a description will be given, with reference to FIGS. 29 to 31, of a ninth embodiment that is a partial modification of the first, second and fifth embodiments. It should be noted that, in the ninth embodiment, with the exception of partially modified portions, the same reference numerals denote the same elements as those of the first, second and fifth embodiments and a description thereof will be omitted.

First, a description will be given of an automatic speed change mechanism $2_9$ of the automatic transmission $1_9$ in accordance with the ninth embodiment with reference to FIG. 29. As shown in FIG. 29, the planetary gear unit PU and the planetary gear (the reduced rotation output unit, the speed reduction planetary gear) PR are provided on the input shaft 20. The planetary gear unit PU is a so-called Ravigneaux type planetary gear having four rotation elements, namely, a sun gear (a third rotation element, a second sun gear) S2, a carrier (a second rotation element, a second carrier) CR2, a ring gear (a fourth rotation element, a second ring gear) R2 and a sun gear (a first rotation element, a third gear) S3. The carrier CR2 is provided with, in an intermeshing manner, a long pinion PL supported by side plates 542, 544 and meshed with the sun gear S2 and the ring gear R2, and a short pinion PS meshed with the sun gear S3. Further, the planetary gear PR is a so-called double pinion planetary gear having a carrier (an input rotation element, a first carrier) CR1 that is provided with, in an intermeshing manner, a pinion P2 which meshes with a ring gear (an output rotation element, a first ring gear) R1 and a pinion P1 which meshes with a sun gear (an input rotation element, a first sun gear) S1.

A multiple disc clutch (a first clutch) C3, having a hydraulic servo 565, a friction disk 572, a drum-like member 522 forming a clutch drum (a first clutch drum), and a hub member (a member connected to the second rotation element) 523 connected to the carrier CR2, is arranged on the input shaft 20 at an inner peripheral side. A multiple disc clutch (a second clutch) C2, having a hydraulic servo 262, a friction disk 571, a drum member 524 forming a clutch drum (a second clutch drum), and a hub member (a member connected to the third rotation member) 525 connected to the sun gear S2 is arranged at an outer peripheral side of the clutch C3.

The hydraulic servo 565 is configured from a piston member (a first piston) 565b that presses the friction disk 272, a drum-like member 522 having a cylinder portion 565e, an oil chamber (a first hydraulic servo oil pressure chamber) 565a formed between the piston member 565b and the cylinder portion 565e and sealed by sealing rings 565f, 565g, a return spring 565c that energizes the piston member 565b in the direction of the oil chamber 565a, and a return plate 565d that receives the energy of the return spring 565c. The oil chamber 565a communicates with the oil passages 20a, 20b formed in the input shaft 20. The oil passage 20a extends to one end of the case 3, and communicates with an oil passage 591 of the boss portion 3c provided on the input shaft 20 so as to have a sleeve shape. Further, the oil passage 591 communicates with the hydraulic control apparatus (not shown). In other words, because the hydraulic servo 565 is arranged on the input shaft 20, an oil passage from the hydraulic control apparatus (not shown) to the oil chamber 565a is configured by a pair of sealing rings 581 sealing a portion between the boss portion 3c of the case 3 and the input shaft 20.

Further, the hydraulic servo 562 is configured from a piston member (a second piston) 562b that presses the friction disk 271, a drum-like member 524 having a cylinder member 562e, an oil chamber (a second hydraulic servo oil pressure chamber) 562a formed between the piston member 562b and the cylinder member 562e and sealed by sealing rings 562f, 562g, a return spring 562c that energizes the piston member 562b in the direction of the oil chamber 562a, and a return plate 562d that receives the energy of the return spring 562c. The oil chamber 562a communicates with an oil passage 592 of the boss portion 3c, and the oil passage 592 communicates with the hydraulic control apparatus (not shown). In other words, in the hydraulic servo 562, an oil passage from the hydraulic control apparatus (not shown) to the oil chamber 562a is configured by a pair of sealing rings 580 sealing a portion between the boss portion 3c of the case 3 and the cylinder member 562e.

Further, a multiple disc brake (a third brake) B2 having a hydraulic servo 563 and a friction disk 574 is arranged at an outer peripheral side of the hub member 525. The hydraulic servo 563 is configured from a piston member 563b that presses the friction disk 574, a cylinder portion 563e formed in a part of the case 3b, an oil chamber 563a formed between the piston member 563b and the cylinder portion 563e and sealed by sealing rings 562f, 563g, a return spring 563c that energizes the piston member 563b in the direction of the oil chamber 563a, and a return plate 563d that receives the energy of the return spring 563c.

In other words, the drum-like member 522 described above is connected to the input shaft 20, and the clutch C3 that can be selectively engaged by the hydraulic servo 565 for the clutch C3 is arranged so as to be spline engaged at an inner peripheral side of a leading end portion of the drum-like member 522, and an inner peripheral side of the clutch C3 is connected by spline engagement to the hub member 523. Further, the hub member 523 is connected to the sun gear S2. Additionally, the clutch C2 that can be selectively engaged by the hydraulic servo 562 for the clutch C2 is arranged so as to be spline engaged at an inner peripheral side of a leading end portion of the drum-like member 524, and the hub member 525 is connected by spline engagement to the inner peripheral side of the clutch C2. Further, the brake B2, that can be selectively engaged by the hydraulic servo 563 for the brake B2, is arranged so as to be spline engaged at an outer peripheral side of the drum-like member 525. Further, the hub member 525 is connected to the carrier CR2.

On the other hand, a multiple disc clutch (a third clutch) C1 having a hydraulic servo 561, a friction disk 575, and a drum-like member 531 forming a clutch drum (a third clutch drum) is arranged on the other end (the left side in the drawing) of the input shaft 20. The hydraulic servo 561 is configured from a piston member 561b that presses the friction disk 575, a drum-like member 531 having a cylinder portion 561e, an oil chamber 561a formed between the piston member 561b and the cylinder portion 561e and sealed by sealing rings 561f, 561g, a return spring 561c that energizes the piston member 561b in the direction of the oil chamber 561a, and a return plate 561d that receives the energy of the return spring 561c. Note that, a clutch drum configured from the drum-like member 531 is open in the direction of the planetary gear PR, and the planetary gear PR is arranged between the hydraulic servo 561 and the planetary gear unit PU in an axial direction. Further, the friction disk 575 is positioned such that it overlaps with the planetary gear PR at an outer diameter side in a diametrical direction.

The oil chamber 561a extends to the other end of the case 3 at the opposite side to the boss portion 3c, and communicates with an oil passage 593 of the boss portion 3d provided surrounding the input shaft 20 so as to have a sleeve shape, and the oil passage 593 communicates with the hydraulic control apparatus (not shown). In other words, in the hydraulic servo 561, an oil passage from the hydraulic control apparatus (not shown) to the oil chamber 561a is configured by a pair of sealing rings 582 sealing a portion between the boss portion 3d of the case 3 and the drum-like member 532 having the cylinder portion 561e.

That is, the drum-like member 531 is rotatably supported by the boss portion 3d, and the clutch C1 that can be selectively engaged by the hydraulic servo 561 for the clutch C1 is arranged so as to be spline engaged at an inner peripheral side of a leading end portion of the drum-like member 561. The hub member 532, in which the ring gear R1 is formed, is arranged at the inner peripheral side of the clutch C1 so as to be spline engaged, and the hub member 532 is rotatably supported by the boss portion 3d. Further, the carrier CR1 has the pinion P1 and the pinion P2; the pinion P2 meshes with the ring gear R1, and the pinion P1 meshes with the sun gear S1 connected to the input shaft 20. The carrier CR1 is fixed to the case 3b via the side plate 633.

Further, the drum-like member 531 with which the clutch C1 is spline engaged is rotatably supported on the boss portion 3d, the transmission member 540 that transmits the rotation of the ring gear R1 is connected when the clutch C1 is engaged, and the sun gear S3 of the planetary gear unit PU is connected to the other side of the transmission member 540.

On the other hand, a multiple disc brake (a second brake) B1, having a hydraulic servo 564, a friction disk 573, and a hub member 547, and a one-way clutch (a first one-way clutch) F3 are arranged at an outer peripheral side of the planetary gear unit PU. The hydraulic servo 564 is configured from a piston member 564b that presses the friction disk 573, a cylinder portion 564e formed in a part of the case 3b, an oil chamber 564a formed between the piston member 564b and the cylinder portion 564e and sealed by sealing rings 564f, 564g, a return spring 564c that energizes the piston member 564b in the direction of the oil chamber 564a, and a return plate 564d that receives the energy of the return spring 564c.

In other words, the hub member 547 with which the brake B1 is spline engaged is connected to a side plate 542 of the carrier CR2 in the planetary gear unit PU, and an inner race of the one-way clutch F3 is connected to the hub member 547. Further, the ring gear R2 meshes with the long pinion PL of the carrier CR2, the connection member 545 is connected to one end of the ring gear R2, and the ring gear R2 is connected to the counter gear 50 via the connection member 545.

As described above, the planetary gear PR is arranged at one side of the planetary gear unit PU in an axial direction, the clutch C2, the clutch C3 and the brake B2 are arranged at the other side in the axial direction, and the counter gear 50 is arranged between the clutch C2, the clutch C3, the brake B2 and the planetary gear unit PU. Further, the clutch C1 is arranged at the outer peripheral side of the planetary gear PR, and the brake B2 is arranged at the outer peripheral side of the planetary gear unit PU, respectively. Further, the planetary gear PR, the planetary gear unit PU and the counter gear 50 are provided coaxially with the input shaft 20.

Next, a description will be given of an operation of the automatic speed change mechanism $2_9$ with reference to FIGS. 29, 30 and 31 on the basis of the structure described above. Note that, in the velocity diagram shown in FIG. 31, the vertical axis indicates a rotation speed of each of the rotation elements, and the horizontal axis indicates and corresponds to a gear ratio of each of the rotation elements. Further, in the portion for the planetary gear unit PU in the velocity diagram, the vertical axis of the endmost portion in the horizontal direction (the right side in FIG. 31) corresponds to the sun gear S3, and from there toward the left side in the drawing, the vertical axes correspond to the ring gear R2, the carrier CR2 and the sun gear S2, respectively.

Figure 29:
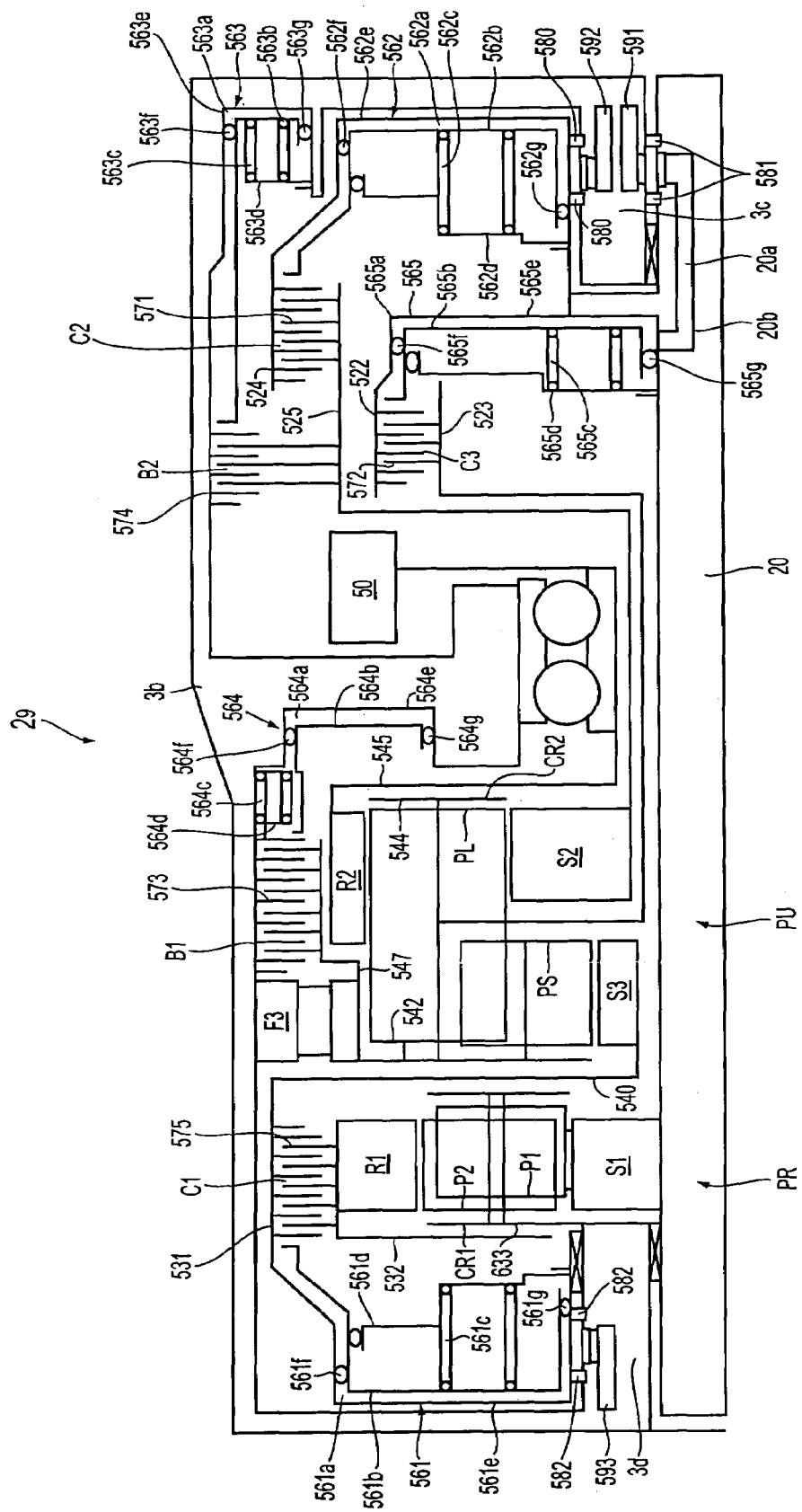
FIG. 29 is a schematic cross sectional view showing an automatic speed change mechanism of an automatic transmission in accordance with a ninth embodiment.

As shown in FIG. 29, the rotation of the input shaft 20 is input to the sun gear S2 in accordance with the engagement of the clutch C2, and the sun gear S1 can have its rotation selectively fixed in accordance with braking of the brake B1. The rotation of the input shaft 20 is input to the carrier CR2 in accordance with the engagement of the clutch C3, and the carrier CR2 can have its rotation selectively fixed in accordance with braking of the brake B2, and has its rotation restricted in one direction by the one-way clutch F3.

On the other hand, the sun gear S1 is connected to the input shaft 20 and the rotation of the input shaft 20 is input to the sun gear S1. The carrier CR1 is connected to the case 3b and has its rotation fixed. Accordingly, the ring gear R1 is rotated at a reduced speed. Further, the reduced rotation of the ring gear R1 is input to the sun gear S3 in accordance with the engagement of the clutch C1.

Further, the rotation of the ring gear R2 is output to the counter gear 50, and is output to the driven wheel (not shown) via the counter gear 50, the counter shaft portion 4 and the differential portion 5 (refer to FIG. 1).

Figures 30, 31:
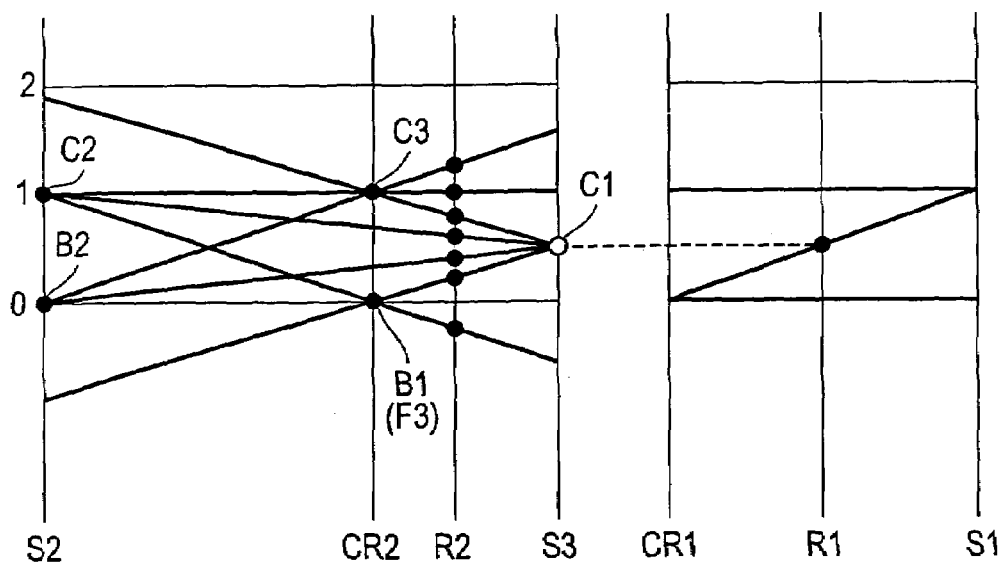
FIG. 30 is an engagement table for the automatic transmission in accordance with the ninth embodiment.
FIG. 31 is a velocity diagram of the automatic transmission in accordance with the ninth embodiment.

In the forward first speed in the drive (D) range, as shown in FIG. 30, the clutch C1 and the one-way clutch F3 are engaged. Accordingly, as shown in FIG. 31, the reduced rotation of the ring gear R1 is input to the sun gear S3 via the transmission member 540. Further, the rotation of the carrier CR2 is restricted to one direction (a forward rotation direction), that is, the carrier CR2 is prevented from rotating backward, and is therefore placed in a fixed state. Further, the ring gear R2 generates a forward rotation that corresponds to the forward first speed in accordance with the reduced rotation input to the sun gear S3 and the fixed carrier CR, and the rotation is output from the counter gear 50.

In this case, when engine brake (coasting) takes place, the state of the forward first speed is maintained such that the brake B1 is engaged as to fix the carrier CR2, and prevent the carrier CR2 from rotating forward. Further, in the forward first speed, the one-way clutch F3 prevents the carrier CR2 from rotating backward and allows it to forward rotate. Accordingly, it is possible to smoothly achieve the forward first speed, for example, at a time of changing from a non-running range to a running range, in accordance with automatic engagement of the one-way clutch F3. In this case, at this time, because the sun gear S3 and the ring gear R1 are rotated at the reduced speed, the transmission member 540 described above transmits a comparatively large torque.

In the forward second speed in the drive (D) range, as shown in FIG. 30, the clutch C1 is engaged, and the brake B2 is engaged. Accordingly, as shown in FIG. 31, the reduced rotation of the ring gear R1 is input to the sun gear S3 via the clutch C1 and the transmission member 540, and the rotation of the sun gear S2 is fixed by the brake B2. Accordingly, the carrier CR2 is rotated at a slightly reduced speed, the ring gear R2 generates a forward rotation that corresponds to the forward second speed in accordance with the reduced rotation input to the sun gear S3, and the carrier CR2 with the slightly reduced rotation, and the rotation is output from the counter gear 50. In this case, at this time, because the sun gear S3 and the ring gear R1 are rotated at the reduced speed, the transmission member 540 transmits a comparatively large torque.

In the forward third speed in the drive (D) range, as shown in FIG. 30, the clutch C1 and the clutch C2 are engaged. Accordingly, as shown in FIG. 31, the reduced rotation of the ring gear R1 is input to the sun gear S3 via the clutch C1 and the transmission member 540, and the rotation of the input shaft 20 is input to the sun gear S2 in accordance with the engagement of the clutch C2. Accordingly, the carrier CR2 is rotated at a slightly larger reduced speed than the reduced rotation of the sun gear S3 in accordance with the rotation of the input shaft 20 input to the sun gear S2 and the reduced rotation of the sun gear S3. Further, the ring gear R2 generates a forward rotation that corresponds to the forward third speed in accordance with the input rotation of the sun gear S2, the reduced rotation of the sun gear S3, and the rotation is output from the counter gear 50. In this case, at this time, because the sun gear S3 and the ring gear R1 are rotated at the reduced speed, the transmission member 540 transmits a comparatively large torque.

In the forward fourth speed in the drive (D) range, as shown in FIG. 30, the clutch C1 and the clutch C3 are engaged. Accordingly, as shown in FIG. 31, the reduced rotation of the ring gear R1 is input to the sun gear S3 via the clutch C1 and the transmission member 540, and the rotation of the input shaft 20 is input to the carrier CR2 via the clutch C3. Further, the ring gear R2 generates a forward rotation that corresponds to the forward fourth speed in accordance with the rotation of the input shaft 20 input to the carrier CR2, and the reduced rotation of the sun gear S3, and the rotation is output from the counter gear 50. In this case, at this time, because the sun gear S3 and the ring gear R1 are rotated at the reduced speed, the transmission member 540 transmits a comparatively large torque.

In the forward fifth speed in the drive (D) range, as shown in FIG. 30, the clutch C2 and the clutch C3 are engaged. Accordingly, as shown in FIG. 31, the rotation of the input shaft 20 is input to the carrier CR2 via the clutch C3, and the rotation of the input shaft 20 is input to the sun gear S2 via the clutch C2. Further, the ring gear R2 generates the same forward rotation as the rotation of the input shaft 20 which corresponds to the forward fifth speed, as a result of the rotation of the input shaft 20 input to the sun gear S2 and the rotation of the input shaft 20 input to the carrier CR2, that is, the ring gear R2 is placed in a directly connected state, and the rotation is output from the counter gear 50.

In the forward sixth speed in the drive (D) range, as shown in FIG. 30, the clutch C3 is engaged, and the brake B2 is engaged. Accordingly, as shown in FIG. 31, the rotation of the input shaft 20 is input to the carrier CR2 via the clutch C3, and the rotation of the sun gear S2 is fixed in accordance with braking of the brake B2. Further, the ring gear R2 generates an increased speed rotation that corresponds to the forward sixth speed in accordance with the rotation of the input shaft 20 input to the carrier CR2 and the fixed sun gear S2, and the rotation is output from the counter gear 50.

In the backward first speed in the reverse (R) range, as shown in FIG. 30, the clutch C2 is engaged, and the brake B1 is engaged. Accordingly, as shown in FIG. 31, the rotation of the input shaft 20 is input to the sun gear S2 in accordance with the engagement of the clutch C2, and the rotation of the carrier CR2 is fixed in accordance with braking of the brake B1. Further, the ring gear R2 generates a reverse rotation that corresponds to the backward first speed in accordance with the rotation of the input shaft 20 input to the sun gear S2 and the fixed carrier CR2, and the rotation is output from the counter gear 50.

In the parking (P) range and the neutral (N) range, in particular, the clutch C1, the clutch C2 and the clutch C3 are disengaged, and power transmission between the input shaft 20 and the counter gear 50 is in an interrupted state. Accordingly, the entire automatic speed change mechanism $2_9$ of automatic transmission $1_9$ is in a slipping state (a neutral state). In this case, the brake B1 fixing the carrier CR2 is engaged and frequent repetition of engagement and disengagement of the brake B1 is prevented, but does not have any particular influence on the rotation state of the other rotation elements within the automatic speed change mechanism $2_9$.

As described above, with the automatic transmission $1_9$, the planetary gear PR, the clutch C1 and the transmission member 540 which correspond to the reduced rotation output unit are arranged at one side (the left side in FIG. 29) in the axial direction of the planetary gear unit PU, the clutch C2 and the clutch C3 are arranged at the other side (the right side in FIG. 29) in the axial direction of the planetary gear unit PU, and the counter gear 50 that corresponds to the output member is arranged between the clutch C2, the clutch C3 and the planetary gear unit PU. Accordingly, it is possible to position, in particular, the planetary gear PR and the planetary gear unit PU close to each other, and it is possible to make the length of the transmission member 540, that transmits the reduced rotation, comparatively short in the axial direction. Thus, it is possible to achieve a compact structure and weight saving of the automatic transmission $1_9$ and to make the inertia (the inertia force) small in accordance with the weight saving of the transmission member 540. Therefore, it is possible to improve the controllability of the automatic transmission $1_9$ and to reduce the generation of shift shock.

Further, because the clutch C2 is connected to the carrier CR2 through the outer peripheral side of the clutch C3, it is possible to prevent the member that connects each of the rotation elements from being complicated and to make the automatic transmission $1_9$ compact.

Further, the clutch C3 is structured such that the clutch C2 is arranged at the outer peripheral side thereof and, thus, cannot have its diameter enlarged at the outer peripheral side. However, it is possible to ensure that the hydraulic servo 565, and more particularly, the pressure receiving area of the oil chamber 565$a$ for the hydraulic servo 565, is large at the inner peripheral side by providing the hydraulic servo 565 on the input shaft 20 (in comparison with the case, for example, of provision on the boss portion 3$c$), and it is also possible to increase the capacity of the clutch C3.

Additionally, because the planetary gear PR, the planetary gear unit PU and the counter gear 50 are provided coaxially with the input shaft 20, it is possible to make the driven wheel transmission mechanism (for example, the counter shaft portion 4, or the like) compact, in particular, in the case where the automatic transmission $1_9$ is mounted in the FF vehicle (for example, in comparison with the case that the speed reduction planetary gear, or the like, is provided on another shaft). Thus, for example, it is possible to prevent the driven wheel transmission mechanism from being interfered with by, for example, a vehicle body member and to improve the ease of mounting of the automatic transmission $1_9$.

Further, the clutch C1 connects and disconnects the output of the reduced rotation. By disengaging the clutch C3, it is possible to make the rotation of the input shaft that is input to the sun gear S1 rotate idly using the planetary gear PR and, more particularly, using the ring gear R1, while, at the same time, it is possible to selectively outputable the reduced rotation to the sun gear S3. As a result, it is possible to directly fix the carrier CR1 to the case 3, or the like, without providing a brake and to achieve a compact structure and weight saving for the automatic transmission $1_9$.

Further, because the hydraulic servo 565 is provided on the input shaft 20, it is possible to supply the oil to the oil chamber 565$a$ of the hydraulic servo 565 by preventing the oil from leaking from the case 3 by using the pair of sealing rings 281, and supplying the oil to the oil passages 20$a$, 20$b$ provided within the input shaft 20, for example, without arranging a sealing ring between the input shaft 20 and the hydraulic servo 565. Also, the hydraulic servos 562, 561 can supply the oil from the boss portions 3$c$, 3$d$ that extend from the case 3, for example, without passing it through other members, that is, the oil can be supplied by respectively arranging the pairs of sealing rings 580, 582. Accordingly, it is possible to supply the oil to the hydraulic servos 565, 562, 561 by simply arranging the respective pairs of sealing rings 581, 580, 582 and to minimize the sliding resistance that results from the sealing ring. Thus, it is possible to improve the efficiency of the automatic transmission $1_9$.

In addition, because the friction disk 575 is arranged at an outer peripheral side of the planetary gear PR in the diametrical direction, it is possible to make the automatic transmission $1_9$ compact in the axial direction. Further, because the planetary gear PR and the planetary gear unit PU can be arranged adjacent to each other by arranging the planetary gear PR between the hydraulic servo 561 of the clutch C1 and the planetary gear unit PU in the axial direction (since the hydraulic servo 561 of the clutch C1 is not provided between the planetary gear PR and the planetary gear unit PU), it is possible to make the transmission member 540 comparatively short. Accordingly, it is possible to achieve a compact structure and weight saving for the automatic transmission $1_9$ and to make the inertia (the inertia force) small. As a result, it is possible to improve the controllability of the automatic transmission 19 and to reduce the generation of shift shock.

Further, because the planetary gear PR is a double pinion planetary gear, it is possible to output the rotation of the input shaft 20 as the reduced rotation. Further, even in the case that the gear ratio of the automatic transmission $1_9$ is set favorably, high speed rotation can be restricted without making each of the rotation elements of the planetary gear unit and the speed reduction planetary gear large. Accordingly, it is possible to make the automatic transmission $1_9$ compact.

Because the planetary gear unit PR is structured to include the sun gear S1, that corresponds to the input rotation element, the carrier CR1, that corresponds to the fixed element, and the ring gear R1, that corresponds to the output rotation element, it is possible to output the rotation of the input shaft 20 as the reduced rotation.

Further, the planetary gear unit PU is a Ravigneaux type planetary gear configured from the sun gear S2, the sun gear S3, the carrier CR2 and the ring gear R2. Accordingly it is also possible to realize, for example, the six forward speeds and the one backward speed, while, at the same time, it is possible to position the planetary gear PR and the planetary gear unit PU close to each other, and make the transmission member 540 that transmits the reduced rotation comparatively short.

Further, the one-way clutch F3 is positioned in parallel to the brake B1 and restricts the rotation of the carrier CR2 to one direction. Thus, it is possible to achieve, for example, the forward first speed at a time of normal running by engagement of the clutch C1 and the one-way clutch F3 and to smoothly achieve the forward first speed, for example, at a time of changing from a non-running range to a running range.

Further, as the brake B1 and the one-way clutch F3 are arranged at the outer peripheral side of the planetary gear unit PU, it is possible to make the portion in which the clutches C1, C2 are arranged compact in the axial direction in comparison with the case, for example, where the one-way clutch F3 is arranged adjacent to the clutch C2 (particularly for restricting the rotation of the hub member 523 in one direction). As a result, it is possible to position the counter gear 50 closer to the torque converter side. Therefore, it is possible to position the gear 51 of the counter shaft 52 closer to the torque converter side and to make the counter shaft portion 4 compact in the axial direction.

Further, as shown in the velocity diagram, the configuration makes it possible to realize the six forward speeds and the one backward speed, while at the same time it is possible to position the planetary gear PR and the planetary gear unit PU close to each other, and make the transmission member 540, that transmits the reduced rotation, comparatively short. Accordingly, it is possible to achieve a compact structure and weight saving for the automatic transmission $1_9$, and to make the inertia (the inertia force) small. Thus, it is possible to improve the controllability of the automatic transmission $1_9$ and to reduce the generation of shift shock.

Further, the automatic speed change mechanism $2_9$ is in the directly connected state in the forward fifth speed, that is, it can output reduced rotation throughout the four speeds from the forward first speed to the forward fourth speed. Thus, in particular, when the automatic speed change mechanism $2_9$ is mounted in the vehicle, it is possible to execute finely differentiated shifting in a low middle speed range of the vehicle. Accordingly, in particular, in the low middle speed range of the vehicle, it is possible to fully utilize the rotation speed range so as to realize maximum efficiency of drive power source, for example, the engine, or the like. As a result, it is possible to promote improved fuel consumption.

In addition, because the directly connected state is achieved in the forward fifth speed, it is possible to set only the forward sixth speed as overdrive, and to make a final gear ratio small in comparison with an automatic transmission, for example, in which the directly connected state is achieved in the forward fourth speed, and the forward fifth speed and the forward sixth speed constitute overdrive. Therefore, for example, it is possible to make the diameter of the differential ring gear of the differential portion 5 small and to shorten the distance between the input shaft 20 and the shaft of the differential portion 5. In particular, in the case that the automatic transmission $1_9$ is mounted in the FF vehicle, it is possible to make the automatic transmission $1_9$ compact.

Further, the driven wheel transmission mechanism has the differential portion 5 that outputs the rotation to the driven wheel, the counter shaft portion 4 that engages with the differential portion 5, and the output member that is the counter gear that engages with the counter shaft portion 4. Accordingly, it is possible to mount the automatic transmission $1_9$, for example, in the FF vehicle.

Hereinafter, a description will be given, with reference to FIGS. 32 to 34, of a tenth embodiment that is a partial modification of the ninth embodiment. Note that, in the tenth embodiment, with the exception of the partially modified portions, the same reference numerals denote the same elements as those of the ninth embodiment, and a description thereof will be omitted.

Figure 32:
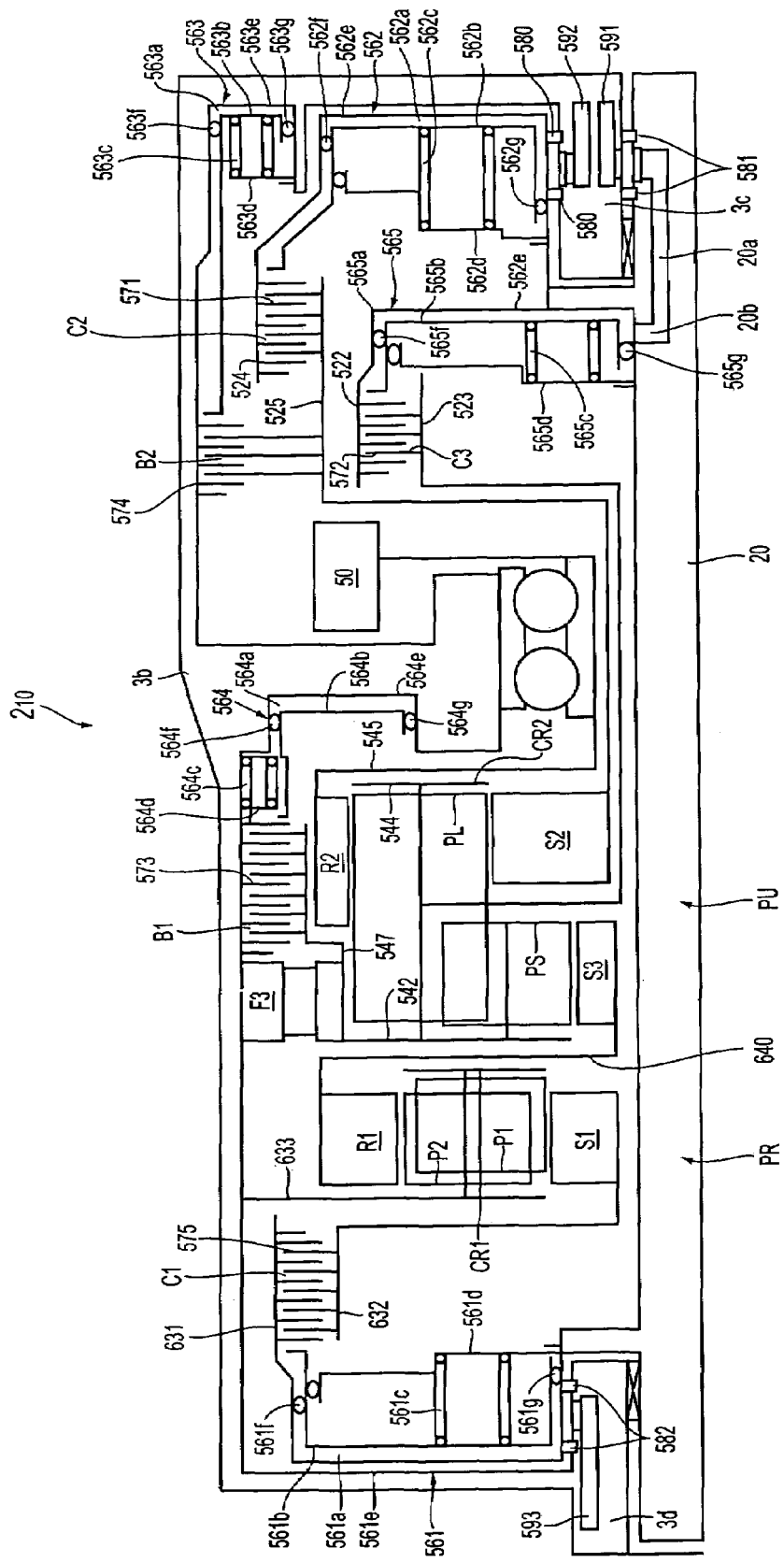
FIG. 32 is a schematic cross sectional view showing an automatic speed change mechanism of an automatic transmission in accordance with a tenth embodiment.

As shown in FIG. 32, an automatic speed change mechanism $2_{10}$ of the automatic transmission $1_{10}$ in accordance with the tenth embodiment is structured such that the arrangement of the planetary gear (the reduced rotation output unit, the speed reduction planetary gear) PR and the clutch (the third clutch) C1 is changed as compared to the automatic speed change mechanism $2_9$ in accordance with the ninth embodiment (refer to FIG. 29).

In the automatic speed change mechanism $2_{10}$, the clutch C1 is arranged at the opposite side (the left side in the drawing) of the planetary gear PR to the planetary gear unit PU, and an inner peripheral side of a leading end portion of a drum-like member 631 of the clutch C1 is spline engaged to the friction disk 575. Further, the drum-like member 631 of the clutch C1 is connected to the input shaft 20.

On the other hand, the sun gear (the input rotation element, the first sun gear) S1 is rotatably supported by the input shaft 20 and is connected to a hub member 632. The friction disk 575 is spline engaged to an outer peripheral side of a leading end portion of the hub member 632. Further, the carrier (the fixed element, the first carrier) CR1 is fixed and supported by the case $3b$ such that a fixed member 633 is connected to the side plate of the carrier CR1. Further, a transmission member 640 is connected to the ring gear (the output rotation element, the first ring gear) R1, and the sun gear S3 is connected via the transmission member 640.

Next, a description will be given of an operation of the automatic speed change mechanism $2_{10}$ with reference to FIGS. 32, 33 and 34 on the basis of the structure described above. Note that, in the same manner as the ninth embodiment described above, in the velocity diagram shown in FIG. 34, the vertical axis indicates a rotation speed of each of the rotation elements, and the horizontal axis indicates and corresponds to a gear ratio of each of the rotation elements. Further, in the portion for the planetary gear unit PU in the velocity diagram, the vertical axis of the endmost portion in the horizontal direction (the right side in FIG. 34) corresponds to the sun gear S3, and from there toward the left side in the drawing, the vertical axes correspond to the ring gear R2, the carrier CR2, and the sun gear S2.

As shown in FIG. 32, the rotation of the input shaft 20 is input to the sun gear S1 in accordance with the engagement of the clutch C1. Further, the carrier CR1 is fixed in rotation with respect to the case 3, and the ring gear R1 described above is rotated at a reduced speed on the basis of the rotation of the input shaft 20 input to the sun gear S1. In other words, the reduced rotation of the ring gear R1 is input to the sun gear S3 via the transmission member 640 in accordance with the engagement of the clutch C1.

Figures 33, 34:
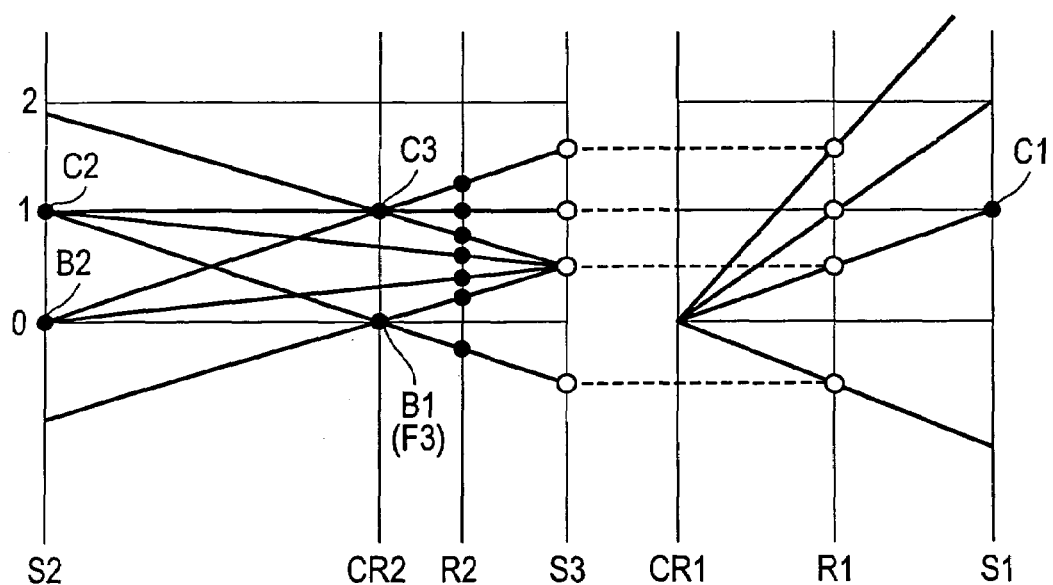
FIG. 33 is an engagement table for the automatic transmission in accordance with the tenth embodiment.
FIG. 34 is a velocity diagram of the automatic transmission in accordance with the tenth embodiment.

Accordingly, as shown in FIGS. 33 and 34, in the planetary gear PR, in the forward first speed, the forward second speed, the forward third speed and the forward fourth speed, the clutch C1 is engaged, whereby the rotation of the input shaft 20 is input to the sun gear S1, the reduced rotation is output to the ring gear R3 by the fixed carrier CR1, and the reduced rotation is input to the sun gear S3 via the transmission member 640. At this time, because the ring gear R1 and the sun gear S3 are rotated at the reduced speed, the transmission member 640 transmits a comparatively large torque. On the other hand, in the forward fifth speed, the forward sixth speed and the backward first speed, as the rotation of the sun gear S3 is input to the ring gear R1 via the transmission member 640 and the clutch C1 is disengaged, the sun gear S1 is rotated on the basis of the rotation of the ring gear R1 in each of the respective shift speeds and the fixed carrier CR1, as shown in FIG. 34.

Note that, because the operations other than that of the planetary gear PR are the same as the ninth embodiment described above, a description thereof will be omitted.

As described above, with the automatic speed change mechanism $2_{10}$ of the automatic transmission $1_{10}$, the planetary gear PR, the clutch C1 and the transmission member 640 which correspond to the reduced rotation output unit are arranged at one side (the left side in FIG. 32) in the axial direction of the planetary gear unit PU, the clutch C2 and the clutch C3 are arranged at the other side (the right side in FIG. 32) in the axial direction of the planetary gear unit PU, and the counter gear 50 that corresponds to the output member is arranged between the clutch C2, the clutch C3 and the planetary gear unit PU. Accordingly, it is possible to position, in particular, the planetary gear PR and the planetary gear unit PU close to each other, and it is possible to make the length of the transmission member 640 that transmits the reduced rotation comparatively short in the axial direction. Thus, it is possible to achieve a compact structure and weight saving of the automatic transmission $1_{10}$ and to make the inertia (the inertia force) small in accordance with the weight saving of the transmission member 640. As a result, it is possible to improve the controllability of the automatic transmission $1_{10}$ and to reduce the generation of shift shock.

Further, because the clutch C2 is connected to the carrier CR2 via the outer peripheral side of the clutch C3, it is possible to prevent the member that connects each of the rotation elements from being complicated and to make the automatic transmission $1_{10}$ compact.

Further, the clutch C3 is structured such that the clutch C2 is arranged at the outer peripheral side thereof and, thus, cannot have its diameter enlarged at the outer peripheral side. However, it is possible to ensure that the hydraulic servo 565 and, more particularly, the pressure receiving area of the oil chamber 565a for the hydraulic servo 565, is large at the inner peripheral side by providing the hydraulic servo 565 on the input shaft 20 (in comparison with the case, for example, of provision on the boss portion 3c), and to increase the capacity of the clutch C3.

Further, because the planetary gear PR, the planetary gear unit PU and the counter gear 50 are provided coaxially with the input shaft 20, it is possible to make the driven wheel transmission mechanism (for example, the counter shaft portion 4, or the like) compact, in particular, in the case where the automatic transmission $1_{10}$ is mounted in the FF vehicle (for example, in comparison with the case that the speed reduction planetary gear, or the like, is provided on another shaft). Thus, for example, it is possible to prevent the driven wheel transmission mechanism from being interfered with by, for example, a vehicle body member, and it is possible to improve the ease of mounting of the automatic transmission $1_{10}$.

Further, for example, as disclosed in Japanese Patent Laid-Open Publication No. 2001-263438, and the like, in the case where the clutch C1 is interposed between the ring gear R1 and the sun gear S3, it is necessary to connect and disconnect the reduced rotation, so that the structure becomes comparatively large, and a distance between the planetary gear PR and the planetary gear unit PU is lengthened. However, as a result of interposition between the input shaft 20 and the sun gear S1, the reduced rotation output from the ring gear R1 of the planetary gear PR is connected and disconnected by connecting and disconnecting the rotation of the input shaft 20 using the clutch C1. Accordingly, it is possible to make the clutch C1 compact, and it is possible to position the planetary gear PR and the planetary gear unit PU at comparatively close positions. Therefore, it is possible to make the automatic transmission $1_{10}$ compact.

Further, because the hydraulic servo 565 is provided on the input shaft 20, it is possible to supply oil to the oil chamber 565a of the hydraulic servo 565 and prevent the oil from leaking from the case 3 by using the pair of sealing rings 281 and supplying the oil to the oil passages 20a, 20b provided within the input shaft 20, for example, without providing a sealing ring between the input shaft 20 and the hydraulic servo 565. Further, the hydraulic servos 562, 561 can supply the oil from the boss portions 3c, 3d that extend from the case 3, for example, without passing it through other members, that is, the oil can be supplied by respectively arranging pairs of sealing rings 580, 582. Accordingly, it is possible to supply the oil to the hydraulic servos 565, 562, 561 by simply providing the respective pairs of sealing rings 581, 580, 582 and it is possible to minimize the sliding resistance that results from the sealing ring, whereby it is possible to improve the efficiency of the automatic transmission $1_{10}$.

Further, because the planetary gear PR is a double pinion planetary gear, it is possible to output the rotation of the input shaft 20 as the reduced rotation. Further, even in the case that the gear ratio of the automatic transmission $1_{10}$ is set favorably, high speed rotation can be restricted without making each of the rotation elements of the planetary gear unit and the speed reduction planetary gear large. Accordingly, it is possible to make the automatic transmission $1_{10}$ compact.

In addition, because the planetary gear PR is structured so as to include the sun gear S1 that corresponds to the input rotation element, the carrier CR1 that corresponds to the fixed element, and the ring gear R1 that corresponds to the output rotation element, it is possible to output the rotation of the input shaft 20 as the reduced rotation.

Further, the planetary gear unit PU is a Ravigneaux type planetary gear configured from the sun gear S2, the sun gear S3, the carrier CR2 and the ring gear R2; accordingly, it is possible to position the planetary gear PR and the planetary gear unit PU close to each other while at the same time it is possible to achieve, for example, the six forward speeds and the one backward speed. Thus, it is possible to make the transmission member 640, that transmits the reduced rotation, comparatively short.

Further, as the one-way clutch F3 is positioned in parallel to the brake B1 and restricts the rotation of the carrier CR2 to one direction, it is possible to achieve the forward first speed, for example, at a time of normal running by engagement of the clutch C1 and the one-way clutch F3. Accordingly, it is possible to smoothly achieve the forward first speed, for example, at a time of changing from a non-running range to a running range.

Further, the brake B1 and the one-way clutch F3 are arranged at the outer peripheral side of the planetary gear unit PU. Therefore, it is possible to make the portion in which the clutches C1, C2 are arranged compact in the axial direction in comparison with the case, for example, where the one-way clutch F3 is arranged adjacent to the clutch C2 (particularly for restricting the rotation of the hub member 523 in one direction). Therefore, it is possible to position the counter gear 50 closer to the torque converter side. Accordingly, it is possible to position the gear 51 of the counter shaft 52 closer to the torque converter side, and it is possible to make the counter shaft portion 4 compact in the axial direction.

Further, as shown in the velocity diagram, the configuration makes it possible to realize the six forward speeds and the one backward speed, while, at the same time, it is possible to position the planetary gear PR and the planetary gear unit PU close to each other and to make the transmission member 640, that transmits the reduced rotation, comparatively short. Accordingly, it is possible to achieve a compact structure and weight saving of the automatic transmission $1_{10}$, and it is possible to make the inertia (the inertia force) small. Thus, it is possible to improve the controllability of the automatic transmission 10 and to reduce the generation of shift shock.

Further, the automatic speed change mechanism $2_{10}$ is in the directly connected state in the forward fifth speed, that is, it can output the reduced rotation throughout the four speeds from the forward first speed to the forward fourth speed. Thus, in particular, when the automatic transmission $1_{10}$ is mounted in the vehicle, it is possible to execute finely differentiated shifting in the low middle speed range of the vehicle. Accordingly, in particular, in the low middle speed range of the vehicle, it is possible to fully utilize the rotation speed range so as to realize maximum efficiency of the drive power source, for example, the engine. As a result, it is possible to promote improved fuel consumption. Further, because the directly connected state is achieved in the forward fifth speed, it is possible to set only the forward sixth speed as overdrive and to make a final gear ratio small in comparison with an automatic transmission, for example, in which the directly connected state is achieved in the forward fourth speed, and the forward fifth speed and the forward sixth speed constitute overdrive. Therefore, for example, it is possible to make the diameter of the differential ring gear of the differential portion 5 small and to shorten the distance between the input shaft 20 and the shaft of the differential portion 5. In particular, in the case that the automatic transmission $1_{10}$ is mounted in the FF vehicle, it is possible to make the automatic transmission $1_{10}$ compact.

Further, the driven wheel transmission mechanism has the differential portion 5 that outputs the rotation to the driven wheel, the counter shaft portion 4 that engages with the differential portion 5, and the output member that is the counter gear that engages with the counter shaft portion 4. Accordingly, it is possible to mount the automatic transmission $1_{10}$, for example, in the FF vehicle.

Hereinafter, a description will be given, with reference to FIGS. 35 to 37, of an eleventh embodiment that is a partial modification of the ninth embodiment. Note that, in the eleventh embodiment, with the exception of the partially modified portions, the same reference numerals denote the same elements as those of the ninth embodiment and a description thereof will be omitted.

Figure 35:
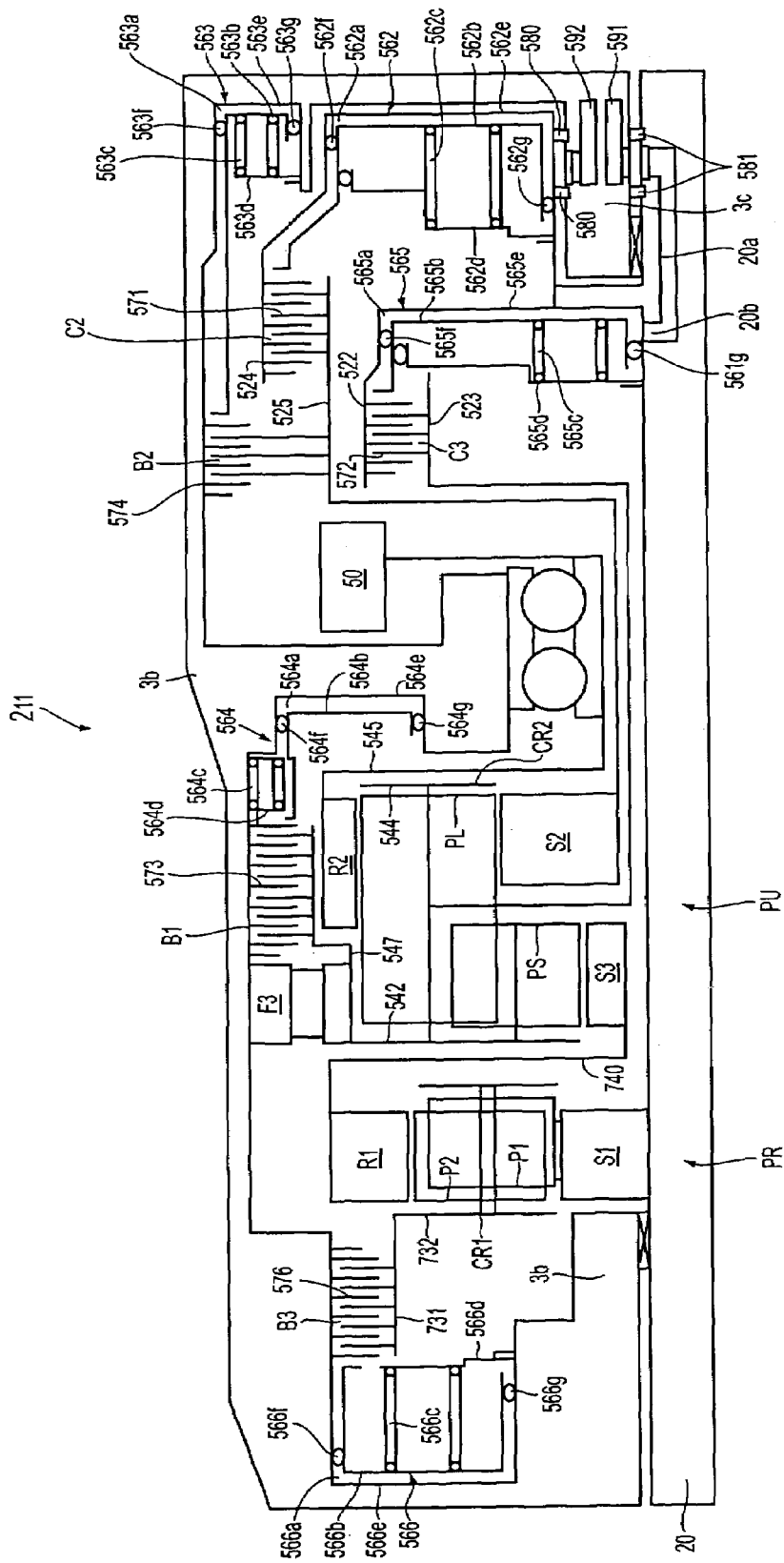
FIG. 35 is a schematic cross sectional view showing an automatic speed change mechanism of an automatic transmission in accordance with an eleventh embodiment.

As shown in FIG. 35, an automatic speed change mechanism $2_{11}$ of the automatic transmission $1_{11}$ in accordance with the eleventh embodiment, in comparison to the automatic speed change mechanism $2_9$ in accordance with the ninth embodiment (refer to FIG. 29), is structured such that the brake (the third brake) B3 is provided instead of the clutch C1, and the carrier (the fixed element, the first carrier) CR1 of the planetary gear (the reduced rotation output unit, the speed reduction planetary gear) PR can be selectively fixed by the brake B3.

In the automatic speed change mechanism $2_{11}$ the brake B3 is arranged at the opposite side (the left side in the drawing) of the planetary gear PR to the planetary gear unit PU. The brake B3 has a hydraulic servo 566, a friction disk 576 and a hub member 731. The hydraulic servo 566 is configured from a piston member 566b, that presses the friction disk 576, a cylinder portion 566e formed in a part of the case 3b, an oil chamber 566a formed between the piston member 566b and the cylinder portion 566e and sealed by sealing rings 566f, 566g, a return spring 566c that energizes the piston member 566b in the direction of the oil chamber 566a, and a return plate 566d that receives the energy of the return spring 566c.

The hub member 731 of the brake B3 is connected to a side plate 732 of the carrier CR1 and the side plate 732 is rotatably supported by the boss portion 3d. Further, the sun gear (the input rotation element, the first sun gear) S1, that meshes with the pinion P1 of the carrier CR1, is connected to the input shaft 20. Further, a transmission member 740 is connected to the ring gear (the output rotation element, the first ring gear) R1, that meshes with the pinion P2 of the carrier CR1, and the sun gear S3 is connected via the transmission member 740.

Next, a description will be given of an operation of the automatic speed change mechanism $2_{11}$, with reference to FIGS. 35, 36 and 37 on the basis of the structure described above. Note that, in the same manner as the ninth embodiment described above, in the velocity diagram shown in FIG. 37, the vertical axis indicates a rotation speed of each of the rotation elements, and the horizontal axis indicates and corresponds to a gear ratio of each of the rotation elements. Further, in the portion for the planetary gear unit PU in the velocity diagram, the vertical axis of the endmost portion in the horizontal direction (the right side in FIG. 37) corresponds to the sun gear S3, and from there toward the left side in the drawing, the vertical axes correspond to the ring gear R2, the carrier CR2 and the sun gear S2, respectively.

As shown in FIG. 35, the carrier CR1 is fixed to the case 3b by braking of the brake B3. Further, the rotation of the input shaft 20 is input to the sun gear S1, and the ring gear R1 described above is rotated at a reduced speed on the basis of the rotation of the input shaft 20 input to the sun gear S1, as a result of fixing of the carrier CR1. In other words, the reduced rotation of the ring gear R1 is input to the sun gear S3 via the transmission member 740 as a result of the brake B3.

Figures 36, 37:
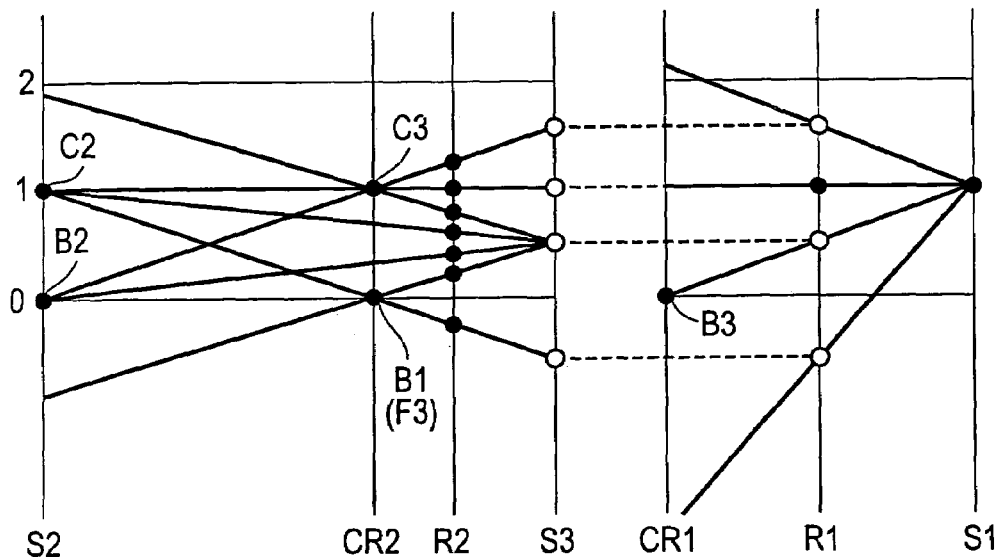
FIG. 36 is an engagement table for the automatic transmission in accordance with the eleventh embodiment.
FIG. 37 is a velocity diagram of the automatic transmission in accordance with the eleventh embodiment.

Accordingly, as shown in FIGS. 36 and 37, in the planetary gear PR, in the forward first speed, the forward second speed, the forward third speed and the forward fourth speed, the brake B3 is engaged, whereby the carrier CR1 is fixed, and the reduced rotation is output to the ring gear R3 in accordance with the rotation of the sun gear S1 to which the rotation of the input shaft 20 is input. The reduced rotation is input to the sun gear S3 via the transmission member 740. At this time, because the ring gear R1 and the sun gear S3 are rotated at the reduced speed, the transmission member 740 transmits a comparatively large torque. On the other hand, in the forward fifth speed, the forward sixth speed and the backward first speed, the rotation of the sun gear S3 is input to the ring gear R1 via the transmission member 740 and the brake B3 is disengaged. Accordingly, the carrier CR1 is rotated on the basis of the rotation of the ring gear R1 in each of the respective shift speeds and the sun gear S1 with the rotation of the input shaft 20, as shown in FIG. 37.

Note that, because the operations other than that of the planetary gear PR are the same as the ninth embodiment described above, a description thereof will be omitted.

As described above, with the automatic speed change mechanism $2_{11}$ of the automatic transmission $1_{11}$, the planetary gear PR, the brake B3 and the transmission member 740 which correspond to the reduced rotation output unit are arranged at one side (the left side in FIG. 35) in the axial direction of the planetary gear unit PU, the clutch C2 and the clutch C3 are arranged at the other side (the right side in FIG. 35) in the axial direction of the planetary gear unit PU, and the counter gear 50, that corresponds to the output member, is arranged between the clutch C2, the clutch C3 and the planetary gear unit PU. Accordingly, it is possible to position, in particular, the planetary gear PR and the planetary gear unit PU close to each other and to make the length of the transmission member 740, that transmits the reduced rotation, comparatively short in the axial direction. Thus, it is possible to achieve a compact structure and weight saving in the automatic transmission $1_{11}$ and to make the inertia (the inertia force) small in accordance with the weight saving of the transmission member 740. Therefore, it is possible to improve the controllability of the automatic transmission $1_{11}$ and to reduce the generation of shift shock.

Further, because the clutch C2 is connected to the carrier CR2 through the outer peripheral side of the clutch C3, it is possible to prevent the member, that connects each of the rotation elements, from being complicated and to make the automatic transmission $1_{11}$ compact.

Further, the clutch C3 is structured such that the clutch C2 is arranged at the outer peripheral side thereof and, thus, cannot have its diameter enlarged at the outer peripheral side. However, it is possible to ensure that the hydraulic servo 565 and, more particularly, the pressure receiving area of the oil chamber 565a for the hydraulic servo 565 large at the inner peripheral side by providing the hydraulic servo 565 on the input shaft 20 (in comparison with the case, for example, of provision on the boss portion 3c) and to increase the capacity of the clutch C3.

Further, as the planetary gear PR, the planetary gear unit PU and the counter gear 50 are provided coaxially with the input shaft 20, it is possible to make the driven wheel transmission mechanism (for example, the counter shaft portion 4, or the like) compact, in particular, in the case where the automatic transmission $1_{11}$ is mounted in the FF vehicle (for example, in comparison with the case that the speed reduction planetary gear, or the like, is provided on another shaft). Thus, for example, it is possible to prevent the driven wheel transmission mechanism from being interfered with by, for example, a vehicle body member and to improve the ease of mounting of the automatic transmission $1_{11}$.

Further, because the reduced rotation output is connected and disconnected in accordance with the engagement of the brake B3, it is possible to make the brake B3 compact, for example, in comparison with a clutch connecting and disconnecting the reduced rotation. It is also possible to position the planetary gear PR and the planetary gear unit PU close to each other. Therefore, it is possible to achieve a compact structure and weight saving for the automatic transmission $1_{11}$.

Further, as the hydraulic servo 565 is provided on the input shaft 20, it is possible to supply the oil to the oil chamber 565a of the hydraulic servo 565 and prevent the oil from leaking from the case 3 by using the pair of sealing rings 581, and supplying the oil to the oil passages 20a, 20b provided within the input shaft 20, for example, without providing a sealing ring between the input shaft 20 and the hydraulic servo 565. Further, the hydraulic servo 562 can supply the oil from the boss portion 3c that extends from the case 3, for example, without passing it through other members, that is, the oil can be supplied by respectively arranging the pair of sealing rings 580. Accordingly, it is possible to supply the oil to the hydraulic servos 565, 562 by simply providing the respectively pairs of sealing rings 581, 580 and to minimize the sliding resistance that results from the sealing rings. As a result, it is possible to improve the efficiency of the automatic transmission $1_{11}$.

Further, because the planetary gear PR is a double pinion planetary gear, it is possible to output the rotation of the input shaft 20 as the reduced rotation. Further, even in the case that the gear ratio of the automatic transmission $1_{11}$ is set favorably, high speed rotation can be restricted without making each of the rotation elements of the planetary gear unit and the speed reduction planetary gear large. Accordingly, it is possible to make the automatic transmission $1_{11}$ compact.

In addition, because the planetary gear PR is structured so as to include the sun gear S1, that corresponds to the input rotation element, the carrier CR1, that corresponds to the fixed element, and the ring gear R1, that corresponds to the output rotation element, it is possible to output the rotation of the input shaft 20 as the reduced rotation.

Further, the planetary gear unit PU is a Ravigneaux type planetary gear configured from the sun gear S2, the sun gear S3, the carrier CR2 and the ring gear R2. Accordingly, it is possible to position the planetary gear PR and the planetary gear unit PU close to each other and it is also possible to achieve, for example, the six forward speeds and the one backward speed. Therefore, it is possible to make the transmission member 740, that transmits the reduced rotation, comparatively short.

Further, the one-way clutch F3 is positioned in parallel to the brake B1 and restricts the rotation of the carrier CR2 to one direction. Accordingly, it is possible to achieve the forward first speed, for example, at a time of normal running by engagement of the clutch C1 and the one-way clutch F3. Thus, it is possible to smoothly achieve the forward first speed, for example, at a time of changing from a non-running range to a running range.

Further, because the brake B1 and the one-way clutch F3 are arranged at the outer peripheral side of the planetary gear unit PU, it is possible to make the portion in which the clutches C1, C2 are arranged compact in the axial direction in comparison with the case, for example, where the one-way clutch F3 is arranged adjacent to the clutch C2 (particularly for restricting the rotation of the hub member 523 in one direction). Accordingly, it is possible to position the counter gear 50 closer to the torque converter side. Therefore, it is possible to position the gear 51 of the counter shaft 52 closer to the torque converter to make the counter shaft portion 4 compact in the axial direction.

Further, as shown in the velocity diagram, the configuration makes it possible to realize the six forward speeds and the one backward speed, while, at the same time, it is possible to position the planetary gear PR and the planetary gear unit PU close to each other, and make the transmission member 740, that transmits the reduced rotation, comparatively short. Accordingly, it is possible to achieve a compact structure and weight saving of the automatic transmission $1_{11}$ and to make the inertia (the inertia force) small. Therefore, it is possible to improve the controllability of the automatic transmission $1_{11}$ and it is possible to reduce the generation of shift shock.

Further, the automatic speed change mechanism $2_{11}$ is in the directly connected state in the forward fifth speed, that is, can output the reduced rotation throughout the four shift speeds from the forward first speed to the forward fourth speed. Thus, in particular, when the automatic speed change mechanism $2_{11}$ is mounted in the vehicle, it is possible to execute finely differentiated shifting in a low middle speed range of the vehicle. Accordingly, in particular, in the low middle speed range of the vehicle, it is possible to fully utilize the rotation speed range so as to realize maximum efficiency of drive power source, for example, the engine, or the like. Accordingly, it is possible to promote improved fuel consumption.

Further, because the directly connected state is achieved in the forward fifth speed, it is possible to set only the forward sixth speed as overdrive, and it is possible to make a final gear ratio small in comparison with an automatic transmission, for example, in which the directly connected state is achieved in the forward fourth speed, and the forward fifth speed and the forward sixth speed constitute overdrive. Therefore, for example, it is possible to make the diameter of the differential ring gear of the differential portion 5 small and, thus, it is possible to shorten the distance between the input shaft 20 and the shaft of the differential portion 5. In particular, in the case that the automatic transmission $1_{11}$ is mounted in the FF vehicle, it is possible to make the automatic transmission $1_{11}$ compact.

Further, the driven wheel transmission mechanism has the differential portion 5 that outputs the rotation to the driven wheel, the counter shaft portion 4 that engages with the differential portion 5, and the output member that is the counter gear that engages with the counter shaft portion 4. Accordingly, it is possible to mount the automatic transmission $1_{11}$, for example, in the FF vehicle.

Note that, in the first to eleventh embodiments according to the invention, are exemplified by the structure in which the torque converter 12 is provided in the automatic transmission. However, the invention is not limited to this, and it is possible to employ any take-off apparatus which transmits torque (rotation) at the time of take-off. Further, a description has been given for a case in which the automatic transmission is mounted in the vehicle having the engine as the drive power source. However, the invention is not limited to this, the automatic transmission can be mounted in a hybrid vehicle, and it goes without saying that any drive power source may be employed. Further, it is preferable that the automatic transmission is used in an FF vehicle. However, the invention is not limited to this, and can be used for vehicles with other drive types, such as an FR vehicle, a four-wheel drive vehicle, or the like.

Further, in the first to eleventh embodiments described above, one example was described for each of the respective structures of the reduced rotation output unit. However, in all the embodiments, it is possible to employ any one of a structure in which the clutch is provided between the input shaft and the input rotation element; a structure in which the clutch is provided between the reduced rotation element and the first rotation element; a structure in which the fixed element can be selectively engaged by the brake; and a structure in which the clutch is provided between the input shaft and the input rotation element, and the fixed element can be selectively engaged by the brake.

Further, for example, in the fifth embodiment and the sixth embodiment, a description is given of a structure in which the input side and the output side of the automatic speed change mechanism are switched. However, the invention is not limited to this, and a structure in which the input side and the output side of the automatic speed change mechanism are switched can be employed in the automatic transmissions in accordance with the other embodiments.

What is claimed is:
1. An automatic transmission, comprising:
an input shaft that rotates on the basis of an output rotation of a drive power source;
a planetary gear unit having first, second, third and fourth rotation elements;
a reduced rotation output unit for selectively outputting a reduced rotation obtained by reducing rotation of the input shaft to the first rotation element;
a first clutch interposed between the input shaft and the second rotation element;
a second clutch interposed between the input shaft and the third rotation element; and
an output member that outputs rotation of the fourth rotation element to a driven wheel transmission mechanism, wherein
the reduced rotation output unit is arranged at one side of the planetary gear unit in an axial direction, the first and second clutches are arranged at the other side of the planetary gear unit in the axial direction, and the output member is arranged between the first and second clutches and the planetary gear unit, wherein the first clutch is connected to the second rotation element via an inner peripheral side of the output member, and the second clutch is connected to the third rotation element via an outer peripheral side of the first clutch and an inner peripheral side of the output member.

2. The automatic transmission according to claim 1, wherein the first clutch has a friction disk that is spline engaged at an inner peripheral side to a member that connects to the second rotation element; a first clutch drum which internally houses a hydraulic servo, which is spline engaged to an outer peripheral side of the friction disk, and which is connected to the input shaft; a first piston that presses the friction disk; and a first hydraulic servo oil pressure chamber which is formed between an inner peripheral side of the first piston and the input shaft and between an outer peripheral side and the first clutch drum by sealing in a fluid tight manner, and the second clutch has a friction disk that is spline engaged at an inner peripheral side to the first clutch drum; a second clutch drum which internally houses a hydraulic servo, which is spline engaged to an outer peripheral side of the friction disk, and which is connected to the third rotation element; a second piston that presses the friction disk; and a second hydraulic servo oil pressure chamber formed between an inner peripheral side and an outer peripheral side of the second piston and the second clutch drum by sealing in a fluid tight manner.

3. The automatic transmission according to claim 1, wherein the first clutch has a friction disk which is spline engaged at an inner peripheral side to a member that connects to the second rotation element; a first clutch drum which internally houses a hydraulic servo, which is spline engaged to an outer peripheral side of the friction disk, and which is connected to the input shaft; a first piston that presses the friction disk; and a first hydraulic servo oil pressure chamber formed between an inner peripheral side of the first piston and the input shaft, and between an outer peripheral side and the first clutch drum by sealing in a fluid tight manner, and the second clutch has a friction disk which is spline engaged at an inner peripheral side to the third rotation element; a second clutch drum which internally houses a hydraulic servo, which is spline engaged to an outer peripheral side of the friction disk, and which is arranged at an outer peripheral side of the first clutch drum and connected to the input shaft; a second piston that presses the friction disk; and a second hydraulic servo oil pressure chamber formed between an inner peripheral side and an outer peripheral side of the second piston and the second clutch drum by sealing in a fluid tight manner.

4. The automatic transmission according to claim 1, wherein the reduced rotation output unit has a speed reduction planetary gear, and the speed reduction planetary gear, the planetary gear unit and the output member are provided coaxially with the input shaft.

5. The automatic transmission according to claim 4, wherein the reduced rotation output unit is configured from the speed reduction planetary gear which has an input rotation element that inputs rotation of the input shaft, a fixed element that fixes rotation, and an output rotation element that is always connected to the first rotation element, and a first brake capable of fixing rotation of the fixed element, and reduced rotation can be output by engaging the first brake.

6. The automatic transmission according to claim 5, wherein the speed reduction planetary gear is configured from a double pinion planetary gear.

7. The automatic transmission according to claim 6, wherein the speed reduction planetary gear has a first carrier that corresponds to the input rotation element, a first sun gear that corresponds to the fixed element, and a first ring gear corresponding the output rotation element.

8. The automatic transmission according to claim 6, wherein the speed reduction planetary gear has a first sun gear that corresponds to the input rotation element, a first carrier that corresponds to the fixed element, and a first ring gear that corresponds to the output rotation element.

9. The automatic transmission according to claim 4, wherein the reduced rotation output unit is configured from the speed reduction planetary gear which has an input rotation element that inputs rotation of the input shaft, a fixed element that fixes rotation, and an output rotation element that is always connected to the first rotation element, a third clutch interposed between the input shaft and the input rotation element, and a first brake capable of fixing rotation of the fixed element, and wherein reduced rotation can be output by engaging the third clutch and the first brake.

10. The automatic transmission according to claim 9, wherein the first clutch, the second clutch and the third clutch have respective hydraulic servos, the hydraulic servo of the second clutch being arranged on a first boss portion that extends from one end of the case and being communicated with an oil passage provided in the first boss portion, the hydraulic servo of the first clutch being arranged on one end of the input shaft and being communicated with an oil passage in one end of the first boss portion or the case via an oil passage provided within the input shaft, and the hydraulic servo of the third clutch being arranged on the other end of the input shaft and being communicated with an oil passage.

11. The automatic transmission according to claim 10, wherein the third clutch has a friction disk that is spline engaged at an inner peripheral side to a member connected to the input rotation element or the output rotation element of the planetary gear; a third clutch drum which internally houses a hydraulic servo and which is spline engaged to an outer peripheral side of the friction disk; a third piston that presses the friction disk; and a first hydraulic servo oil pressure chamber formed between an inner peripheral side and an outer peripheral side of the third piston and the third clutch drum by sealing in a fluid tight manner, and wherein the friction disk is arranged at a position where at least a part thereof overlaps with an outer peripheral side in a diametrical direction of the speed reduction planetary gear, the third clutch drum is arranged so as to open in the direction of the speed reduction planetary gear, and the speed reduction planetary gear is arranged between the hydraulic servo of the third clutch and the planetary gear unit in an axial direction.

12. The automatic transmission according to claim 9, wherein the speed reduction planetary gear is configured from a double pinion planetary gear.

13. The automatic transmission according to claim 12, wherein the speed reduction planetary gear has a first carrier that corresponds to the input rotation element, a first sun gear that corresponds to the fixed element, and a first ring gear corresponding the output rotation element.

14. The automatic transmission according to claim 12, wherein the speed reduction planetary gear has a first sun gear that corresponds to the input rotation element, a first carrier that corresponds to the fixed element, and a first ring gear that corresponds to the output rotation element.

15. The automatic transmission according to claim 9, wherein the first clutch, the second clutch and the third clutch have respective hydraulic servos, the hydraulic servo of the second clutch being arranged on a first boss portion that extends from one end of the case and being communicated with an oil passage provided in the first boss portion, the hydraulic servo of the first clutch being arranged on one end of the input shaft and being communicated with an oil passage in one end of the first boss portion or the case via an oil passage provided within the input shaft, and the hydraulic servo of the third clutch being arranged on a second boss portion that extends from the other end of the case or the other end of the input shaft and being communicated with an oil passage provided in the second boss portion.

16. The automatic transmission according to claim 15, wherein the third clutch has a friction disk that is spline engaged at an inner peripheral side to a member connected to the input rotation element or the output rotation element of the planetary gear; a third clutch drum which internally houses a hydraulic servo and which is spline engaged to an outer peripheral side of the friction disk; a third piston that presses the friction disk; and a first hydraulic servo oil pressure chamber formed between an inner peripheral side and an outer peripheral side of the third piston and the third clutch drum by sealing in a fluid tight manner, and wherein the friction disk is arranged at a position where at least a part thereof overlaps with an outer peripheral side in a diametrical direction of the speed reduction planetary gear, the third clutch drum is arranged so as to open in the direction of the speed reduction planetary gear, and the speed reduction planetary gear is arranged between the hydraulic servo of the third clutch and the planetary gear unit in an axial direction.

17. The automatic transmission according to claim 4, wherein the reduced rotation output unit is configured from the speed reduction planetary gear which has an input rotation element that always inputs rotation of the input shaft, a fixed element that always fixes rotation, an output rotation element that always connects to the first rotation element, and a third clutch interposed between the input shaft and the input rotation element, wherein reduced rotation can be output by engaging the third clutch.

18. The automatic transmission according to claim 17, wherein the first clutch, the second clutch and the third clutch have respective hydraulic servos, the hydraulic servo of the second clutch being arranged on a first boss portion that extends from one end of the case and being communicated with an oil passage provided in the first boss portion, the hydraulic servo of the first clutch being arranged on one end of the input shaft and being communicated with an oil passage in one end of the first boss portion or the case via an oil passage provided within the input shaft, and the hydraulic servo of the third clutch being arranged on a second boss portion that extends from the other end of the case or the other end of the input shaft and being communicated with an oil passage provided in the second boss portion.

19. The automatic transmission according to claim 18, wherein the third clutch has a friction disk that is spline engaged at an inner peripheral side to a member connected to the input rotation element or the output rotation element of the planetary gear; a third clutch drum which internally houses a hydraulic servo and which is spline engaged to an outer peripheral side of the friction disk; a third piston that presses the friction disk; and a first hydraulic servo oil pressure chamber formed between an inner peripheral side and an outer peripheral side of the third piston and the third clutch drum by sealing in a fluid tight manner, and the friction disk is arranged at a position where at least a part thereof overlaps with an outer peripheral side in a diametrical direction of the speed reduction planetary gear, the third clutch drum is arranged so as to open in the direction of the speed reduction planetary gear, and the speed reduction planetary gear is arranged between the hydraulic servo of the third clutch and the planetary gear unit in an axial direction.

20. The automatic transmission according to claim 17, wherein the first clutch, the second clutch and the third clutch have respective hydraulic servos, the hydraulic servo of the second clutch being arranged on a first boss portion that extends from one end of the case and being communicated with an oil passage provided in the first boss portion, the hydraulic servo of the first clutch being arranged on one end of the input shaft and being communicated with an oil passage in one end of the first boss portion or the case via an oil passage provided within the input shaft, and the hydraulic servo of the third clutch being arranged on the other end of the input shaft and being communicated with an oil passage.

21. The automatic transmission according to claim 20, wherein the third clutch has a friction disk that is spline engaged at an inner peripheral side to a member connected to the input rotation element or the output rotation element of the planetary gear; a third clutch drum which internally houses a hydraulic servo and which is spline engaged to an outer peripheral side of the friction disk; a third piston that presses the friction disk; and a first hydraulic servo oil pressure chamber formed between an inner peripheral side and an outer peripheral side of the third piston and the third clutch drum by sealing in a fluid tight manner, and the friction disk is arranged at a position where at least a part thereof overlaps with an outer peripheral side in a diametrical direction of the speed reduction planetary gear, the third clutch drum is arranged so as to open in the direction of the speed reduction planetary gear, and the speed reduction planetary gear is arranged between the hydraulic servo of the third clutch and the planetary gear unit in an axial direction.

22. The automatic transmission according to claim 17, wherein the speed reduction planetary gear is configured from a double pinion planetary gear.

23. The automatic transmission according to claim 22, wherein the speed reduction planetary gear has a first carrier that corresponds to the input rotation element, a first sun gear that corresponds to the fixed element, and a first ring gear corresponding the output rotation element.

24. The automatic transmission according to claim 22, wherein the speed reduction planetary gear has a first sun gear that corresponds to the input rotation element, a first carrier that corresponds to the fixed element, and a first ring gear that corresponds to the output rotation element.

25. The automatic transmission according to claim 4, wherein the reduced rotation output unit is configured from the speed reduction planetary gear which has an input rotation element that always inputs rotation of the input shaft, a fixed element that always fixes rotation, and an output rotation element that connects to the first rotation element, and a third clutch interposed between the first rotation element and the output rotation element, wherein reduced rotation can be output by engaging the third clutch.

26. The automatic transmission according to claim 25, wherein the first clutch, the second clutch and the third clutch have respective hydraulic servos, the hydraulic servo of the second clutch being arranged on a first boss portion that extends from one end of the case and being communicated with an oil passage provided in the first boss portion, the hydraulic servo of the first clutch being arranged on one end of the input shaft and being communicated with an oil passage in one end of the first boss portion or the case via an oil passage provided within the input shaft, and the hydraulic servo of the third clutch being arranged on a second boss portion that extends from the other end of the case or the other end of the input shaft and being communicated with an oil passage provided in the second boss portion.

27. The automatic transmission according to claim 26, wherein the third clutch has a friction disk that is spline engaged at an inner peripheral side to a member connected to the input rotation element or the output rotation element of the planetary gear; a third clutch drum which internally houses a hydraulic servo and which is spline engaged to an outer peripheral side of the friction disk; a third piston that presses the friction disk; and a first hydraulic servo oil pressure chamber formed between an inner peripheral side and an outer peripheral side of the third piston and the third clutch drum by sealing in a fluid tight manner, and the friction disk is arranged at a position where at least a part thereof overlaps with an outer peripheral side in a diametrical direction of the speed reduction planetary gear, the third clutch drum is arranged so as to open in the direction of the speed reduction planetary gear, and the speed reduction planetary gear is arranged between the hydraulic servo of the third clutch and the planetary gear unit in an axial direction.

28. The automatic transmission according to claim 25, wherein the speed reduction planetary gear is configured from a double pinion planetary gear.

29. The automatic transmission according to claim 28, wherein the speed reduction planetary gear has a first carrier that corresponds to the input rotation element, a first sun gear that corresponds to the fixed element, and a first ring gear corresponding the output rotation element.

30. The automatic transmission according to claim 28, wherein the speed reduction planetary gear has a first sun gear that corresponds to the input rotation element, a first carrier that corresponds to the fixed element, and a first ring gear that corresponds to the output rotation element.

31. The automatic transmission according to claim 1, wherein the planetary gear unit is a Ravigneaux type planetary gear that is configured from a second sun gear, a third sun gear, a second carrier and a second ring gear, the first rotation element is configured from the second sun gear which inputs the output rotation of the reduced rotation output unit, and which is selectively fixable on the basis of engagement of the second brake, the second rotation element is configured from the third sun gear that inputs rotation of the input shaft on the basis of engagement of the first clutch, the third rotation element is configured from the second carrier which has a long pinion meshed with the second sun gear and a short pinion meshed with the third sun gear, which is selectively fixable on the basis of engagement of the third brake, and which inputs rotation of the input shaft on the basis of engagement of the second clutch, and the fourth rotation element is configured from the second ring gear that meshes with the long pinion.

32. The automatic transmission according to claim 31, wherein a first one-way clutch for restricting rotation of the carrier to one direction is provided in parallel to the third brake.

33. The automatic transmission according to claim 32, wherein the third brake is arranged at an outer peripheral side of the planetary gear unit, and the first one-way clutch is arranged adjacent to the second clutch.

34. The automatic transmission according to claim 32, wherein the third brake and the first one-way clutch are arranged at an outer peripheral side of the planetary gear unit.

35. The automatic transmission according to claim 31, wherein the automatic transmission is provided with a second one-way clutch which is arranged in parallel to the second brake and which restricts rotation of the second sun gear to one direction on the basis of the engagement of a fourth brake.

36. The automatic transmission according to claim 35, wherein the automatic transmission is provided with a sleeve member which is interposed between the reduced rotation output unit and the second sun gear and which connects the output rotation of the reduced rotation output unit to rotation of the second sun gear, and an inner race of the second one-way clutch and the sleeve member are integrally formed.

37. The automatic transmission according to claim 31, wherein in a velocity diagram in which vertical axes show respective rotation speeds of the first, second, third and fourth rotation elements and a horizontal axis indicates and corresponds to gear ratios of the first, second, third and fourth rotation elements, the first rotation element to which the reduced rotation is input corresponds to the vertical axis at an endmost portion in a horizontal direction, and the third rotation element, the fourth rotation element connected to the output member, and the second rotation element correspond in order therefrom.

38. The automatic transmission according to claim 31, wherein a forward first speed is achieved on the basis of engagement of the first clutch and the third brake, a forward second speed is achieved on the basis of engagement of the first clutch and the second brake, a forward third speed results from engagement the first clutch and setting of a state in which reduced rotation is output from the reduced rotation output unit, a forward fourth speed is achieved on the basis of engagement of the first clutch and the second clutch, a forward fifth speed results from engagement of the second clutch and setting of a state in which reduced rotation is output from the reduced rotation output unit, a forward sixth speed is achieved on the basis of engagement of the second clutch and the second brake, and a backward first speed results from engaging the third brake and setting a state in which reduced rotation is output from the reduced rotation output unit, respectively.

39. The automatic transmission according to claim 1, wherein the planetary gear unit is configured from a first simple planetary gear having a second sun gear, a second carrier and a second ring gear, and a second simple planetary gear having a third sun gear, a third carrier and a third ring gear, the first rotation element is configured from the third ring gear which inputs the output rotation of the double pinion planetary gear and which is selectively fixable on the basis of engagement of the second brake, the second rotation element is configured from the second ring gear and the third carrier which is selectively fixable on the basis of engagement of the third brake and which inputs rotation of the input shaft on the basis of engagement of the first clutch, the third rotation element is configured from the third sun gear and the second sun gear which inputs rotation of the input shaft on the basis of engagement of the second clutch, and the fourth rotation element is configured from the second carrier which meshes with the second sun gear and the second ring gear.

40. The automatic transmission according to claim 39, wherein the automatic transmission is provided with a first one-way clutch which is arranged in parallel to the third brake and which restricts rotation of the third carrier and the second ring gear to one direction.

41. The automatic transmission according to claim 40, wherein the third brake and the first one-way clutch are arranged at an outer peripheral side of the planetary gear unit.

42. The automatic transmission according to claim 41, wherein an inner race of the first one-way clutch and the second ring gear are integrally formed.

43. The automatic transmission according to claim 39, wherein the automatic transmission is provided with a second one-way clutch which is arranged in parallel to the second brake and which restricts rotation of the third ring gear to one direction on the basis of engagement of the fourth brake.

44. The automatic transmission according to claim 39, wherein in a velocity diagram in which vertical axes show respective rotation speeds of the first, second, third and fourth rotation elements and a horizontal axis indicates and corresponds to gear ratios of the first, second, third and fourth rotation elements, the first rotation element to which the reduced rotation is input corresponds to the vertical axis at an endmost portion in a horizontal direction, and the third rotation element, the fourth rotation element connected to the output member, and the second rotation element correspond in order therefrom.

45. The automatic transmission according to claim 39, wherein a forward first speed is achieved on the basis of engagement of the second clutch and the third brake, a forward second speed is achieved on the basis of engagement of the second clutch and the second brake, a forward third speed results from engagement of the second clutch and setting a state in which reduced rotation is output from the reduced rotation output unit, a forward fourth speed is achieved on the basis of engagement of the first clutch and the second clutch, a forward fifth speed results from engagement of the first clutch and setting a state in which reduced rotation is output from the reduced rotation output unit, a forward sixth speed is achieved on the basis of engagement of the first clutch and the second brake, and a backward first speed results from engagement of the third brake and setting a state in which reduced rotation is output from the reduced rotation output unit, respectively.

46. The automatic transmission according to claim 1, wherein the planetary gear unit is a Ravigneaux type planetary gear configured from a second sun gear, a third sun gear, a second carrier and a second ring gear, the first rotation element is configured from the third sun gear which is capable of inputting the output rotation of the reduced rotation output unit, the second rotation element is configured from the second carrier which has a long pinion meshed with the second sun gear and a short pinion meshed with the third sun gear, which is selectively fixable on the basis of engagement of the second brake, and which inputs rotation of the input shaft on the basis of engagement of the first clutch, the third rotation element is configured from the second sun gear which inputs rotation of the input shaft on the basis of engagement of the second clutch and which is selectively fixable on the basis of engagement of the third brake, and the fourth rotation element is configured from the second ring gear which meshes with the long pinion.

47. The automatic transmission according to claim 46, wherein a first one-way clutch for restricting rotation of the second carrier to one direction is provided in parallel to the second brake.

48. The automatic transmission according to claim 47, wherein the second brake and the first one-way clutch are arranged at an outer peripheral side of the planetary gear unit.

49. The automatic transmission according to claim 46, wherein in a velocity diagram in which vertical axis shows respective rotation speeds of the first, second, third and fourth rotation elements and a horizontal axis indicates and corresponds to gear ratios of the first, second, third and fourth rotation elements, the first rotation element to which reduced rotation is input corresponds to the vertical axis at an endmost portion in a horizontal direction, and the fourth rotation element connected to the output member, the second rotation element, and the third rotation element correspond in order therefrom.

* * * * *